(12) United States Patent
Cottle

(10) Patent No.: US 11,250,512 B2
(45) Date of Patent: *Feb. 15, 2022

(54) APPARATUS, METHOD AND SYSTEM FOR A VERSATILE FINANCIAL MECHANISM AND TRANSACTION GENERATOR AND INTERFACE

(71) Applicant: HYBRIDARTS LLC, Tempe, AZ (US)

(72) Inventor: Charles Cottle, Tempe, AZ (US)

(73) Assignee: HYBRIDARTS LLC, Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/075,369

(22) Filed: Oct. 20, 2020

(65) Prior Publication Data
US 2021/0035220 A1  Feb. 4, 2021

Related U.S. Application Data

(63) Continuation of application No. 10/597,107, filed as application No. PCT/US2005/001669 on Jan. 13, 2005, now Pat. No. 10,810,666.

(Continued)

(51) Int. Cl.
*G06Q 40/04* (2012.01)
*G06Q 40/02* (2012.01)

(52) U.S. Cl.
CPC ............ *G06Q 40/04* (2013.01); *G06Q 40/02* (2013.01)

(58) Field of Classification Search
CPC ........ G06Q 40/00; G06Q 40/02; G06Q 40/04; G06Q 40/06; G06Q 40/08; G06Q 40/025; G06Q 20/10; G06Q 30/08
See application file for complete search history.

(56) References Cited

U.S. PATENT DOCUMENTS 6,993,511 B2   1/2006  Himmelstein
10,810,666 B2  10/2020 Cottle
(Continued)

OTHER PUBLICATIONS

Wu ("Employee Stock Option Design And Valuation", Jul. 2003, pp. 1-95).*
Wu ("Employee Stock Option Design and Valuation", Jul. 2003).

*Primary Examiner* — Gregory A Pollock
(74) *Attorney, Agent, or Firm* — Carter, Deluca & Farrell LLP

(57) ABSTRACT

Versatile Financial Mechanisms and Transactions Generators and Interfaces (VFMTGI) involve the creation of effective apparatuses, methods, and systems for solutions to create and/or leg complex versatile financial mechanisms. The VFMTGI facilitates user removal of significant transactional risk exposure as the methods, systems and apparatuses facilitate user data entry into spreads that represent alternative futures. Aspects of an implementation of the VFMTGI facilitate investor execution and completion of multiple financial transactions, simultaneously, as a single transaction. The methods, systems and apparatuses facilitates simplification of complex transactions. An implementation of the VFMTGI involves changing risk exposure and/or otherwise hedging a user's underlying position, enabling a user to make a selection to buy or sell an interrelated multi-leg financial transaction from the user's underlying position, which enables identification of subcomponent financial instruments for generating a new position for the user's underlying position.

20 Claims, 81 Drawing Sheets

Related U.S. Application Data

(60) Provisional application No. 60/536,666, filed on Jan. 14, 2004.

(56) References Cited

U.S. PATENT DOCUMENTS

| | | |
|---|---|---|
| 2002/0147670 A1 | 10/2002 | Lange |
| 2005/0119964 A1* | 6/2005 | Brady .................... G06Q 40/06 705/37 |
| 2005/0137964 A1* | 6/2005 | Nordlicht ............... G06Q 40/04 705/37 |
| 2005/0216395 A1 | 9/2005 | Behmoiras et al. |
| 2008/0040257 A1 | 2/2008 | Nafeh et al. |

* cited by examiner

| ○○○ | | | | | | 200 | |
|---|---|---|---|---|---|---|---|
| Stock XYZ | | | ⇕ 230 | | Quote | Trade | Account | Etc. | |
| | | | | | | 201 | |
| | | | Last | Net Change | Bid | Ask X | Size |
| | | | 52.49 Q | -0.03 | 52.49 | 52.5 | 4 x 4 |
| (B)utterflies | Disection | Actual | | Calls | | | 250 |
| (C)alendars | Net | Position | Last | Net Change | Bid | Ask | Strike |
| | | | | | | 235 | |
| | | | | | 245 | Jan 04–18 Days | |
| | | | 5.20 | 0.00 | 5.00 | 5.20 | 47.5 |
| | | | 2.75 | (0.15) | 2.70 | 2.80 | 50 |
| | | | 0.15 | (0.15) | 0.15 | 0.20 | 55 |
| | | | 0.05 | 0.00 | 0.00 | 0.05 | 60 |
| | | | 0.05 | 0.00 | 0.00 | 0.05 | 65 |
| | | | | | 245 | Feb 04–53 Days | |
| | | | 5.50 | 0.00 | 5.30 | 5.50 | 47.5 |
| | | | 3.40 | 0.10 | 3.30 | 3.40 | 50 |
| | | | 0.70 | (0.10) | 0.70 | 0.75 | 55 |
| | | | 0.10 | (0.05) | 0.05 | 0.10 | 60 |
| | | | 0.05 | 0.00 | 0.00 | 0.05 | 65 |
| | | | | | 245 | March 04–81 Days | |
| | | | 5.70 | (0.20) | 5.60 | 5.70 | 47.5 |
| | | 225 | 3.70 | (0.20) | 3.70 | 3.80 | 50 |
| | | | 1.25 | (0.15) | 1.20 | 1.30 | 55 |
| | | | 0.30 | (0.05) | 0.25 | 0.35 | 60 |
| | | | 0.10 | 0.00 | 0.05 | 0.15 | 65 |

FIG.2A

| FIG.2A |
|---|
| FIG.2B |

FIG.2

| Volume | High | low |
|---|---|---|
| 4,243,600 | 52.84 | 51.33 |

Puts

| Bid | Ask | Last | N |
|---|---|---|---|
| | | | |
| 0.00 | 0.10 | 0.05 | |
| 0.20 | 0.25 | 0.25 | |
| 2.60 | 2.75 | 2.75 | |
| 7.30 | 7.50 | 7.40 | |
| 12.40 | 12.60 | 12.50 | |

Hedges  255 ▶
Back/Ration
BackSpread (LongMore)
Butterfly  205
Calendar
Calendarized Iron Butterfly
Calendarized Iron Condor
Condor
Covered Stock
Diagonal
Double Diagonal
Iron Butterfly
Iron Condor
Rationed Verticals
Ratio Spread (ShortMore)
Stock vs. Option
Straddle
Strangle  215
Vertical
Rolls  220 ▶

Bear Collar Roll  257
Bull Collar Roll
Butterfly Hedge
Condor Hedge
Calendar Hedge
Calendarized Butterfly Hedge
Calendarized Condor Hedge
Calendarized Iron Butterfly Hedge
Calendarized Iron Condor Hedge
Iron Butterfly Hedge
Iron Condor Hedge
SlingshotHedge 1P2CV Roll
SlingshotHedge 1P3CV Roll
SlingshotHedge 2P2CV Roll
SlingshotHedge 2P3CV Roll
etc.

| (005) | | |
|---|---|---|
| 0.00 | | |
| 0.20 | | |
| 0.10 | | |

Bear Collar Roll  222
Bull Collar Roll
Butterfly Hedge Roll
Calendar Hedge Roll
Calendarized Iron Butterfly Roll
Calendarized Iron Condor Hedge Roll
SlingshotHedge 1P2CV Roll
SlingshotHedge 1P3CV Roll
SlingshotHedge 2P2CV Roll
SlingshotHedge 2P3CV Roll
etc.

FIG.2b

Order — 300

Order Entry and Order Queue 230

▶ Order Entry and Order Queue | Order Queue | Order Entry 301 |  | 366 Export | 368 Print | 369 Help |

370  372  302  305  310

| w/All | w/N | Buy/Sell | QTY | SYMB | EXP | Strike | Type | Price | Order Type | Hedge | Time Entered |
|---|---|---|---|---|---|---|---|---|---|---|---|
| ☐ | ☑ | Buy | 10.00 | XYZ | Mar-04 | 50 | Put | 0.85 | LIMIT | SlingshotHedge 1P2CV | 12/26/03 11:30 |
| ☐ | ☑ | Sell | (20.00) | XYZ | Mar-04 | 55 | Call | | | | |
| ☑ | ☑ | Buy | 10.00 | XYZ | Mar-04 | 60 | Call | | | | |

↖ 205

STRIKE SHIFTER
UP / FORWARD / DOWN / BACK
360

372 — Send to Order List | Edit Order 350 | Clear Order 362 | Send Order 320
364 — Cancel Working Orders | 310

▶ Order Log 315

FIG.3

Order Confirmation 400

| | |
|---|---|
| Underlying | XYZ Corp |
| General Order Description | Hedge: SlingshotHedge 1P2CV |
| Specific Order Description | 10Mar 50 Put(20) Mar 55/60 Call Credit Vertical @ .65 Credit |
| Maximum Profit (Reward) of Hedge: | $50,650.00 |
| Maximum Loss (Risk) of Hedge: | $9,350.00 (excluding dividendrisk) |
| Risk Reward Ratio of Hedge: | 5.4:1 |
| Maximum Profit (Reward) of Total Position: | Unlimited |
| Maximum Loss (Risk) of Total Position: | $1,850.00 |
| Risk Reward Ratio of Total Position: | Unlimited: 1 |
| Break-Even Stock Prices of Total Position: | 51.85, 56.85, 61.85 |
| Net Cost of Hedge: | $650 Credit |
| Total Value of Position upon Execution: | $51,850 (Based upon current Stock price of 52.50) |
| Commissions: $85 Gross Cost of Hedge: | $565 Credit |
| Potential Cash Flow Liability of Hedge: | $10,000 |
| Synthetic Price Equivalents: | |
| Long 10*50/55/60 Call or Put Butterfly | .55 Debit (not including interest, dividends or assignment premium) |
| Long 10*60 Calls | .30 Debit |

410

415

Send to Order List   Edit Order —417   Clear Order   Send Order —420

FIG. 4

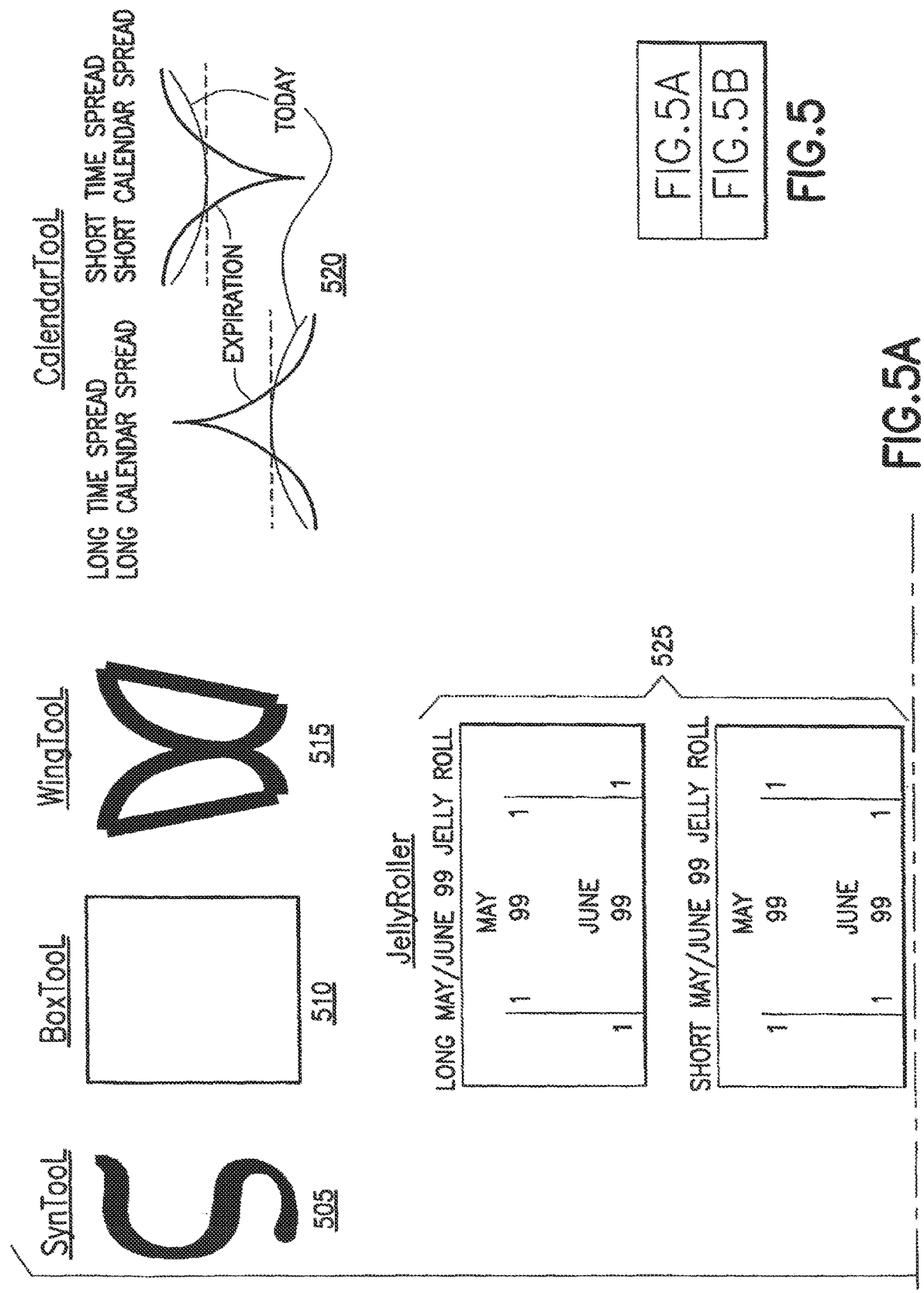

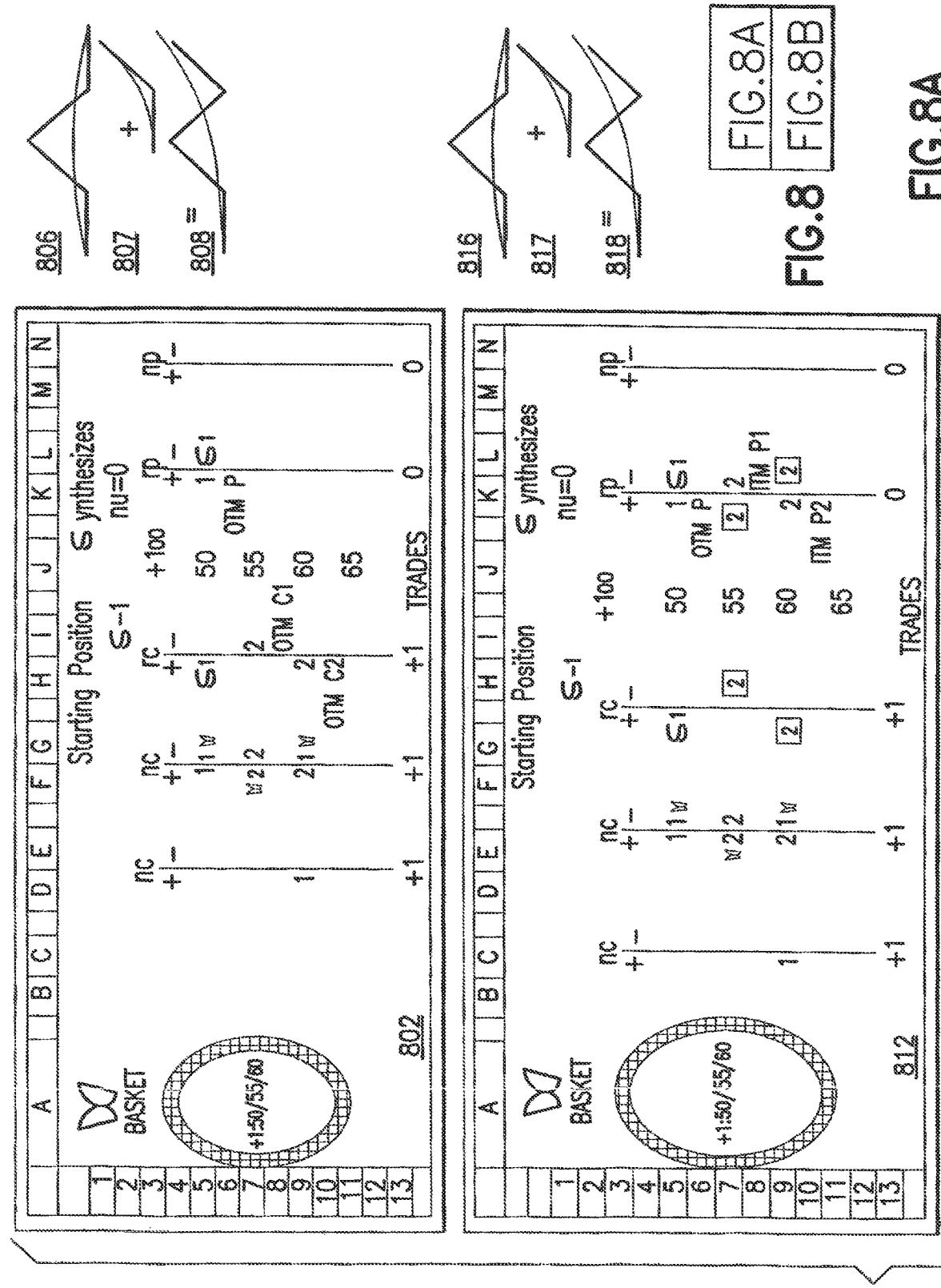

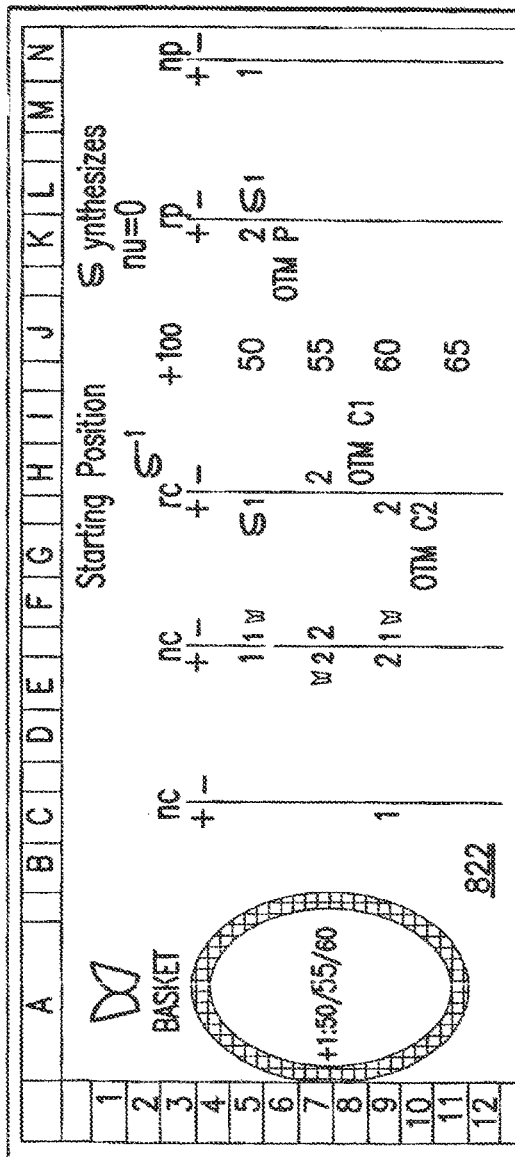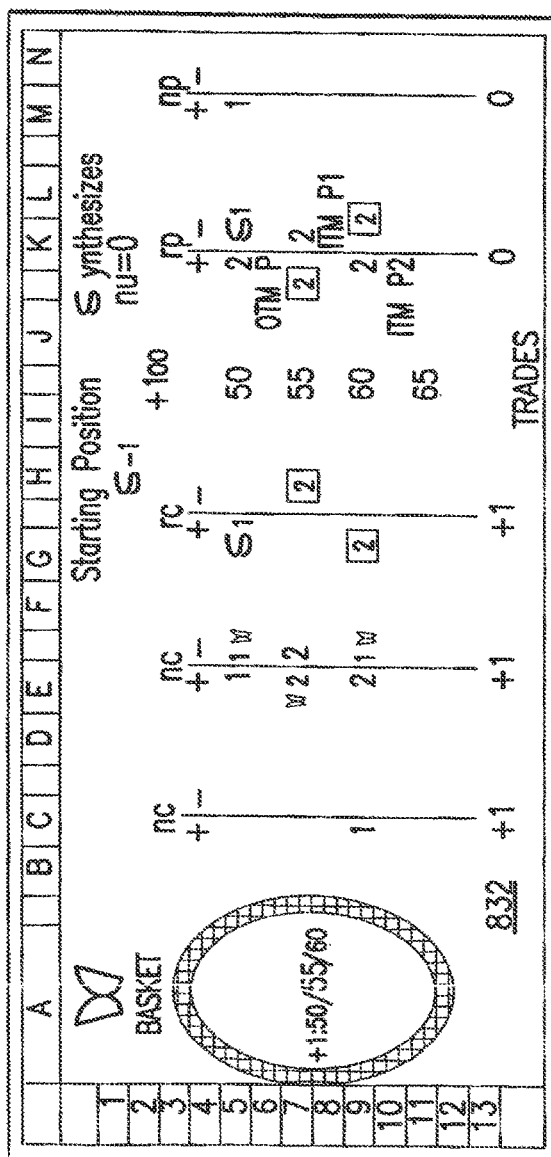
FIG. 8B

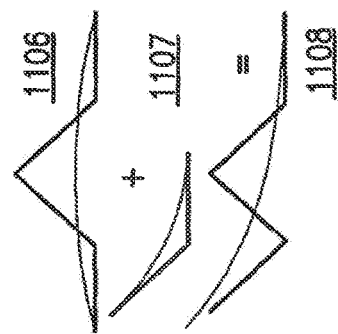
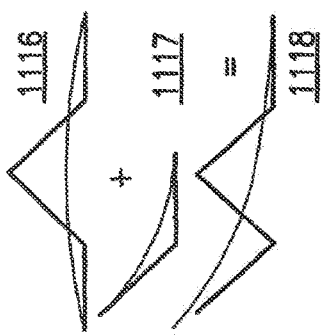
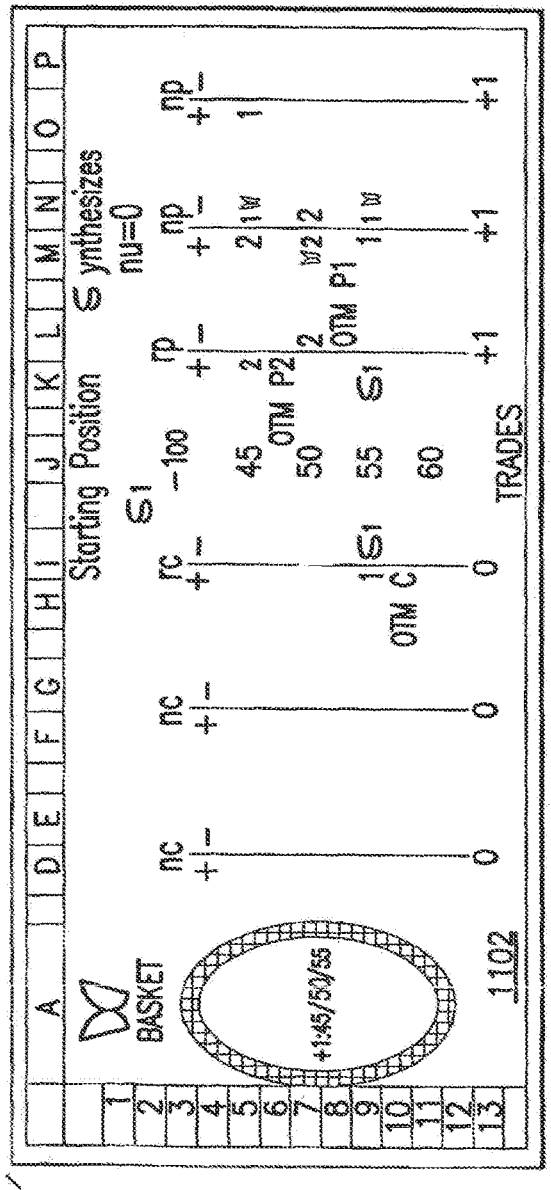
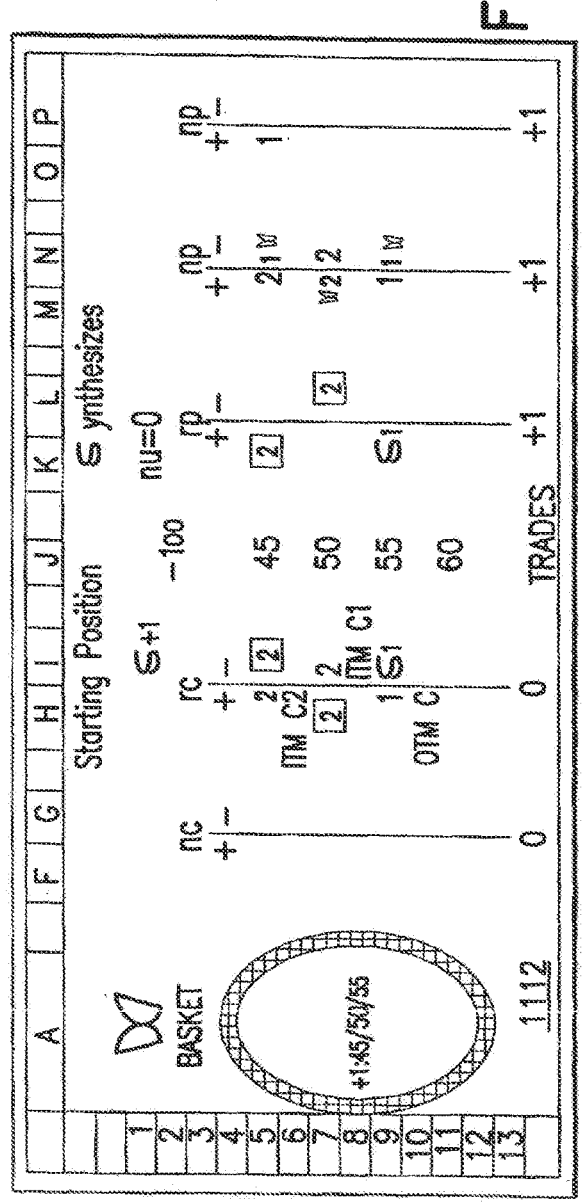
FIG.11A | FIG.11B
FIG.11A

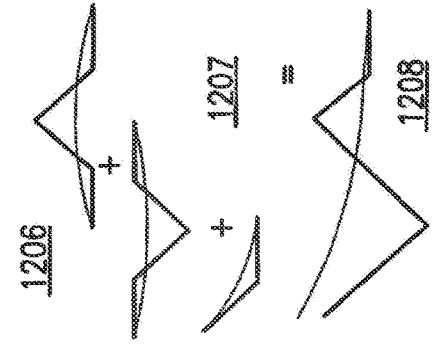
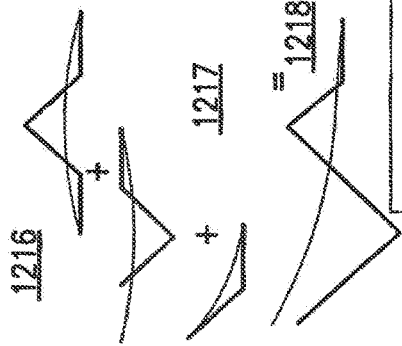
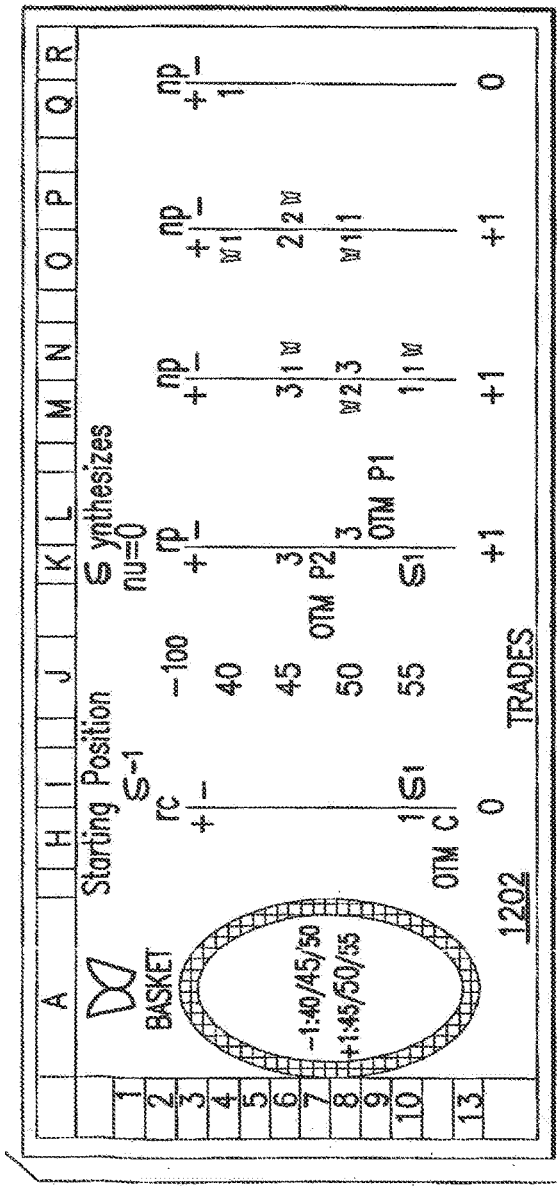
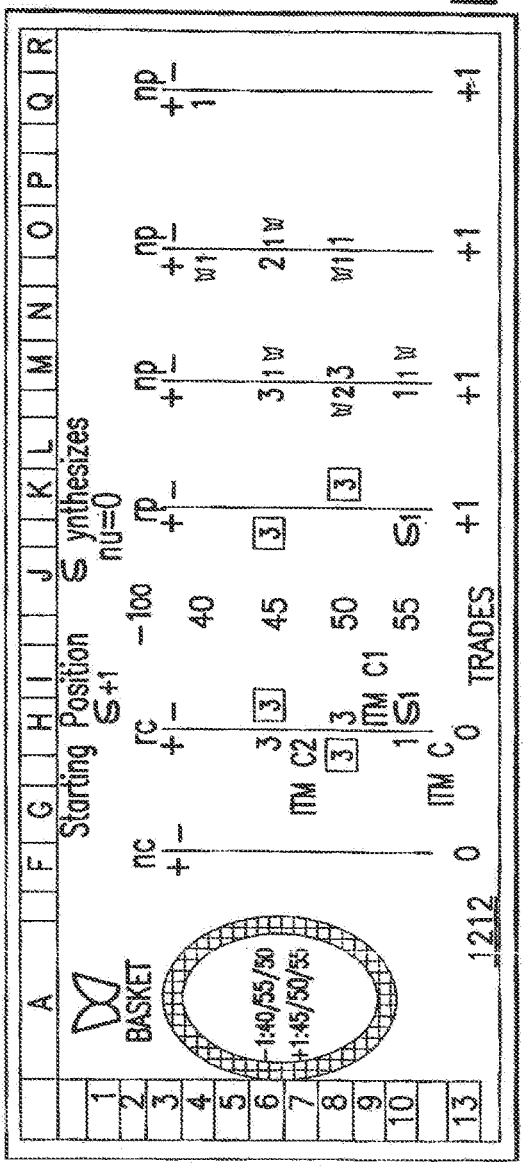
FIG. 12A

Appendix 1: Long Underlying Hybrid Hedges

Long Underlying Hybrid Hedges

Slingshot 1P(2)CV

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | | | (2) | 2 | |
| Puts | 1 | | | | |
| ProximityP | OTM | | ITM1 | ITM2 | ITM3 |
| Long OTM Call | 1 | | | | |
| Long Butterfly | | | (2) | 1 | |

Slingshot 1P2PV

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | | | (2) | 2 | |
| Puts | 1 | | ITM1 | ITM2 | ITM3 |
| ProximityP | OTM | | | 1 | |
| Long OTM Call | 1 | | | | |
| Long Butterfly | | | (2) | 1 | |

Slingshot 2P(2)CV100U

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | | | (2) | 2 | |
| Puts | 2 | | | | |
| ProximityP | OTM | | ITM1 | ITM2 | ITM3 |
| Long OTM Call | 1 | | | 1 | |
| Long Butterfly | 1 | | (2) | 1 | |
| Long Otm Put | | | | | |

FIG. 17

Appendix 1: Long Underlying Hybrid Hedges

Slingshot 2P2CV

| | | | | | |
|---|---|---|---|---|---|
| Underlying | 100 | | | | |
| Strikes | 50 | 55 | 60 | 65 | |
| ProximityC | ITM | OTM1 | OTM2 | OTM3 | |
| Calls | | (2) | 2 | | |
| Puts | 2 | | | | |
| ProximityP | OTM | ITM1 | ITM2 | ITM3 | |
| Long OTM Call | | | 1 | | |
| Long Butterfly | 1 | (2) | 1 | | |
| Long Otm Put | 1 | | | | |

Slingshot 2P2PV

| | | | | | |
|---|---|---|---|---|---|
| Underlying | 100 | | | | |
| Strikes | 50 | 55 | 60 | 65 | |
| ProximityC | ITM | OTM1 | OTM2 | OTM3 | |
| Calls | | (2) | 2 | | |
| Puts | 2 | | | | |
| ProximityP | OTM | ITM1 | ITM2 | ITM3 | |
| Long OTM Call | 1 | | 1 | | |
| Long Butterfly | 1 | (2) | 1 | | |
| Long Otm Put | | | | | |

Slingshot 1P(3)CV

| | | | | | |
|---|---|---|---|---|---|
| Underlying | 100 | | | | |
| Strikes | 50 | 55 | 60 | 65 | |
| ProximityC | ITM | OTM1 | OTM2 | OTM3 | |
| Calls | | (3) | 3 | | |
| Puts | 1 | | | | |
| ProximityP | OTM | ITM1 | ITM2 | ITM3 | |
| Long OTM Call | 1 | | 1 | 1 | |
| Long Butterfly | | (2) | 2 | (1) | |
| Short Butterfly | | (1) | | | |
| Long Otm Put | | | | | |

FIG. 18

Appendix 1: Long Underlying Hybrid Hedges

Slingshot 1P(3)PV

| Underlying | 100 | | | | |
|---|---|---|---|---|---|
| Strikes | 50 | 55 | 60 | 65 | |
| ProximityC | ITM | OTM1 | OTM2 | OTM3 | |
| Calls | | (3) | 3 | | |
| Puts | 1 | | | | |
| ProximityP | OTM | ITM1 | ITM2 | ITM3 | |
| Long OTM Call | | | | 1 | |
| Long Butterfly | 1 | (2) | 1 | | |
| Short Butterfly | | (1) | 2 | (1) | |
| Long Otm Put | | | | | |

Slingshot 2P(3)CV

| Underlying | 100 | | | | |
|---|---|---|---|---|---|
| Strikes | 50 | 55 | 60 | 65 | |
| ProximityC | ITM | OTM1 | OTM2 | OTM3 | |
| Calls | | (3) | 3 | | |
| Puts | 2 | | | | |
| ProximityP | OTM | ITM1 | ITM2 | ITM3 | |
| Long OTM Call | | | | 1 | |
| Long Butterfly | 1 | (2) | 1 | | |
| Short Butterfly | | (1) | 2 | (1) | |
| Long Otm Put | 1 | | | | |

Slingshot 2P3PV

| Underlying | 100 | | | | |
|---|---|---|---|---|---|
| Strikes | 50 | 55 | 60 | 65 | |
| ProximityC | ITM | OTM1 | OTM2 | OTM3 | |
| Calls | | (3) | 3 | | |
| Puts | 2 | | | | |
| ProximityP | OTM | ITM1 | ITM2 | ITM3 | |
| Long OTM Call | | | | 1 | |
| Long Butterfly | 1 | (2) | 1 | | |
| Short Butterfly | | (1) | 2 | (1) | |
| Long Otm Put | 1 | | | | |

FIG. 19

Appendix 1: Long Underlying Hybrid Hedges

| | | | | | | |
|---|---|---|---|---|---|---|
| CalendarHedge4Long | | | | | | |
| Month 1 | Underlying | | 100 | | | |
| | Strikes | 50 | | 55 | 60 | 65 |
| | ProximityC | ITM | | OTM1 | OTM2 | OTM3 |
| | Calls | | | (1) | | |
| | Puts | | | | | |
| | ProximityP | OTM | | ITM1 | ITM2 | ITM3 |
| Month 2 | Calendar Long Otm Put | | | | | |
| | Strikes | 50 | | 55 | 60 | 65 |
| | ProximityC | ITM | | OTM1 | OTM2 | OTM3 |
| | Calls | | | | | |
| | Puts | | | 1 | | |
| | ProximityP | OTM | | ITM1 | ITM2 | ITM3 |
| BearCollar | | | 100 | | | |
| | Underlying | | | | | |
| | Strikes | 50 | | 55 | 60 | 65 |
| | ProximityC | ITM | | OTM1 | OTM2 | OTM3 |
| | Calls | (1) | | | | |
| | Puts | | | 1 | | |
| | ProximityP | OTM | | ITM1 | ITM2 | ITM3 |
| | Bear Spread | (1) | | 1 | | |
| "3Way"ButterflyHedge4LongA | | | | | | |
| | Underlying | | 100 | | | |
| | Strikes | 50 | | 55 | 60 | 65 |
| | ProximityC | ITM | | OTM1 | OTM2 | OTM3 |
| | Calls | 1 | | (2) | 1 | |
| | Puts | | | | | |
| | ProximityP | OTM | | ITM1 | ITM2 | ITM3 |
| | Long Butterfly | 1 | | (2) | 1 | |

FIG. 20

Appendix 1: Long Underlying Hybrid Hedges

"3Way"ButterflyHedge4LongB

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | 1 | | (2) | | |
| Puts | | | ITM1 | ITM2 | ITM3 |
| ProximityP | OTM | | (2) | 1 | |
| | 1 | | | | |

"4Way"ButterflyHedge4Long

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | 1 | | (1) | | |
| Puts | | | ITM1 | ITM2 | ITM3 |
| ProximityP | OTM | | (1) | 1 | |
| | 1 | | (2) | | |

"4Way"CondorHedge4LongA

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | 1 | | (1) | (1) | 1 |
| Puts | | | ITM1 | ITM2 | ITM3 |
| ProximityP | OTM | | (1) | (1) | 1 |
| Long Condor | 1 | | | | |

FIG. 21

Appendix 1: Long Underlying Hybrid Hedges

"4Way"CondorHedge4LongB

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | 1 | | (1) | (1) | 1 |
| Puts | | | ITM1 | ITM2 | ITM3 |
| ProximityP | OTM | | (1) | (1) | 1 |
| | 1 | | | | |

"4Way"CondorHedge4LongC

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | 1 | | (1) | (1) | 1 |
| Puts | | | ITM1 | ITM2 | ITM3 |
| ProximityP | OTM | | (1) | (1) | 1 |
| | 1 | | | | |
| Long Condor | 1 | | | | |

"4Way"CondorHedge4LongD

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | 1 | | (1) | (1) | 1 |
| Puts | | | ITM1 | ITM2 | ITM3 |
| ProximityP | OTM | | (1) | (1) | 1 |
| | 1 | | | | |
| Long Condor | 1 | | | | |

"3Way"CalendarizedButterflyHedge4LongA
Month 1

| | | | | | |
|---|---|---|---|---|---|
| Underlying | | 100 | | | |
| Strikes | 50 | | 55 | 60 | 65 |

FIG. 22

Appendix 1 Long Underlying Hybrid Hedges

|  |  |  |  |  |  |
|---|---|---|---|---|---|
| ProximityC | ITM | OTM1 | OTM2 | OTM3 |  |
| Calls |  | (2) |  |  |  |
| Puts |  |  |  |  |  |
| ProximityP | OTM | ITM1 | ITM2 | ITM3 |  |

Month 2

| Calendar |  |  |  |  |
|---|---|---|---|---|
| Long Butterfly | 1 | (2) | 1 |  |
| Strikes | 50 | 55 | 60 | 65 |
| ProximityC | ITM | OTM1 | OTM2 | OTM3 |
| Calls | 1 |  | 1 |  |
| Puts |  |  |  |  |
| ProximityP | OTM | ITM1 | ITM2 | ITM3 |

"3Way"CalendarizedButterflyHedge4LongB

Month 1

| Underlying | 100 |  |  |  |
|---|---|---|---|---|
| Strikes | 50 | 55 | 60 | 65 |
| ProximityC | ITM | OTM1 | OTM2 | OTM3 |
| Calls |  |  |  |  |
| Puts | 1 | (2) | 1 |  |
| ProximityP | OTM | ITM1 | ITM2 | ITM3 |

Month 2

| Calendar |  |  |  |  |
|---|---|---|---|---|
| Long Butterfly | 1 | (2) | 1 |  |
| Strikes | 50 | 55 | 60 | 65 |
| ProximityC | ITM | OTM1 | OTM2 | OTM3 |
| Calls | 1 |  | 1 |  |
| Puts |  |  |  |  |
| ProximityP | OTM | ITM1 | ITM2 | ITM3 |

"4Way"CalendarizedButterflyHedge4Long

Month 1

| Underlying | 100 |  |  |  |
|---|---|---|---|---|
| Strikes | 50 | 55 | 60 | 65 |
| ProximityC | ITM | OTM1 | OTM2 | OTM3 |
| Calls |  | (1) |  |  |

FIG. 23

Appendix 1: Long Underlying Hybrid Hedges

"4Way"CalendarizedCondorHedge4LongA

Month 2

| | | | | |
|---|---|---|---|---|
| Puts ProximityP | OTM | (1) ITM1 | ITM2 | ITM3 |
| Calendar Long Butterfly Strikes | 50 | 55 | 60 | 65 |
| ProximityC Calls | ITM | OTM1 | OTM2 | OTM3 |
| Puts | 1 | (2) | 1 | |
| ProximityP | 1 | | 1 | |

Month 1

| | | | | |
|---|---|---|---|---|
| | OTM | ITM1 | ITM2 | ITM3 |
| Underlying Strikes | 50 | 55 | 60 | 65 |
| ProximityC | ITM | OTM1 | OTM2 | OTM3 |
| Calls | 100 | | | |
| Puts | 1 | | (1) | |
| ProximityP | | | | |

"4Way"CalendarizedCondorHedge4LongB

Month 2

| | | | | |
|---|---|---|---|---|
| | OTM | ITM1 | ITM2 | ITM3 |
| Calendar Long Condor Strikes | 50 | 55 | 60 | 65 |
| ProximityC Calls | ITM | OTM1 | OTM2 | OTM3 |
| Puts | 1 | (1) | (1) | 1 |
| ProximityP | | | | |

Month 1

| | | | | |
|---|---|---|---|---|
| | OTM | ITM1 | ITM2 | ITM3 |
| Underlying Strikes | 50 | 55 | 60 | 65 |
| ProximityC | ITM | OTM1 | OTM2 | OTM3 |
| Calls | 100 | | | |
| Puts | 1 | | (1) | |
| ProximityP | | | | |

FIG. 24

Appendix 1. Long Underlying Hybrid Hedges

Month 2

|  | Calendar | Strikes | | | |
|---|---|---|---|---|---|
| Calendar | 1 | | | | |
| Long Condor Strikes | | 50 | 55 | 60 | 65 |
| ProximityC | | ITM | OTM1 | OTM2 | OTM3 |
| Calls | | 1 | (1) | (1) | 1 |
| Puts | | | | | |
| ProximityP | | OTM | ITM1 | ITM2 | ITM3 |

"4Way"CalendarizedCondorHedge4LongC Month 1

|  | Strikes | | | | |
|---|---|---|---|---|---|
| Underlying | 100 | | | | |
| Strikes | | 50 | 55 | 60 | 65 |
| ProximityC | | ITM | ITM1 | ITM2 | ITM3 |
| Calls | | | | | |
| Puts | | | (1) | (1) | 1 |
| ProximityP | | OTM | OTM1 | OTM2 | OTM3 |

Month 2

|  | Calendar | Strikes | | | |
|---|---|---|---|---|---|
| Calendar | 1 | | | | |
| Long Condor Strikes | | 50 | 55 | 60 | 65 |
| ProximityC | | ITM | OTM1 | OTM2 | OTM3 |
| Calls | | 1 | (1) | (1) | 1 |
| Puts | | | | | |
| ProximityP | | OTM | ITM1 | ITM2 | ITM3 |

"4Way"CalendarizedCondorHedge4LongC Month 1

|  | Strikes | | | | |
|---|---|---|---|---|---|
| Underlying | 100 | | | | |
| Strikes | | 50 | 55 | 60 | 65 |
| ProximityC | | ITM | ITM1 | ITM2 | ITM3 |
| Calls | | | | | |
| Puts | | | (1) | (1) | 1 |
| ProximityP | | OTM | OTM1 | OTM2 | OTM3 |

| Calendar | 1 |
|---|---|

FIG. 25

Appendix 1: Long Underlying Hybrid Hedges

Month 2

Long Condor

| Strikes | 50 | 55 | 60 | 65 |
|---|---|---|---|---|
| ProximityC | ITM | OTM1 | OTM2 | OTM3 |
| Calls | 1 | (1) | (1) | 1 |
| Puts | 1 | | | |
| ProximityP | OTM | | | |

3K"3Way"Ratioed(1x2)VerticalsHedge4LongA

| Underlying | 100 | | | |
|---|---|---|---|---|
| Strikes | 50 | 55 | 60 | 65 |
| ProximityC | ITM | OTM1 | OTM2 | OTM3 |
| Calls | | (3) | 2 | |
| Puts | 1 | | | |
| ProximityP | OTM | ITM1 | ITM2 | ITM3 |
| Bear Vertical | | (1) | 1 | |
| Long Butterfly | 1 | (2) | 1 | |

3K"3Way"Ratioed(1x2)VerticalsHedge4LongB

| Underlying | 200 | | | |
|---|---|---|---|---|
| Strikes | 50 | 55 | 60 | 65 |
| ProximityC | ITM | OTM1 | OTM2 | OTM3 |
| Calls | | (3) | 2 | |
| Puts | OTM | ITM1 | ITM2 | ITM3 |
| ProximityP | | (1) | 1 | |
| Bear Vertical | | (2) | 1 | |
| Long Butterfly | 1 | | | |

3K"3Way"Ratioed(1x2)VerticalsHedge4LongC

| Underlying | 300 | | | |
|---|---|---|---|---|
| Strikes | 50 | 55 | 60 | 65 |
| ProximityC | ITM | OTM1 | OTM2 | OTM3 |
| Calls | | (3) | | |

FIG. 26

*Appendix 1: Long Underlying Hybrid Hedges*

|  |  |  |  |  |
|---|---|---|---|---|
| Puts | 1 |  | 2 |  |
| ProximityP | OTM |  | ITM2 | ITM3 |
| Bear Vertical |  |  | 1 |  |
| Long Butterfly | 1 |  | 1 |  |

3K"4Way"Ratioed(1x2)VerticalsHedge4LongA

|  | 100 |  |  |  |
|---|---|---|---|---|
| Underlying | 50 | 55 | 60 | 65 |
| Strikes | ITM | OTM1 | OTM2 | OTM3 |
| ProximityC | 1 | (3) | 1 |  |
| Calls |  |  | 1 |  |
| Puts | 1 | ITM1 | ITM2 | ITM3 |
| ProximityP | OTM | (1) | 1 |  |
| Bear Vertical |  | (2) | 1 |  |
| Long Butterfly | 1 |  |  |  |

3K"4Way"Ratioed(1x2)VerticalsHedge4LongB

|  | 100 |  |  |  |
|---|---|---|---|---|
| Underlying | 50 | 55 | 60 | 65 |
| Strikes | ITM | OTM1 | OTM2 | OTM3 |
| ProximityC | 1 | (1) | 2 |  |
| Calls |  | (2) | ITM2 | ITM3 |
| Puts | 1 | ITM1 | 1 |  |
| ProximityP | OTM | (1) | 1 |  |
| Bear Vertical |  | (2) |  |  |
| Long Butterfly | 1 |  |  |  |

3K"4Way"Ratioed(1x2)VerticalsHedge4LongC

|  | 200 |  |  |  |
|---|---|---|---|---|
| Underlying | 50 | 55 | 60 | 65 |
| Strikes | ITM | OTM1 | OTM2 | OTM3 |
| ProximityC | 1 | (2) | 2 |  |
| Calls |  | (1) |  |  |
| Puts | 1 |  | 2 |  |

FIG. 27

Appendix I: Long Underlying Hybrid Hedges

|  | OTM | ITM1 | ITM2 | ITM3 |
|---|---|---|---|---|
| ProximityP |  |  |  |  |
| Bear Vertical | 1 | (1) | 1 |  |
| Long Butterfly |  | (2) |  |  |

3K"3Way"Ratioed(2x1)VerticalsHedge4LongA

|  |  |  |  |  |
|---|---|---|---|---|
| Underlying | 100 |  |  |  |
| Strikes | 50 | 55 | 60 | 65 |
| ProximityC | ITM | OTM1 | OTM2 | OTM3 |
| Calls | 1 | (3) | 1 |  |
| Puts |  |  |  |  |
| ProximityP | OTM | ITM1 | ITM2 | ITM3 |
| Bull Vertical | 1 | (1) | 1 |  |
| Long Butterfly |  | (2) |  |  |

3K"3Way"Ratioed(2x1)VerticalsHedge4LongB

|  |  |  |  |  |
|---|---|---|---|---|
| Underlying | 200 |  |  |  |
| Strikes | 50 | 55 | 60 | 65 |
| ProximityC | ITM | OTM1 | OTM2 | OTM3 |
| Calls | 2 | (3) | 1 |  |
| Puts |  |  |  |  |
| ProximityP | OTM | ITM1 | ITM2 | ITM3 |
| Bull Vertical | 1 | (1) | 1 |  |
| Long Butterfly |  | (2) |  |  |

3K"3Way"Ratioed(2x1)VerticalsHedge4LongC

|  |  |  |  |  |
|---|---|---|---|---|
| Underlying | 300 |  |  |  |
| Strikes | 50 | 55 | 60 | 65 |
| ProximityC | ITM | OTM1 | OTM2 | OTM3 |
| Calls | 2 | (3) | 1 |  |
| Puts |  |  |  |  |
| ProximityP | OTM | ITM1 | ITM2 | ITM3 |
| Bull Vertical | 1 | (1) | 1 |  |

FIG. 28

Appendix 1: Long Underlying Hybrid Hedges

|  |  |  |  |  |  |
|---|---|---|---|---|---|
| Long Butterfly | 1 | 100 | (2) | 1 |  |

3K"4Way"Ratioed(2x1)VerticalsHedge4LongA

| | | | | | |
|---|---|---|---|---|---|
| Underlying | | | | | |
| Strikes | 50 | | 55 | 60 | 65 |
| ProximityC | ITM | | OTM1 | OTM2 | OTM3 |
| Calls | | | (1) | | |
| Puts | 2 | | (2) | 1 | |
| ProximityP | OTM | | ITM1 | ITM2 | ITM3 |
| Bull Vertical | 1 | | (1) | | |
| Long Butterfly | 1 | | (2) | 1 | |

3K"4Way"Ratioed(2x1)VerticalsHedge4LongB

| | | | | | |
|---|---|---|---|---|---|
| Underlying | | 100 | | | |
| Strikes | 50 | | 55 | 60 | 65 |
| ProximityC | ITM | | OTM1 | OTM2 | OTM3 |
| Calls | 1 | | (3) | 1 | |
| Puts | 1 | | | | |
| ProximityP | OTM | | ITM1 | ITM2 | ITM3 |
| Bull Vertical | 1 | | (1) | | |
| Long Butterfly | 1 | | (2) | 1 | |

3K"4Way"Ratioed(2x1)VerticalsHedge4LongC

| | | | | | |
|---|---|---|---|---|---|
| Underlying | | 200 | | | |
| Strikes | 50 | | 55 | 60 | 65 |
| ProximityC | ITM | | OTM1 | OTM2 | OTM3 |
| Calls | 2 | | (2) | | |
| Puts | | | (1) | 1 | |
| ProximityP | OTM | | ITM1 | ITM2 | ITM3 |
| Bull Vertical | 1 | | (1) | | |
| Long Butterfly | 1 | | (2) | 1 | |

FIG. 29

Appendix 1: Long Underlying Hybrid Hedges

3K"3Way"Ratioed(2x3)VerticalsHedge4LongA

| | | | 100 | | | |
|---|---|---|---|---|---|---|
| Underlying | | | | | | |
| Strikes | 50 | | 55 | 60 | 65 | |
| ProximityC | ITM | | OTM1 | OTM2 | OTM3 | |
| Calls | 1 | | (5) | 3 | | |
| Puts | 1 | | | | | |
| ProximityP | OTM | | ITM1 | ITM2 | ITM3 | |
| Bear Vertical | | | (1) | 1 | | |
| Long Butterfly | 2 | | (4) | 2 | | |

3K"3Way"Ratioed(2x3)VerticalsHedge4LongB

| | | | 100 | | | |
|---|---|---|---|---|---|---|
| Underlying | | | | | | |
| Strikes | 50 | | 55 | 60 | 65 | |
| ProximityC | ITM | | OTM1 | OTM2 | OTM3 | |
| Calls | 2 | | (5) | 2 | | |
| Puts | | | | 1 | | |
| ProximityP | OTM | | ITM1 | ITM2 | ITM3 | |
| Bear Vertical | | | (1) | 1 | | |
| Long Butterfly | 2 | | (4) | 2 | | |

3K"3Way"Ratioed(2x3)VerticalsHedge4LongC

| | | | 200 | | | |
|---|---|---|---|---|---|---|
| Underlying | | | | | | |
| Strikes | 50 | | 55 | 60 | 65 | |
| ProximityC | ITM | | OTM1 | OTM2 | OTM3 | |
| Calls | 2 | | (5) | 1 | | |
| Puts | | | | 2 | | |
| ProximityP | OTM | | ITM1 | ITM2 | ITM3 | |
| Bear Vertical | | | (1) | 1 | | |
| Long Butterfly | 2 | | (4) | 2 | | |

3K"3Way"Ratioed(2x3)VerticalsHedge4LongA

| | 200 |
|---|---|
| Underlying | |

FIG. 30

Appendix 1: Long Underlying Hybrid Hedges

3K"4Way"Ratioed(2x3)VerticalsHedge4LongB

| Strikes | 50 | 55 | 60 | 65 |
|---|---|---|---|---|
| ProximityC | ITM | OTM1 | OTM2 | OTM3 |
| Calls | | (5) | 3 | |
| Puts | 2 | | | |
| ProximityP | OTM | ITM1 | ITM2 | ITM3 |
| Bear Vertical | | (1) | 1 | |
| Long Butterfly | 2 | (4) | 2 | |

| Underlying | | | 300 | | |
|---|---|---|---|---|---|
| Strikes | 50 | 55 | 60 | 65 |
| ProximityC | ITM | OTM1 | OTM2 | OTM3 |
| Calls | 2 | (5) | 3 | |
| Puts | | | | |
| ProximityP | OTM | ITM1 | ITM2 | ITM3 |
| Bear Vertical | 1 | (1) | | |
| Long Butterfly | 2 | (4) | 2 | |

3K"4Way"Ratioed(3x2)VerticalsHedge4LongA

| Underlying | | | 100 | | |
|---|---|---|---|---|---|
| Strikes | 50 | 55 | 60 | 65 |
| ProximityC | ITM | OTM1 | OTM2 | OTM3 |
| Calls | 2 | (5) | 2 | |
| Puts | 1 | | | |
| ProximityP | OTM | ITM1 | ITM2 | ITM3 |
| Bull Vertical | 1 | (1) | | |
| Long Butterfly | 2 | (4) | 2 | |

3K"4Way"Ratioed(3x2)VerticalsHedge4LongB

| Underlying | | | 100 | | |
|---|---|---|---|---|---|
| Strikes | 50 | 55 | 60 | 65 |
| ProximityC | ITM | OTM1 | OTM2 | OTM3 |

FIG. 31

Appendix 1: Long Underlying Hybrid Hedges

3K"4Way"Ratioed(3x2)VerticalsHedge4LongC

|  | | | | |
|---|---|---|---|---|
| Calls | 3 |  | 1 |  |
| Puts |  | (5) | 1 |  |
| ProximityP | OTM | ITM1 | ITM2 | ITM3 |
| Bull Vertical | 1 | (1) |  |  |
| Long Butterfly | 2 | (4) | 2 |  |

3K"4Way"Ratioed(3x2)VerticalsHedge4LongA

| | | | | |
|---|---|---|---|---|
| Underlying | 200 | | | |
| Strikes | 50 | 55 | 60 | 65 |
| ProximityC | ITM | OTM1 | OTM2 | OTM3 |
| Calls | 3 |  |  |  |
| Puts |  | (5) | 2 |  |
| ProximityP | OTM | ITM1 | ITM2 | ITM3 |
| Bull Vertical | 1 | (1) |  |  |
| Long Butterfly | 2 | (4) | 2 |  |

3K"4Way"Ratioed(3x2)VerticalsHedge4LongA

| | | | | |
|---|---|---|---|---|
| Underlying | 200 | | | |
| Strikes | 50 | 55 | 60 | 65 |
| ProximityC | ITM | OTM1 | OTM2 | OTM3 |
| Calls | 1 |  |  |  |
| Puts | 2 | (5) | 2 |  |
| ProximityP | OTM | ITM1 | ITM2 | ITM3 |
| Bull Vertical | 1 | (1) |  |  |
| Long Butterfly | 2 | (4) | 2 |  |

3K"3Way"Ratioed(3x2)VerticalsHedge4LongB

| | | | | |
|---|---|---|---|---|
| Underlying | 300 | | | |
| Strikes | 50 | 55 | 60 | 65 |
| ProximityC | ITM | OTM1 | OTM2 | OTM3 |
| Calls | 3 |  |  |  |
| Puts |  | (5) | 2 |  |

FIG. 32

Appendix 1: Long Underlying Hybrid Hedges

|  | OTM | ITM1 | ITM2 | ITM3 |
|---|---|---|---|---|
| ProximityP | 1 | (1) |  |  |
| Bull Vertical |  |  | 2 |  |
| Long Butterfly | 2 | (4) |  |  |

3K"3Way"Ratioed(1x3)VerticalsHedge4LongA

|  | 100 |  |  |  |
|---|---|---|---|---|
| Underlying |  |  |  |  |
| Strikes | 50 | 55 | 60 | 65 |
| ProximityC | ITM | OTM1 | OTM2 | OTM3 |
| Calls | 1 | (4) | 3 |  |
| Puts |  |  |  |  |
| ProximityP | OTM | ITM1 | ITM2 | ITM3 |
| Bear Vertical | 1 |  |  |  |
| Long Butterfly |  | (2) | 2 |  |

3K"3Way"Ratioed(1x3)VerticalsHedge4LongA

|  | 300 |  |  |  |
|---|---|---|---|---|
| Underlying |  |  |  |  |
| Strikes | 50 | 55 | 60 | 65 |
| ProximityC | ITM | OTM1 | OTM2 | OTM3 |
| Calls | 1 | (4) | 3 |  |
| Puts |  |  |  |  |
| ProximityP | OTM | ITM1 | ITM2 | ITM3 |
| Bear Vertical | 1 |  |  |  |
| Long Butterfly |  | (2) | 1 |  |

3K"3Way"Ratioed(3x1)VerticalsHedge4LongA

|  | 100 |  |  |  |
|---|---|---|---|---|
| Underlying |  |  |  |  |
| Strikes | 50 | 55 | 60 | 65 |
| ProximityC | ITM | OTM1 | OTM2 | OTM3 |
| Calls | 2 | (4) | 1 |  |
| Puts | 1 |  |  |  |
| ProximityP | OTM | ITM1 | ITM2 | ITM3 |
| Bull Vertical | 2 | (2) |  |  |

FIG. 33

Appendix 1: Long Underlying Hybrid Hedges

| | | | | | | |
|---|---|---|---|---|---|---|
| Long Butterfly | 1 | | (2) | | 1 | |

3K"3Way"Ratioed(3x1)VerticalsHedge4LongB

| | | | | | | |
|---|---|---|---|---|---|---|
| Underlying | 50 | 3oo | 55 | 60 | 65 | |
| Strikes | ITM | | OTM1 | OTM2 | OTM3 | |
| ProximityC | | | (4) | 1 | | |
| Calls | 3 | | | | | |
| Puts | | | | | | |
| ProximityP | 2 | | (2) | | | |
| Bull Vertical | 1 | | (2) | | | |
| Long Butterfly | | | | 1 | | |

4K"4Way"Ratioed(1x2)VerticalsHedge4LongA

| | | | | | | |
|---|---|---|---|---|---|---|
| Underlying | 50 | 1oo | 55 | 60 | 65 | |
| Strikes | ITM | | OTM1 | OTM2 | OTM3 | |
| ProximityC | 1 | | (1) | (2) | 2 | |
| Calls | | | | | | |
| Puts | | | | | | |
| ProximityP | 1 | | | | | |
| Bear Vertical | OTM | | ITM1 | ITM2 | ITM3 | |
| Long Condor | 1 | | (1) | (1) | 1 | |

4K"4Way"Ratioed(1x2)VerticalsHedge4LongB

| | | | | | | |
|---|---|---|---|---|---|---|
| Underlying | 50 | 1oo | 55 | 60 | 65 | |
| Strikes | ITM | | OTM1 | OTM2 | OTM3 | |
| ProximityC | 1 | | (1) | (2) | 1 | |
| Calls | | | | | | |
| Puts | | | | | | |
| ProximityP | OTM | | ITM1 | ITM2 | ITM3 | |
| Bear Vertical | | | (1) | (1) | 1 | |
| Long Condor | 1 | | | (1) | 1 | |

FIG. 34

Appendix 1. Long Underlying Hybrid Hedges

4K"4Way"Ratioed(1x2)VerticalsHedge4LongC

| | Underlying | | | | |
|---|---|---|---|---|---|
| | | 100 | | | |
| Strikes | 50 | | 55 | 60 | 65 |
| ProximityC | ITM | | OTM1 | OTM2 | OTM3 |
| Calls | | | (1) | (1) | |
| Puts | 1 | | ITM1 | (1) | 2 |
| ProximityP | OTM | | | ITM2 | ITM3 |
| Bear Vertical | | | | (1) | 1 |
| Long Condor | 1 | | (1) | (1) | 1 |

4K"4Way"Ratioed(1x2)VerticalsHedge4LongD

| | Underlying | | | | |
|---|---|---|---|---|---|
| | | 100 | | | |
| Strikes | 50 | | 55 | 60 | 65 |
| ProximityC | ITM | | OTM1 | OTM2 | OTM3 |
| Calls | | | (1) | (2) | 2 |
| Puts | 1 | | ITM1 | ITM2 | ITM3 |
| ProximityP | OTM | | | (1) | 1 |
| Bear Vertical | | | (1) | (1) | 1 |
| Long Condor | 1 | | | | |

4K"4Way"Ratioed(2x1)VerticalsHedge4LongA

| | Underlying | | | | |
|---|---|---|---|---|---|
| | | 100 | | | |
| Strikes | 50 | | 55 | 60 | 65 |
| ProximityC | ITM | | OTM1 | OTM2 | OTM3 |
| Calls | 2 | | (2) | (1) | 1 |
| Puts | | | ITM1 | ITM2 | ITM3 |
| ProximityP | OTM | | (1) | | |
| Bull Vertical | 1 | | (1) | | |
| Long Condor | 1 | | | (1) | 1 |

4K"4Way"Ratioed(2x1)VerticalsHedge4LongB

| | Underlying |
|---|---|
| | 100 |

FIG. 35

Appendix 1. Long Underlying Hybrid Hedges

| Strikes | 50 | | 55 | 60 | 65 |
|---|---|---|---|---|---|
| ProximityC | ITM | | OTM1 | OTM2 | OTM3 |
| Calls | | 2 | (2) | | 1 |
| Puts | | OTM | ITM1 | ITM2 | ITM3 |
| ProximityP | | 1 | (1) | | |
| Bull Vertical | 1 | | (1) | (1) | 1 |
| Long Condor | | 1 | | | |

FIG. 36

Appendix 2: Short Underlying Hybrid Hedges

Short Underlying Hybrid Hedges

| Slingshot 1C(2)PV | Underlying Strikes | 45 ITM2 | 50 ITM1 | (100) | 55 OTM1 | 60 OTM2 |
|---|---|---|---|---|---|---|
| | ProximityC Calls | OTM2 | (2) OTM1 | | 1 | |
| | Puts ProximityP | 2 | (2) | | | |
| | Long Butterfly | 1 | | | ITM1 | ITM2 |
| | Long OTM Put | 1 | | | 1 | |

| Slingshot 1C2CV | Underlying Strikes | 45 ITM2 | 50 ITM1 | (100) | 55 OTM1 | 60 OTM2 |
|---|---|---|---|---|---|---|
| | ProximityC Calls | 2 | (2) | | 1 | |
| | Puts ProximityP | OTM2 | OTM1 | | ITM1 | ITM2 |
| | Long Butterfly | 1 | (2) | | 1 | |
| | Long OTM Put | 1 | | | | |

| Slingshot 2C(2)PV(100)U | Underlying Strikes | 45 ITM2 | 50 ITM1 | (100) | 55 OTM1 | 60 OTM2 |
|---|---|---|---|---|---|---|
| | ProximityC Calls | 2 | (2) | | 2 | |
| | Puts ProximityP | OTM2 | OTM1 | | ITM1 | ITM2 |
| | Long OTM Call | 1 | (2) | | 1 | |
| | Long Butterfly | | | | 1 | |

FIG. 37

Appendix 2: Short Underlying Hybrid Hedges

Slingshot 2C2PV

|  | 45 | 50 | (100) | 55 | 60 |
|---|---|---|---|---|---|
| Long OTM Put |  |  |  |  | 1 |
| Underlying Strikes | 45 | 50 |  | 55 | 60 |
| ProximityC | ITM2 | ITM1 |  | OTM1 | OTM2 |
| Calls |  |  |  | 2 |  |
| Puts | 2 | (2) |  |  |  |
| ProximityP | OTM2 | OTM1 |  | ITM1 | ITM2 |
| Long OTM Call |  |  |  | 1 |  |
| Long Butterfly | 1 | (2) |  | 1 |  |
| Long Otm Put | 1 |  |  |  |  |

Slingshot 2C2CV

|  | 45 | 50 | (100) | 55 | 60 |
|---|---|---|---|---|---|
| Underlying Strikes | 45 | 50 |  | 55 | 60 |
| ProximityC | ITM2 | ITM1 |  | OTM1 | OTM2 |
| Calls | 2 | (2) |  | (2) |  |
| Puts |  |  |  |  |  |
| ProximityP | OTM2 | OTM1 |  | ITM1 | ITM2 |
| Long OTM Call |  |  |  | 1 |  |
| Long Butterfly | 1 | (2) |  | 1 |  |
| Long Otm Put | 1 |  |  |  |  |

Slingshot 1C(3)PV

|  | 40 | 45 | (100) | 50 | 55 |
|---|---|---|---|---|---|
| Underlying Strikes | 40 | 45 |  | 50 | 55 |
| ProximityC | ITM3 | ITM2 |  | ITM1 | OTM1 |
| Calls | OTM2 3 | 3 OTM2 |  | (3) OTM1 | 1 |
| Puts |  | 1 |  | (2) ITM1 | 1 |
| ProximityP | OTM2 | OTM1 |  |  |  |
| Long OTM Call |  |  |  |  |  |
| Long Butterfly | (1) | 1 |  | (2) | 1 |
| Short Butterfly |  | 2 |  | (1) |  |
| Long OTM Put |  |  |  |  |  |

FIG. 38

Appendix 2: Short Underlying Hybrid Hedges

Slingshot 1C3CV

| | Underlying | | | | (100) | | |
|---|---|---|---|---|---|---|---|
| Strikes | | 40 | 45 | | 50 | 55 | |
| ProximityC | | ITM3 | ITM2 | | ITM1 | OTM1 | |
| Calls | | | 3 | | (3) | 1 | |
| Puts | | | | | | | |
| ProximityP | | OTM2 | 3 OTM2 | | OTM1 | ITM1 | |
| Long OTM Call | | | | | | | |
| Long Butterfly | | | 1 | | | 1 | |
| Short Butterfly | | (1) | 2 | | | | |
| Long OTM Put | | 1 | | | | | |

Slingshot 2C(3)PV

| | Underlying | | | | (100) | | |
|---|---|---|---|---|---|---|---|
| Strikes | | 40 | 45 | | 50 | 55 | |
| ProximityC | | ITM3 | ITM2 | | ITM1 | OTM1 | |
| Calls | | | 3 | | (3) | 2 | |
| Puts | | | | | | | |
| ProximityP | | OTM2 | 3 OTM2 | | OTM1 | ITM1 | |
| Long OTM Call | | | | | | | |
| Long Butterfly | | | 1 | | (2) | 1 | |
| Short Butterfly | | (1) | 2 | | (1) | 1 | |
| Long OTM Put | | 1 | | | | | |

Slingshot 2C3CV

| | Underlying | | | | (100) | | |
|---|---|---|---|---|---|---|---|
| Strikes | | 40 | 45 | | 50 | 55 | |
| ProximityC | | ITM3 | ITM2 | | ITM1 | OTM1 | |
| Calls | | | 3 | | (3) | 2 | |
| Puts | | | | | | | |
| ProximityP | | OTM2 | 3 OTM2 | | OTM1 | ITM1 | |
| Long OTM Call | | | | | | | |
| Long Butterfly | | | 1 | | (2) | 1 | |
| Short Butterfly | | (1) | 2 | | (1) | 1 | |

FIG. 39

Appendix 2: Short Underlying Hybrid Hedges

| | | | | | | |
|---|---|---|---|---|---|---|
| CalendarHedge4Short | | | | | | |
| Month 1 | Long OTM Put | 1 | | | | |
| | Underlying | | 45 | 50 | | |
| | Strikes | | ITM2 | ITM1 | | |
| | ProximityC | | | | | |
| | Calls | | | (1) | (100) | |
| | Puts | | | | | |
| | ProximityP | | | OTM1 | 55 OTM1 | 60 OTM2 |
| | | | | | | ITM2 |
| Month 2 | Calendar | | | | | |
| | Long Otm Put | | | 1 | | |
| | Strikes | | 45 | 50 | 55 | 60 |
| | ProximityC | | ITM2 | ITM1 | OTM1 | OTM2 |
| | Calls | | | 1 | | |
| | Puts | | | | | |
| | ProximityP | | OTM2 | OTM1 | ITM1 | ITM2 |
| BullCollar | Underlying | | | | (100) | |
| | Strikes | | 45 | 50 | 55 | 60 |
| | ProximityC | | ITM2 | ITM1 | OTM1 | OTM2 |
| | Calls | | | | (1) | |
| | Puts | | | 1 | (1) | |
| | ProximityP | | OTM2 | OTM1 | ITM1 | ITM2 |
| | Bull Spread | | | | | |
| "3Way"ButterflyHedge4ShortA | Underlying | | | | (100) | |
| | Strikes | | 45 | 50 | 55 | 60 |
| | ProximityC | | ITM2 | ITM1 | OTM1 | OTM2 |
| | Calls | | | | | |
| | Puts | | 1 | (2) | 1 | |
| | ProximityP | | OTM2 | OTM1 | ITM1 | ITM2 |

FIG. 40

Appendix 2: Short Underlying Hybrid Hedges

| | | | | | | |
|---|---|---|---|---|---|---|
| "3Way"ButterflyHedge4ShortB | Long Butterfly | 1 | | (2) | | 1 |
| | Underlying | | 45 | 50 | 55 | 60 |
| | Strikes | | ITM2 | ITM1 | OTM1 | OTM2 |
| | ProximityC | | 1 | | | |
| | Calls | | | | | |
| | Puts | | | (2) | 1 | |
| | ProximityP | | OTM2 | OTM1 | ITM1 | ITM2 |
| | Long Butterfly | 1 | | (2) | | 1 |
| "4Way"ButterflyHedge4Short | Underlying | | 45 | 50 | 55 | 60 |
| | Strikes | | ITM2 | ITM1 | OTM1 | OTM2 |
| | ProximityC | | 1 | (1) | | |
| | Calls | | | (1) | | |
| | Puts | | | | 1 | |
| | ProximityP | | OTM2 | OTM1 | ITM1 | ITM2 |
| | Long Butterfly | 1 | | (2) | | 1 |
| "4Way"CondorHedge4ShortA | Underlying | | 45 | 50 | 55 | 60 |
| | Strikes | | ITM2 | ITM1 | OTM1 | OTM2 |
| | ProximityC | | 1 | (1) | | |
| | Calls | | | | (1) | 1 |
| | Puts | | | | (1) | |
| | ProximityP | | OTM2 | OTM1 | ITM1 | ITM2 |
| | Long Condor | 1 | | (1) | (1) | 1 |

FIG. 41

Appendix 2: Short Underlying Hybrid Hedges

"4Way"CondorHedge4ShortB

| | | | | | |
|---|---|---|---|---|---|
| Underlying Strikes | 45 | 50 | (100) | 55 | 60 |
| ProximityC | ITM2 | ITM1 | | OTM1 | OTM2 |
| Calls | 1 | (1) | | (1) | 1 |
| Puts | OTM2 | OTM1 | | ITM1 | ITM2 |
| ProximityP | 1 | (1) | | (1) | 1 |
| Long Condor | | | | | |

"4Way"CondorHedge4ShortC

| | | | | | |
|---|---|---|---|---|---|
| Underlying Strikes | 45 | 50 | (100) | 55 | 60 |
| ProximityC | ITM2 | ITM1 | | OTM1 | OTM2 |
| Calls | 1 | (1) | | (1) | 1 |
| Puts | OTM2 | OTM1 | | ITM1 | ITM2 |
| ProximityP | 1 | (1) | | (1) | 1 |
| Long Condor | | | | | |

"4Way"CondorHedge4ShortD

| | | | | | |
|---|---|---|---|---|---|
| Underlying Strikes | 45 | 50 | (100) | 55 | 60 |
| ProximityC | ITM2 | ITM1 | | OTM1 | OTM2 |
| Calls | 1 | (1) | | (1) | 1 |
| Puts | OTM2 | OTM1 | | ITM1 | ITM2 |
| ProximityP | 1 | (1) | | (1) | 1 |
| Long Condor | | | | | |

"3Way"CalendarizedButterflyHedge4ShortA

| | | |
|---|---|---|
| Underlying | (100) | |

FIG. 42

Appendix 2: Short Underlying Hybrid Hedges

Month 1

| | | | | |
|---|---|---|---|---|
| Strikes | 45 | 50 | 55 | 60 |
| ProximityC | ITM2 | ITM1 | OTM1 | OTM2 |
| Calls | | | | |
| Puts | | | | |
| ProximityP | OTM2 | OTM1 | ITM1 | ITM2 |

Month 2

Calendar Long Butterfly

| | | | |
|---|---|---|---|
| Strikes | 45 | 50 | 55 |
| ProximityC | ITM2 | ITM1 | OTM1 |
| Calls | | | |
| Puts | 1 | (2) | 1 |
| ProximityP | OTM2 | OTM1 | ITM1 |

"3Way"CalendarizedButterflyHedge4ShortB

Month 1

| | | | | |
|---|---|---|---|---|
| Underlying | | (100) | | |
| Strikes | 45 | 50 | 55 | 60 |
| ProximityC | ITM2 | ITM1 | OTM1 | OTM2 |
| Calls | | | | |
| Puts | | (2) | | |
| ProximityP | OTM2 | OTM1 | ITM1 | ITM2 |

Month 2

Calendar Long Butterfly

| | | | |
|---|---|---|---|
| Strikes | 45 | 50 | 55 |
| ProximityC | ITM2 | ITM1 | OTM1 |
| Calls | | | |
| Puts | 1 | (2) | 1 |
| ProximityP | OTM2 | OTM1 | ITM1 |

"4Way"CalendarizedButterflyHedge4Short

Month 1

| | | | | |
|---|---|---|---|---|
| Underlying | | (100) | | |
| Strikes | 45 | 50 | 55 | 60 |
| ProximityC | ITM2 | ITM1 | OTM1 | OTM2 |

FIG. 43

Appendix 2: Short Underlying Hybrid Hedges

|  |  | OTM2 | OTM1 | ITM1 | ITM2 |
|---|---|---|---|---|---|
|  | Calls |  | (1) |  |  |
|  | Puts |  | (1) |  |  |
|  | ProximityP |  | OTM1 | ITM1 | ITM2 |

Month 2

|  |  |  |  |  |  |
|---|---|---|---|---|---|
| Calendar Long Otm Put | Strikes | 45 | 50 | 55 | 60 |
|  | ProximityC | ITM2 | ITM1 | OTM1 | OTM2 |
|  | Calls |  |  | 1 |  |
|  | Puts | 1 |  |  |  |
|  | ProximityP | OTM2 | OTM1 | ITM1 | ITM2 |

"4Way"CalendarizedCondorHedge4ShortA
Month 1

|  |  |  |  |  |  |
|---|---|---|---|---|---|
| Underlying |  |  | (100) |  |  |
|  | Strikes | 45 | 50 | 55 | 60 |
|  | ProximityC | ITM2 | ITM1 | OTM1 | OTM2 |
|  | Calls |  |  |  |  |
|  | Puts |  |  |  |  |
|  | ProximityP | OTM2 | OTM1 | ITM1 | ITM2 |

Month 2

|  |  |  |  |  |  |
|---|---|---|---|---|---|
| Calendar Long Condor | Strikes | 45 | 50 | 55 | 60 |
|  | ProximityC | ITM2 | ITM1 | OTM1 | OTM2 |
|  | Calls | 1 | (1) | (1) | 1 |
|  | Puts |  |  |  |  |
|  | ProximityP | OTM2 | OTM1 | ITM1 | ITM2 |

"4Way"CalendarizedCondorHedge4ShortB
Month 1

|  |  |  |  |  |  |
|---|---|---|---|---|---|
| Underlying |  |  | (100) |  |  |
|  | Strikes | 45 | 50 | 55 | 60 |
|  | ProximityC | ITM2 | ITM1 | OTM1 | OTM2 |
|  | Calls | 1 | (1) | (1) | 1 |
|  | Puts |  |  |  |  |

FIG. 44

Appendix 2: Short Underlying Hybrid Hedges

|  |  | OTM2 | OTM1 |  | ITM1 | ITM2 |
|---|---|---|---|---|---|---|
| Month 2 | ProximityP |  |  |  |  |  |
|  | Calendar Long Condor Strikes | 45 | 50 |  | 55 | 60 |
|  | ProximityC Calls | 1 | (1) |  | (1) | 1 |
|  | Puts | ITM2 | ITM1 |  | OTM1 | OTM2 |
|  | ProximityP | 1 |  |  |  | 1 |

"4Way"CalendarizedCondorHedge4ShortC

|  |  | OTM2 | OTM1 |  | ITM1 | ITM2 |
|---|---|---|---|---|---|---|
| Month 1 | Underlying Strikes | 45 | 50 |  | 55 | 60 |
|  | ProximityC Calls | ITM2 | ITM1 | (1oo) | OTM1 | OTM2 |
|  | Puts |  | (1) |  |  |  |
|  | ProximityP | 1 | OTM1 |  | ITM1 | 1 |
| Month 2 | Calendar Long Condor Strikes |  |  |  |  |  |
|  |  | 1 | (1) |  | (1) | 1 |
|  | ProximityC Calls | 45 | 50 |  | 55 | 60 |
|  | Puts | ITM2 | ITM1 |  | OTM1 | OTM2 |
|  | ProximityP | 1 |  |  |  | 1 |

"4Way"CalendarizedCondorHedge4ShortC

|  |  | OTM2 | OTM1 |  | ITM1 | ITM2 |
|---|---|---|---|---|---|---|
| Month 1 | Underlying Strikes | 45 | 50 | (1oo) | 55 | 60 |
|  | ProximityC Calls | ITM2 | ITM1 |  | OTM1 | OTM2 |
|  | Puts |  | (1) |  |  |  |
|  | ProximityP | OTM2 | OTM1 |  | ITM1 | ITM2 |

FIG. 45

Appendix 2: Short Underlying Hybrid Hedges

Month 2

| | Strikes | 45 | 50 | 55 | 60 |
|---|---|---|---|---|---|
| Calendar – Long Condor | ProximityC | ITM2 | ITM1 | OTM1 | OTM2 |
| | Calls | 1 | (1) | (1) | 1 |
| | Puts | | | | |
| | ProximityP | OTM2 | ITM1 | OTM1 | ITM2 |

3K"3Way"Ratioed(1x2)VerticalsHedge4ShortA  (1oo)

| | Strikes | 45 | 50 | 55 | 60 |
|---|---|---|---|---|---|
| Underlying | ProximityC | ITM2 | ITM1 | OTM1 | OTM2 |
| | Calls | | | 1 | |
| | Puts | 2 | (3) | | |
| | ProximityP | OTM2 | OTM1 | ITM1 | ITM2 |
| | Bull Vertical | 1 | (1) | | |
| | Long Butterfly | 1 | (2) | 1 | |

3K"3Way"Ratioed(1x2)VerticalsHedge4ShortB  (2oo)

| | Strikes | 45 | 50 | 55 | 60 |
|---|---|---|---|---|---|
| Underlying | ProximityC | ITM2 | ITM1 | OTM1 | OTM2 |
| | Calls | 2 | (3) | 1 | |
| | Puts | | | | |
| | ProximityP | OTM2 | OTM1 | ITM1 | ITM2 |
| | Bull Vertical | 1 | (1) | | |
| | Long Butterfly | 1 | (2) | 1 | |

3K"3Way"Ratioed(1x2)VerticalsHedge4ShortC  (3oo)

| | Strikes | 45 | 50 | 55 | 60 |
|---|---|---|---|---|---|
| Underlying | ProximityC | ITM2 | ITM1 | OTM1 | OTM2 |

FIG. 46

Appendix 2: Short Underlying Hybrid Hedges

3K"3Way"Ratioed(1x2)VerticalsHedge4ShortA

|  |  |  |  |
|---|---|---|---|
| Calls | 2 | (3) |  |
| Puts | OTM2 | OTM1 | ITM1 |
| ProximityP | 1 | (1) | 1 |
| Bull Vertical |  | (2) |  |
| Long Butterfly | 1 |  |  |
|  |  | (100) |  |

3K4Way"Ratioed(1x2)VerticalsHedge4ShortB

| Underlying |  |  |  |  |
|---|---|---|---|---|
| Strikes | 45 | 50 | 55 | 60 |
| ProximityC | ITM2 | ITM1 | OTM1 | OTM2 |
| Calls | 1 | (3) | 1 |  |
| Puts | 1 | (1) |  |  |
| ProximityP | OTM2 | OTM1 | ITM1 | ITM2 |
| Bull Vertical | 1 | (1) |  | 1 |
| Long Butterfly | 1 | (2) |  |  |
|  |  | (100) |  |  |

3K4Way"Ratioed(1x2)VerticalsHedge4ShortB

| Underlying |  |  |  |  |
|---|---|---|---|---|
| Strikes | 45 | 50 | 55 | 60 |
| ProximityC | OTM2 | ITM1 | OTM1 | OTM2 |
| Calls | 2 | (2) |  |  |
| Puts | 1 | (1) | 1 |  |
| ProximityP | OTM2 | OTM1 | ITM1 | ITM2 |
| Bull Vertical | 1 | (1) |  | 1 |
| Long Butterfly | 1 | (2) |  |  |
|  |  | (100) |  |  |

3K4Way"Ratioed(1x2)VerticalsHedge4ShortC

| Underlying |  |  |  |  |
|---|---|---|---|---|
| Strikes | 45 | 50 | 55 | 60 |
| ProximityC | ITM2 | ITM1 | OTM1 | OTM2 |
| Calls | 2 | (1) | 1 |  |
|  |  | (200) |  |  |

FIG. 47

Appendix 2: Short Underlying Hybrid Hedges

"3K3Way"Ratioed(2x1)VerticalsHedge4ShortA

|  | OTM2 | OTM1 | ITM1 | ITM2 |
|---|---|---|---|---|
| Puts | 1 | (2) |  | 1 |
| ProximityP | 1 | (1) |  |  |
| Bull Vertical |  | (2) |  |  |
| Long Butterfly |  |  |  |  |

"3K3Way"Ratioed(2x1)VerticalsHedge4ShortB

|  | 45 ITM2 | 50 ITM1 | 55 OTM1 | 60 OTM2 |
|---|---|---|---|---|
| Underlying |  | (1oo) |  |  |
| Strikes |  |  |  |  |
| ProximityC |  |  | 1 |  |
| Calls |  |  | 1 |  |
| Puts | 1 | (3) |  |  |
| ProximityP | 1 | (1) |  |  |
| Bear Vertical | 1 | (2) |  |  |
| Long Butterfly |  |  |  |  |

"3K3Way"Ratioed(2x1)VerticalsHedge4ShortB

|  | 45 ITM2 | 50 ITM1 | 55 OTM1 | 60 OTM2 |
|---|---|---|---|---|
| Underlying |  | (2oo) |  |  |
| Strikes |  |  |  |  |
| ProximityC |  |  | 2 |  |
| Calls |  | (3) |  |  |
| Puts | 1 | (1) |  |  |
| ProximityP | 1 | (2) |  |  |
| Bear Vertical |  |  |  |  |
| Long Butterfly |  |  |  |  |

"3K3Way"Ratioed(2x1)VerticalsHedge4ShortA

|  | 45 OTM2 | 50 OTM1 | 55 ITM1 | 60 ITM2 |
|---|---|---|---|---|
| Underlying |  | (3oo) |  |  |
| Strikes |  |  |  |  |
| ProximityC | 1 | (3) |  |  |
| Calls |  | (1) | 2 |  |
| Puts |  | (2) | 1 |  |
| ProximityP | 1 |  |  | 1 |

FIG. 48

Appendix 2: Short Underlying Hybrid Hedges

|  | | | | | |
|---|---|---|---|---|---|
| Bear Vertical | | (1) | | 1 | |
| Long Butterfly | 1 | (2) | | 1 | |

"3K4Way"Ratioed(2x1)VerticalsHedge4ShortB

| | 45 | 50 | | 55 | 60 |
|---|---|---|---|---|---|
| Underlying Strikes | ITM2 | ITM1 | (100) | OTM1 | OTM2 |
| ProximityC | 2 | (2) | | 1 | |
| Calls | | (1) | | | |
| Puts | | OTM1 | | ITM1 | ITM2 |
| ProximityP | | (1) | | 1 | |
| Bear Vertical | 1 | (2) | | 1 | |
| Long Butterfly | | | | | |

"3K4Way"Ratioed(2x1)VerticalsHedge4ShortC

| | 45 | 50 | | 55 | 60 |
|---|---|---|---|---|---|
| Underlying Strikes | ITM2 | ITM1 | (100) | OTM1 | OTM2 |
| ProximityC | 1 | (3) | | 1 | |
| Calls | | (1) | | 1 | |
| Puts | | OTM1 | | ITM1 | ITM2 |
| ProximityP | 1 | (2) | | 1 | |
| Bear Vertical | | | | | |
| Long Butterfly | | | | | |

"3K4Way"Ratioed(2x1)VerticalsHedge4ShortB

| | 45 | 50 | | 55 | 60 |
|---|---|---|---|---|---|
| Underlying Strikes | ITM2 | ITM1 | (200) | OTM1 | OTM2 |
| ProximityC | 1 | (1) | | 2 | |
| Calls | | (2) | | | |
| Puts | | OTM1 | | ITM1 | ITM2 |
| ProximityP | 1 | (1) | | 1 | |
| Bear Vertical | | (2) | | 1 | |
| Long Butterfly | | | | | |

FIG. 49

Appendix 2: Short Underlying Hybrid Hedges

3K"3Way"Ratioed(2x3)VerticalsHedge4ShortA

| Underlying | | | (100) | | |
|---|---|---|---|---|---|
| Strikes | 45 | 50 | | 55 | 60 |
| ProximityC | ITM2 | ITM1 | | OTM1 | OTM2 |
| Calls | 3 | (5) | | 1 | |
| Puts | OTM2 | OTM1 | | ITM1 | ITM2 |
| ProximityP | 1 | (1) | | 1 | |
| Bull Vertical | 2 | (4) | | 2 | |
| Long Butterfly | | | | | |

3K"3Way"Ratioed(2x3)VerticalsHedge4ShortB

| Underlying | | | (100) | | |
|---|---|---|---|---|---|
| Strikes | 45 | 50 | | 55 | 60 |
| ProximityC | ITM2 | ITM1 | | OTM1 | OTM2 |
| Calls | 1 | (5) | | 2 | |
| Puts | OTM2 | OTM1 | | ITM1 | ITM2 |
| ProximityP | 2 | (1) | | | |
| Bull Vertical | 1 | (4) | | 2 | |
| Long Butterfly | 2 | | | | |

3K"3Way"Ratioed(2x3)VerticalsHedge4ShortC

| Underlying | | | (200) | | |
|---|---|---|---|---|---|
| Strikes | 45 | 50 | | 55 | 60 |
| ProximityC | ITM2 | ITM1 | | OTM1 | OTM2 |
| Calls | 2 | (5) | | 2 | |
| Puts | OTM2 | OTM1 | | ITM1 | ITM2 |
| ProximityP | 1 | (1) | | | |
| Bull Vertical | 2 | (4) | | 2 | |
| Long Butterfly | | | | | |

FIG. 50

Appendix 2. Short Underlying Hybrid Hedges

3K"3Way"Ratioed(2x3)VerticalsHedge4ShortA

|  | 45 | 50 | (2oo) | 55 | 60 |
|---|---|---|---|---|---|
| Underlying Strikes | ITM2 | ITM1 | | OTM1 | OTM2 |
| ProximityC Calls | 3 | (5) | | 2 | |
| Puts | | | | | |
| ProximityP | OTM2 | OTM1 | | ITM1 | ITM2 |
| Bull Vertical | 1 | (1) | | | |
| Long Butterfly | 2 | (4) | | 2 | |

3K"3Way"Ratioed(2x3)VerticalsHedge4ShortB

|  | 45 | 50 | (3oo) | 55 | 60 |
|---|---|---|---|---|---|
| Underlying Strikes | ITM2 | ITM1 | | OTM1 | OTM2 |
| ProximityC Calls | 3 | (5) | | 2 | |
| Puts | | | | | |
| ProximityP | OTM2 | OTM1 | | ITM1 | ITM2 |
| Bull Vertical | 1 | (1) | | | |
| Long Butterfly | 2 | (4) | | 2 | |

3K"4Way"Ratioed(3x2)VerticalsHedge4ShortA

|  | 45 | 50 | (1oo) | 55 | 60 |
|---|---|---|---|---|---|
| Underlying Strikes | ITM2 | ITM1 | | OTM1 | OTM2 |
| ProximityC Calls | 2 | (5) | | 1 | |
| Puts | | | | 2 | |
| ProximityP | OTM2 | OTM1 | | ITM1 | ITM2 |
| Bear Vertical | | (1) | | 1 | |
| Long Butterfly | 2 | (4) | | 2 | |

3K"4Way"Ratioed(3x2)VerticalsHedge4ShortB

|  | 45 | 50 | (1oo) | 55 | 60 |
|---|---|---|---|---|---|
| Underlying Strikes | 45 | 50 | | 55 | 60 |

FIG. 51

Appendix 2: Short Underlying Hybrid Hedges

|  | ITM2 | ITM1 | | OTM1 | OTM2 |
|---|---|---|---|---|---|
| ProximityC | | | | | |
| Calls | 1 | (5) | | 3 | |
| Puts | 1 | (1) | | 1 | |
| ProximityP | OTM2 | OTM1 | | ITM1 | ITM2 |
| Bear Vertical | | (4) | | 2 | |
| Long Butterfly | 2 | | | | |

"3K"4Way"Ratioed(3x2)VerticalsHedge4ShortC

| Underlying | | | (2oo) | | |
|---|---|---|---|---|---|
| Strikes | 45 | 50 | | 55 | 60 |
|  | ITM2 | ITM1 | | OTM1 | OTM2 |
| ProximityC | | | | | |
| Calls | 2 | (5) | | 3 | |
| Puts | | (1) | | 1 | |
| ProximityP | OTM2 | OTM1 | | ITM1 | ITM2 |
| Bear Vertical | | (4) | | 2 | |
| Long Butterfly | 2 | | | | |

"3K3Way"Ratioed(3x2)VerticalsHedge4ShortA

| Underlying | | | (2oo) | | |
|---|---|---|---|---|---|
| Strikes | 45 | 50 | | 55 | 60 |
|  | ITM2 | ITM1 | | OTM1 | OTM2 |
| ProximityC | | | | | |
| Calls | 2 | (5) | | 2 | |
| Puts | | (1) | | 1 | |
| ProximityP | OTM2 | OTM1 | | ITM1 | ITM2 |
| Bear Vertical | | (4) | | 2 | |
| Long Butterfly | 2 | | | | |

"3K3Way"Ratioed(3x2)VerticalsHedge4ShortB

| Underlying | | | (3oo) | | |
|---|---|---|---|---|---|
| Strikes | 45 | 50 | | 55 | 60 |
|  | ITM2 | ITM1 | | OTM1 | OTM2 |
| ProximityC | | | | | |
| Calls | | | | 3 | |

FIG. 52

Appendix 2: Short Underlying Hybrid Hedges

|  | | OTM2 | OTM1 | | ITM1 | ITM2 |
|---|---|---|---|---|---|---|
| Puts | | 2 | (5) | | 1 | |
| ProximityP | | | (1) | | 2 | |
| Bear Vertical | | 2 | (4) | | | |
| Long Butterfly | | | | | | ITM2 |

3K"3Way"Ratioed(1x3)VerticalsHedge4ShortA

|  | ITM2 | ITM1 | (100) | OTM1 | OTM2 |
|---|---|---|---|---|---|
| Underlying | | | | | |
| Strikes | 45 | 50 | | 55 | 60 |
| ProximityC | ITM2 | ITM1 | | OTM1 | OTM2 |
| Calls | | | | 1 | |
| Puts | 3 | (4) | | | |
| ProximityP | OTM2 | (2) | | | |
| Bull Vertical | 2 | (2) | | | |
| Long Butterfly | 1 | | | | ITM2 |

3K"3Way"Ratioed(1x3)VerticalsHedge4ShortA

|  | ITM2 | ITM1 | (100) | OTM1 | OTM2 |
|---|---|---|---|---|---|
| Underlying | | | | | |
| Strikes | 45 | 50 | | 55 | 60 |
| ProximityC | ITM2 | ITM1 | | OTM1 | OTM2 |
| Calls | | | | 1 | |
| Puts | 3 | (4) | | | |
| ProximityP | OTM2 | (2) | | | |
| Bull Vertical | 2 | (2) | | | |
| Long Butterfly | 1 | | | | ITM2 |

"3K3Way"Ratioed(1x3)VerticalsHedge4ShortA

|  | ITM2 | ITM1 | (100) | OTM1 | OTM2 |
|---|---|---|---|---|---|
| Underlying | | | | | |
| Strikes | 45 | 50 | | 55 | 60 |
| ProximityC | ITM2 | ITM1 | | OTM1 | OTM2 |
| Calls | | | | 1 | |
| Puts | 1 | (4) | | 2 | |
| ProximityP | OTM2 | OTM1 | | ITM1 | ITM2 |

FIG. 53

Appendix 2: Short Underlying Hybrid Hedges

"3K3Way"Ratioed(3x1)VerticalsHedge4ShortB

|                | 45 | 50  | (300) | 55 | 60 |
|----------------|----|-----|-------|----|----|
| Bull Vertical  | 2  | (2) |       |    |    |
| Long Butterfly | 1  | (2) |       | 1  |    |

4K"4Way"Ratioed(1x2)VerticalsHedge4ShortA

| Underlying Strikes | 45   | 50   |       | 55   | 60   |
|--------------------|------|------|-------|------|------|
| ProximityC         | ITM2 | ITM1 |       | OTM1 | OTM2 |
| Calls              |      | (4)  |       | 3    |      |
| Puts               | 1    |      |       |      | 1    |
| ProximityP         | OTM2 | OTM1 |       | ITM1 | ITM2 |
|                    |      |      | (100) |      |      |
| Bull Vertical      | 2    | (2)  |       | (1)  | 1    |
| Long Condor        | 1    | (1)  |       | (1)  | 1    |

4K"4Way"Ratioed(1x2)VerticalsHedge4ShortB

| Underlying Strikes | 45   | 50   |       | 55   | 60   |
|--------------------|------|------|-------|------|------|
| ProximityC         | OTM2 | ITM1 |       | OTM1 | OTM2 |
| Calls              |      | (2)  |       | (1)  | 1    |
| Puts               | 1    | (1)  |       | ITM1 | ITM2 |
| ProximityP         | OTM2 | OTM1 |       | ITM1 | ITM2 |
|                    |      |      | (100) |      |      |
| Bull Vertical      | 1    | (1)  |       | (1)  | 1    |
| Long Condor        |      |      |       |      |      |

FIG. 54

Appendix 2: Short Underlying Hybrid Hedges

4K"4Way"Ratioed(1x2)VerticalsHedge4ShortC

| Underlying | | | (100) | | |
|---|---|---|---|---|---|
| Strikes | 45 | 50 | | 55 | 60 |
| ProximityC | ITM2 | ITM1 | | OTM1 | OTM2 |
| Calls | 2 | (1) | | (1) | 1 |
| Puts | | (1) | | | |
| ProximityP | OTM2 | OTM1 | | ITM1 | ITM2 |
| Bull Vertical | 1 | (1) | | | |
| Long Condor | 1 | (1) | | (1) | 1 |

4K"4Way"Ratioed(1x2)VerticalsHedge4ShortD

| Underlying | | | (100) | | |
|---|---|---|---|---|---|
| Strikes | 45 | 50 | | 55 | 60 |
| ProximityC | ITM2 | ITM1 | | OTM1 | OTM2 |
| Calls | 2 | (2) | | (1) | 1 |
| Puts | | | | | |
| ProximityP | OTM2 | OTM1 | | ITM1 | ITM2 |
| Bull Vertical | 1 | (1) | | | |
| Long Condor | 1 | (1) | | (1) | 1 |

4K"4Way"Ratioed(2x1)VerticalsHedge4ShortA

| Underlying | | | (100) | | |
|---|---|---|---|---|---|
| Strikes | 45 | 50 | | 55 | 60 |
| ProximityC | ITM2 | ITM1 | | OTM1 | OTM2 |
| Calls | 1 | (1) | | (2) | 2 |
| Puts | | | | (1) | 1 |
| ProximityP | OTM2 | OTM1 | | ITM1 | ITM2 |
| Bear Vertical | | | | (1) | 1 |
| Long Condor | 1 | (1) | | | 1 |

FIG. 55

Appendix 2: Short Underlying Hybrid Hedges

4K"4Way"Ratioed(2x1)VerticalsHedge4ShortB

| | 45 | 50 | (100) | 55 | 60 |
|---|---|---|---|---|---|
| Underlying | | | | | |
| Strikes | | | | | |
| ProximityC | ITM2 | ITM1 | | OTM1 | OTM2 |
| Calls | | | | (2) | 2 |
| Puts | | | | | |
| ProximityP | OTM2 | OTM1 | | ITM1 | ITM2 |
| Bear Vertical | 1 | (1) | | (1) | 1 |
| Long Condor | 1 | | | (1) | 1 |

FIG. 56

Appendix 3: Top Weighted Option Plays

Pure Option Plays

| | | 50 ITM | 55 OTM1 | 60 OTM2 | 65 OTM3 |
|---|---|---|---|---|---|
| Slingshot 1C(2)CV | Underlying Strikes ProximityC Calls Puts ProximityP Long OTM Call Long Butterfly | 1 OTM | (2) ITM1 (2) | 2 OTM2 1 1 | OTM3 ITM3 |

| | | 50 ITM | 55 OTM1 | 60 OTM2 | 65 OTM3 |
|---|---|---|---|---|---|
| Slingshot 1C2PV | Underlying Strikes ProximityC Calls Puts ProximityP Long OTM Call Long Butterfly | 1 OTM | (2) ITM1 (2) | 2 ITM2 1 1 | OTM3 ITM3 |

| | | 50 ITM | 55 OTM1 | 60 OTM2 | 65 OTM3 |
|---|---|---|---|---|---|
| Slingshot 2 Strangles vs 1 Straddle | Underlying Strikes ProximityC Calls Puts ProximityP Long OTM Call Long Butterfly | 2 OTM 1 | (1) (1) ITM1 (2) | 2 ITM2 1 1 | OTM3 ITM3 |

FIG. 57

Appendix 3: Top Weighted Option Plays

Slingshot 1C(3)CV

| | | 50 ITM | 55 OTM1 | 60 OTM2 | 65 OTM3 |
|---|---|---|---|---|---|
| Long Otm Put | 1 | | | | |
| Underlying | | | | | |
| Strikes | | | | | |
| ProximityC | | 1 | (3) | 3 | |
| Calls | | | | | |
| Puts | | | | | |
| ProximityP | | OTM | TM1 | ITM2 | ITM3 |
| Long OTM Call | | | | | 1 |
| Long Butterfly | 1 | (2) | 1 | |
| Short Butterfly | | (1) | 2 | (1) |
| Long Otm Put | | | | | |

Slingshot 1C3PV

| | 50 ITM | 55 OTM1 | 60 OTM2 | 65 OTM3 |
|---|---|---|---|---|
| Underlying | | | | |
| Strikes | | | | |
| ProximityC | 1 | (3) | 3 | |
| Calls | | | | |
| Puts | | | | |
| ProximityP | OTM | ITM1 | ITM2 | ITM3 |
| Long OTM Call | | | | 1 |
| Long Butterfly | 1 | (2) | 1 | |
| Short Butterfly | | (1) | 2 | (1) |
| Long Otm Put | | | | |

Slingshot 1C(3)CV1P

| | 50 ITM | 55 OTM1 | 60 OTM2 | 65 OTM3 |
|---|---|---|---|---|
| Underlying | | | | |
| Strikes | 1 | | | |
| ProximityC | | (3) | 3 | |
| Calls | | | | |
| Puts | | | | |
| ProximityP | OTM | ITM1 | ITM2 | ITM3 |
| Long OTM Call | 1 | (2) | 1 | 1 |
| Long Butterfly | | | | |

FIG. 58

Appendix 3: Top Weighted Option Plays

Slingshot 2P3PV

| | | | | | |
|---|---|---|---|---|---|
| Short Butterfly | | | | 2 | (1) |
| Long Otm Put | 1 | (1) | | | |

| | | | | |
|---|---|---|---|---|
| Underlying | 50 | 55 | 60 | 65 |
| Strikes | ITM | OTM1 | OTM2 | OTM3 |
| ProximityC | 1 | | | |
| Calls | | | | |
| Puts | 1 | | | |
| ProximityP | OTM | (3) ITM1 | 3 ITM2 | ITM3 |
| Long OTM Call | | | | 1 |
| Long Butterfly | 1 | (2) | 1 | |
| Short Butterfly | | (1) | 2 | (1) |
| Long Otm Put | 1 | | | |

3K"3Way"Ratioed(1x2)VerticalsAU (Up)

| | | | | |
|---|---|---|---|---|
| Underlying | 50 | 55 | 60 | 65 |
| Strikes | ITM | OTM1 | OTM2 | OTM3 |
| ProximityC | 1 | (3) | 2 | |
| Calls | | | | |
| Puts | | | | |
| ProximityP | OTM | ITM1 | ITM2 | ITM3 |
| Bear Vertical | | (1) | 1 | |
| Long Butterfly | 1 | (2) | 1 | |

3K"3Way"Ratioed(1x2)VerticalsBU

| | | | | |
|---|---|---|---|---|
| Underlying | 50 | 55 | 60 | 65 |
| Strikes | ITM | OTM1 | OTM2 | OTM3 |
| ProximityC | 1 | (3) | 2 | |
| Calls | | | | |
| Puts | | | | |
| ProximityP | OTM | (1) | 1 | |
| Bear Vertical | | | | |

FIG. 59

Appendix 3: Top Weighted Option Plays

| | | | | | |
|---|---|---|---|---|---|
| 3K"4Way"Ratioed(1x2)VerticalsAU | | | | | |
| Long Butterfly | | 1 | (2) | 1 | |
| Underlying | | 50 | 55 | 60 | 65 |
| Strikes | | ITM | OTM1 | OTM2 | OTM3 |
| ProximityC | | | (2) | 2 | |
| Calls | | 1 | (1) | | |
| Puts | | | ITM1 | ITM2 | ITM3 |
| ProximityP | | OTM | (1) | 1 | |
| Bear Vertical | | 1 | (2) | 1 | |
| Long Butterfly | | | | | |
| | | | | | |
| 3K"4Way"Ratioed(1x2)VerticalsBU | | | | | |
| Underlying | | 50 | 55 | 60 | 65 |
| Strikes | | ITM | OTM1 | OTM2 | OTM3 |
| ProximityC | | 1 | (1) | | |
| Calls | | | (2) | 2 | |
| Puts | | | ITM1 | ITM2 | ITM3 |
| ProximityP | | OTM | (1) | 1 | |
| Bear Vertical | | 1 | (2) | 1 | |
| Long Butterfly | | | | | |
| | | | | | |
| 3K"3Way"Ratioed(2x3)VerticalsAU | | | | | |
| Underlying | | 50 | 55 | 60 | 65 |
| Strikes | | ITM | OTM1 | OTM2 | OTM3 |
| ProximityC | | 2 | (5) | 3 | |
| Calls | | | | | |
| Puts | | | ITM1 | ITM2 | ITM3 |
| ProximityP | | OTM | (1) | 1 | |
| Bear Vertical | | 2 | (4) | 2 | |
| Long Butterfly | | | | | |

FIG. 60

Appendix 3: Top Weighted Option Plays

3K"4Way"Ratioed(2x3)VerticalsBU

| | | | | | |
|---|---|---|---|---|---|
| Underlying | | | | | |
| Strikes | 50 | 55 | 60 | 65 | |
| ProximityC | ITM | OTM1 | OTM2 | OTM3 | |
| Calls | | (3) | 3 | | |
| Puts | | (2) | | | |
| ProximityP | OTM | ITM1 | ITM2 | ITM3 | |
| Bear Vertical | | (1) | 1 | | |
| Long Butterfly | 2 | (4) | 2 | | |

3K"3Way"Ratioed(2x3)VerticalsCU

| | | | | |
|---|---|---|---|---|
| Underlying | | | | |
| Strikes | 50 | 55 | 60 | 65 |
| ProximityC | ITM | OTM1 | OTM2 | OTM3 |
| Calls | | (5) | 3 | |
| Puts | | | | |
| ProximityP | OTM | ITM1 | ITM2 | ITM3 |
| Bear Vertical | | (1) | 1 | |
| Long Butterfly | 2 | (4) | 2 | |

3K"3Way"Ratioed(1x3)VerticalsAU

| | | | | |
|---|---|---|---|---|
| Underlying | | | | |
| Strikes | 50 | 55 | 60 | 65 |
| ProximityC | ITM | OTM1 | OTM2 | OTM3 |
| Calls | 1 | (4) | 3 | |
| Puts | | | | |
| ProximityP | OTM | ITM1 | ITM2 | ITM3 |
| Bear Vertical | | (2) | 2 | |
| Long Butterfly | 1 | (2) | 1 | |

FIG. 61

Appendix 3: Top Weighted Option Plays

3K"3Way"Ratioed(1x3)VerticalsBU

| | 50 | 55 | 60 | 65 |
|---|---|---|---|---|
| Underlying | | | | |
| Strikes | ITM | OTM1 | OTM2 | OTM3 |
| ProximityC | | | | |
| Calls | 1 | (4) | 3 | |
| Puts | OTM | ITM1 | ITM2 | ITM3 |
| ProximityP | | (2) | 2 | |
| Bear Vertical | 1 | (2) | 1 | |
| Long Butterfly | | | | |

3K"4Way"Ratioed(1x3)VerticalsBU

| | 50 | 55 | 60 | 65 |
|---|---|---|---|---|
| Underlying | | | | |
| Strikes | ITM | OTM1 | OTM2 | OTM3 |
| ProximityC | | | | |
| Calls | 1 | (3) | 3 | |
| Puts | OTM | ITM1 | ITM2 | ITM3 |
| ProximityP | | (1) | | |
| Bear Vertical | 1 | (2) | 2 | |
| Long Butterfly | | (2) | 1 | |

4K"4Way"Ratioed(1x2)VerticalsAU

| | 50 | 55 | 60 | 65 |
|---|---|---|---|---|
| Underlying | | | | |
| Strikes | ITM | OTM1 | OTM2 | OTM3 |
| ProximityC | | | | 2 |
| Calls | 1 | (1) | (2) | ITM3 |
| Puts | OTM | ITM1 | ITM2 | 1 |
| ProximityP | | | (1) | |
| Bear Vertical | 1 | (1) | (1) | 1 |
| Long Condor | | | | |

FIG. 62

Appendix 3: Top Weighted Option Plays

4K"4Way"Ratioed(1x2)VerticalsBU

| Underlying | 50 | 55 | 60 | 65 |
|---|---|---|---|---|
| Strikes | ITM | OTM1 | OTM2 | OTM3 |
| ProximityC | 1 | (1) | (2) | 2 |
| Calls | | | | |
| Puts | | | | |
| ProximityP | OTM | ITM1 | ITM2 | ITM3 |
| Bear Vertical | | (1) | (1) | 1 |
| Long Condor | 1 | | (1) | 1 |

4K"4Way"Ratioed(1x2)VerticalsCU

| Underlying | 50 | 55 | 60 | 65 |
|---|---|---|---|---|
| Strikes | ITM | OTM1 | OTM2 | OTM3 |
| ProximityC | 1 | (1) | (2) | 2 |
| Calls | | | | |
| Puts | | | | |
| ProximityP | OTM | ITM1 | ITM2 | ITM3 |
| Bear Vertical | | (1) | (1) | 1 |
| Long Condor | 1 | | (1) | 1 |

4K"4Way"Ratioed(1x2)VerticalsDU

| Underlying | 50 | 55 | 60 | 65 |
|---|---|---|---|---|
| Strikes | ITM | OTM1 | OTM2 | OTM3 |
| ProximityC | 1 | (1) | (2) | 2 |
| Calls | | | (2) | |
| Puts | | | ITM2 | ITM3 |
| ProximityP | OTM | ITM1 | (1) | 1 |
| Bear Vertical | | (1) | (1) | 1 |
| Long Condor | 1 | | | |

FIG. 63

*Appendix 4: Bottom Weighted Option Plays*

Pure Option Plays

Slingshot 1P(2)PV

|  | 45 | 50 | 55 | 60 |
|---|---|---|---|---|
| Underlying Strikes | ITM2 | ITM1 | OTM1 | OTM2 |
| ProximityC |  |  |  |  |
| Calls |  |  |  |  |
| Puts | 2 | (2) |  |  |
| ProximityP | OTM2 | OTM1 | ITM1 | ITM2 |
| Long Butterfly | 1 | (2) | 1 |  |
| Long OTM Put | 1 |  |  |  |

Slingshot 1P2CV

|  | 45 | 50 | 55 | 60 |
|---|---|---|---|---|
| Underlying Strikes | ITM2 | ITM1 | OTM1 | OTM2 |
| ProximityC |  |  |  |  |
| Calls | 2 | (2) |  |  |
| Puts |  |  |  |  |
| ProximityP | OTM2 | OTM1 | ITM1 | ITM2 |
| Long Butterfly | 1 | (2) | 1 |  |
| Long OTM Put | 1 |  |  |  |

Slingshot 2 Gut Strangles vs 1 Straddle

|  | 45 | 50 | 55 | 60 |
|---|---|---|---|---|
| Underlying Strikes | ITM2 | ITM1 | OTM1 | OTM2 |
| ProximityC |  | (1) | 2 |  |
| Calls | 2 | (1) |  |  |
| Puts |  |  | 1 |  |
| ProximityP | OTM2 | OTM1 | ITM1 | ITM2 |
| Long OTM Call |  |  | 1 |  |
| Long Butterfly | 1 | (2) |  |  |
| Long OTM Put | 1 |  |  |  |

FIG. 64

Appendix 4: Bottom Weighted Option Plays

Slingshot 1P(3)PV

| | 40 | 45 | 50 | 55 |
|---|---|---|---|---|
| Underlying Strikes | 40 | 45 | 50 | 55 |
| ProximityC | ITM3 | ITM2 | ITM1 | OTM1 |
| Calls | | | | |
| Puts | | | | |
| ProximityP | OTM2 | | OTM1 | ITM1 |
| Long OTM Call | | 3 | (3) | 1 |
| Long Butterfly | (1) | 1 | (2) | |
| Short Butterfly | 1 | 2 | (1) | |
| Long OTM Put | | | | |

Slingshot 1P3CV

| | 40 | 45 | 50 | 55 |
|---|---|---|---|---|
| Underlying Strikes | 40 | 45 | 50 | 55 |
| ProximityC | ITM3 | ITM2 | ITM1 | OTM1 |
| Calls | | | | |
| Puts | | | | |
| ProximityP | OTM2 | 3 | OTM1 | ITM1 |
| Long OTM Call | | | (3) | 1 |
| Long Butterfly | (1) | 1 | (2) | |
| Short Butterfly | 1 | 2 | (1) | |
| Long OTM Put | | | | |

Slingshot 1C1P(3)PV

| | 40 | 45 | 50 | 55 |
|---|---|---|---|---|
| Underlying Strikes | 40 | 45 | 50 | 55 |
| ProximityC | ITM3 | ITM2 | ITM1 | OTM1 |
| Calls | | | | 1 |
| Puts | | | | 1 |
| ProximityP | OTM2 | 3 | OTM1 | ITM1 |
| Long OTM Call | | | (3) | 1 |
| Long Butterfly | (1) | 1 | (2) | |
| Short Butterfly | | 2 | (1) | |

FIG. 65

Appendix 4: Bottom Weighted Option Plays

**Slingshot
1C1P3CV**

| | | | | (100) | | |
|---|---|---|---|---|---|---|
| Long OTM Put | | | | | | |
| Underlying | | | | | | |
| Strikes | | 40 | 45 | | 50 | 55 |
| ProximityC | | ITM3 | ITM2 | | ITM1 | OTM1 |
| Calls | | | 3 | | (3) | 1 |
| Puts | | | | | | 1 |
| ProximityP | OTM2 | 3 | OTM2 | | | |
| Long OTM Call | | | | | OTM1 | ITM1 |
| Long Butterfly | | (1) | 1 | | (2) | 1 |
| Short Butterfly | | 1 | 2 | | (1) | |
| Long OTM Put | | | | | | |

3K"3Way"Ratioed(1x2)VerticalsAD (Down)

| | | | | | |
|---|---|---|---|---|---|
| Underlying | | | | | |
| Strikes | 45 | 50 | | 55 | 60 |
| ProximityC | ITM2 | ITM1 | | OTM1 | OTM2 |
| Calls | 2 | (3) | | 1 | |
| Puts | | (1) | | 1 | |
| ProximityP | OTM2 | OTM1 | | ITM1 | ITM2 |
| Bull Vertical | 1 | (1) | | | |
| Long Butterfly | 1 | (2) | | 1 | |

3K"3Way"Ratioed(1x2)VerticalsBD

| | | | | | |
|---|---|---|---|---|---|
| Underlying | | | | | |
| Strikes | 45 | 50 | | 55 | 60 |
| ProximityC | ITM2 | ITM1 | | OTM1 | OTM2 |
| Calls | 2 | (3) | | 1 | |
| Puts | | (1) | | 1 | |
| ProximityP | OTM2 | OTM1 | | ITM1 | ITM2 |
| Bull Vertical | 1 | (1) | | | |
| Long Butterfly | 1 | (2) | | 1 | |

FIG. 66

Appendix 4: Bottom Weighted Option Plays

3K"4Way"Ratioed(1x2)VerticalsAD

| Underlying | | | | |
|---|---|---|---|---|
| Strikes | 45 | 50 | 55 | 60 |
| ProximityC | ITM2 | ITM1 | OTM1 | OTM2 |
| Calls | 2 | (1) | 1 | |
| Puts | | (2) | | |
| ProximityP | OTM2 | OTM1 | ITM1 | ITM2 |
| Bull Vertical | 1 | (1) | | |
| Long Butterfly | 1 | (2) | 1 | |

3K"4Way"Ratioed(1x2)VerticalsBD

| Underlying | | | | |
|---|---|---|---|---|
| Strikes | 45 | 50 | 55 | 60 |
| ProximityC | ITM2 | ITM1 | OTM1 | OTM2 |
| Calls | 2 | (2) | | |
| Puts | | (1) | 1 | |
| ProximityP | OTM2 | OTM1 | ITM1 | ITM2 |
| Bull Vertical | 1 | (1) | | |
| Long Butterfly | 1 | (2) | 1 | |

3K"3Way"Ratioed(2x3)VerticalsAD

| Underlying | | | | |
|---|---|---|---|---|
| Strikes | 45 | 50 | 55 | 60 |
| ProximityC | ITM2 | ITM1 | OTM1 | OTM2 |
| Calls | 3 | (5) | 2 | |
| Puts | | (1) | | |
| ProximityP | OTM2 | OTM1 | ITM1 | ITM2 |
| Bull Vertical | 1 | | | |
| Long Butterfly | 2 | (4) | 2 | |

FIG. 67

Appendix 4: Bottom Weighted Option Plays

3K"4Way"Ratioed(2x3)VerticalsBD

| | 45 | 50 | 55 | 60 |
|---|---|---|---|---|
| Underlying | | | | |
| Strikes | ITM2 | ITM1 | OTM1 | OTM2 |
| ProximityC | | (2) | 2 | |
| Calls | | (3) | | |
| Puts | | | | |
| ProximityP | OTM2 | OTM1 | ITM1 | ITM2 |
| Bull Vertical | 1 | (1) | | |
| Long Butterfly | 2 | (4) | 2 | |

3K"3Way"Ratioed(2x3)VerticalsCD

| | 45 | 50 | 55 | 60 |
|---|---|---|---|---|
| Underlying | | | | |
| Strikes | ITM2 | ITM1 | OTM1 | OTM2 |
| ProximityC | | (5) | 2 | |
| Calls | | | | |
| Puts | 3 | | | |
| ProximityP | OTM2 | OTM1 | ITM1 | ITM2 |
| Bull Vertical | 1 | (1) | | |
| Long Butterfly | 2 | (4) | 2 | |

3K"3Way"Ratioed(1x3)VerticalsAD

| | 45 | 50 | 55 | 60 |
|---|---|---|---|---|
| Underlying | | | | |
| Strikes | ITM2 | ITM1 | OTM1 | OTM2 |
| ProximityC | | (4) | 1 | |
| Calls | | | | |
| Puts | 3 | | | |
| ProximityP | OTM2 | OTM1 | ITM1 | ITM2 |
| Bull Vertical | 2 | (2) | | |
| Long Butterfly | 1 | (2) | 1 | |

FIG. 68

*Appendix 4: Bottom Weighted Option Plays*

3K"3Way"Ratioed(1x3)VerticalsBD

| Underlying | 45 | 50 | 55 | 60 |
|---|---|---|---|---|
| Strikes | ITM2 | ITM1 | OTM1 | OTM2 |
| ProximityC | | | | |
| Calls | 3 | (4) | 1 | |
| Puts | | | ITM1 | ITM2 |
| ProximityP | OTM2 | OTM1 | | |
| Bull Vertical | 2 | (2) | 1 | |
| Long Butterfly | 1 | (2) | | |

3K"4Way"Ratioed(1x3)PutVerticalsBD

| Underlying | 45 | 50 | 55 | 60 |
|---|---|---|---|---|
| Strikes | ITM2 | ITM1 | OTM1 | OTM2 |
| ProximityC | | | | |
| Calls | 3 | (1) | 1 | |
| Puts | | (3) | ITM1 | ITM2 |
| ProximityP | OTM2 | OTM1 | | |
| Bull Vertical | 1 | (1) | | |
| Long Butterfly | 1 | (2) | | |

4K"4Way"Ratioed(2x1)VerticalsAD

| Underlying | 45 | 50 | 55 | 60 |
|---|---|---|---|---|
| Strikes | ITM2 | ITM1 | OTM1 | OTM2 |
| ProximityC | | (2) | | |
| Calls | 2 | | (1) | 1 |
| Puts | | | ITM1 | ITM2 |
| ProximityP | OTM2 | OTM1 | | |
| Bull Vertical | 1 | (1) | | |
| Long Condor | 1 | (1) | (1) | 1 |

Appendix 4: Bottom Weighted Option Plays

4K"4Way"Ratioed(1x2)VerticalsBD

| | | | | | |
|---|---|---|---|---|---|
| Underlying | | | | | |
| Strikes | 45 | 50 | (100) | 55 | 60 |
| ProximityC | ITM2 | ITM1 | | OTM1 | OTM2 |
| Calls | 2 | (2) | | (1) | 1 |
| Puts | | | | | |
| ProximityP | OTM2 | OTM1 | | ITM1 | ITM2 |
| Bull Vertical | 1 | (1) | | | |
| Long Condor | 1 | (1) | | (1) | 1 |

4K"4Way"Ratioed(1x2)VerticalsCD

| | | | | | |
|---|---|---|---|---|---|
| Underlying | | | | | |
| Strikes | 45 | 50 | (100) | 55 | 60 |
| ProximityC | ITM2 | ITM1 | | OTM1 | OTM2 |
| Calls | 2 | (2) | | (1) | 1 |
| Puts | | | | | |
| ProximityP | OTM2 | OTM1 | | ITM1 | ITM2 |
| Bull Vertical | 1 | (1) | | (1) | 1 |
| Long Condor | 1 | (1) | | | |

4K"4Way"Ratioed(1x2)VerticalsDD

| | | | | | |
|---|---|---|---|---|---|
| Underlying | | | | | |
| Strikes | 45 | 50 | (100) | 55 | 60 |
| ProximityC | ITM2 | ITM1 | | OTM1 | OTM2 |
| Calls | 2 | (2) | | (1) | 1 |
| Puts | | | | | |
| ProximityP | OTM2 | OTM1 | | ITM1 | ITM2 |
| Bull Vertical | 1 | (1) | | (1) | 1 |
| Long Condor | 1 | (1) | | | |

FIG. 70

APPARATUS, METHOD AND SYSTEM FOR A VERSATILE FINANCIAL MECHANISM AND TRANSACTION GENERATOR AND INTERFACE

FIELD

The present invention is directed generally to an apparatus, method, and system of finance, and more particularly, to an apparatus, method and system to establish versatile financial mechanisms from a complex of other instruments.

BACKGROUND

Financial Systems

Computerized marketplaces of all range from simple classified ad bulletin boards to complex mainframe-based market systems such as NASDAQ, which offers a real-time market-making system for tens of thousands of securities brokers. All modern stock, bond and commodity exchanges are supported by underlying computerized databases and related systems, which enable them to function.

Trading systems for items having substantial value generally are an automated version of a manual trading process. For example, securities trading systems are based on a model wherein a customer contacts a so-called retail broker to place an order. The broker, in turn, submits the order to a dealer who executes the order and returns an order confirmation to the broker. Other known systems automate the open outcry process used in trading pits. Importantly, securities trading is heavily regulated. Many of the terms and conditions prevalent in securities trades are limited by convention and regulation. Automated securities trading systems necessarily reflect these constraints. Such financial systems typically rely on underlying information technology systems, user interface, networks and/or other core technologies.

Information Technology Systems

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information, graphically, to users.

Networks

Networks are commonly thought to comprise of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

SUMMARY

Although all of the aforementioned electronic trading systems exist, no effective solution to create and/or leg complex versatile financial mechanisms is available. Currently, it is necessary to leg into such complete hedge configurations via individual trades of contracts. This adds a great amount of unnecessary transactional risk exposure. Further, no solution exists that allows users to enter into spreads that represent alternative futures. As such, the disclosed versatile financial mechanism and transaction generator and interface (VFMTGI) provides a simple user interface for an investor to execute and complete multiple financial transactions, simultaneously, as a single transaction. The interface makes otherwise complex transactions more easily accessible and understandable. The result and manner in which this is achieved, in many instances, results in the generation of never before accessible, novel, non-obvious, yet extremely useful financial instruments. Also, the VFMTGI makes certain transactions, that were heretofore too complex, costly, and/or otherwise uncertain, achievable. Furthermore, the VFMTGI eliminates the leg complexity and risk exposure that is prevalent in the prior art.

In accordance with certain aspects of the disclosure, the above-identified problems of limited financial instrument transactions are overcome and a technical advance is achieved in the art of financial instrument generation. An exemplary versatile financial mechanism and transaction generator and interface (VFMTGI) includes a method to create a versatile financial mechanism. The method includes selecting an underlying financial mechanism and selecting a versatile variant financial mechanism. The versatile variant is comprised of multiple subcomponent transactions. The method also looks-up the subcomponent transactions that comprise the selected versatile variant in a database, wherein the subcomponent transactions are interrelated. The method also identifies the availability of the subcomponent transactions and eventually executes a trade on the subcomponents, if the subcomponents are available.

In accordance with another embodiment, a dynamic network selector apparatus is disclosed. The apparatus has a memory for storing instructions and a processor that can issue the instructions stored in memory. The stored instructions issue signals to: select an underlying financial mechanism, select a versatile variant financial mechanism, look-up the subcomponent transactions that comprise the selected versatile variant in a database, identify the availability of the subcomponent transactions, and execute a trade, if the subcomponents are available.

BRIEF DESCRIPTION OF THE DRAWINGS

The accompanying drawings illustrate various non-limiting, example, inventive aspects in accordance with the present disclosure:

FIG. 2 (FIG. 2A and FIG. 2B) is of a diagram illustrating one embodiment of a versatile financial mechanism and transaction interface;

FIG. 3 is of a diagram illustrating one embodiment of an interface to the VFMTGI in a terminal window for selecting a versatile variation for an underlying position;

FIG. 4 is of a diagram illustrating one embodiment of a format layout and tool set for versatiles;

FIGS. 8-10 (FIG. 8A-FIG. 10B) are of diagrams illustrating embodiments for versatile financial long underlying based transactions;

FIGS. 17-36 include APPENDIX 1, which details various hedges for long underlying that may be generated as multi-leg financial instruments by the VFMTGI;

FIGS. 37-56 include APPENDIX 2, which details various hedges for long underlying that may be generated as multi-leg financial instruments by the VFMTGI;

FIGS. 57-63 include APPENDIX 3, which details various top weighted ratioed verticals that may be generated as multi-leg financial instruments by the VFMTGI;

FIGS. 64-70 include APPENDIX 4, which details various bottom weighted ratioed verticals that may be generated as multi-leg financial instruments by the VFMTGI.

Figure 1:
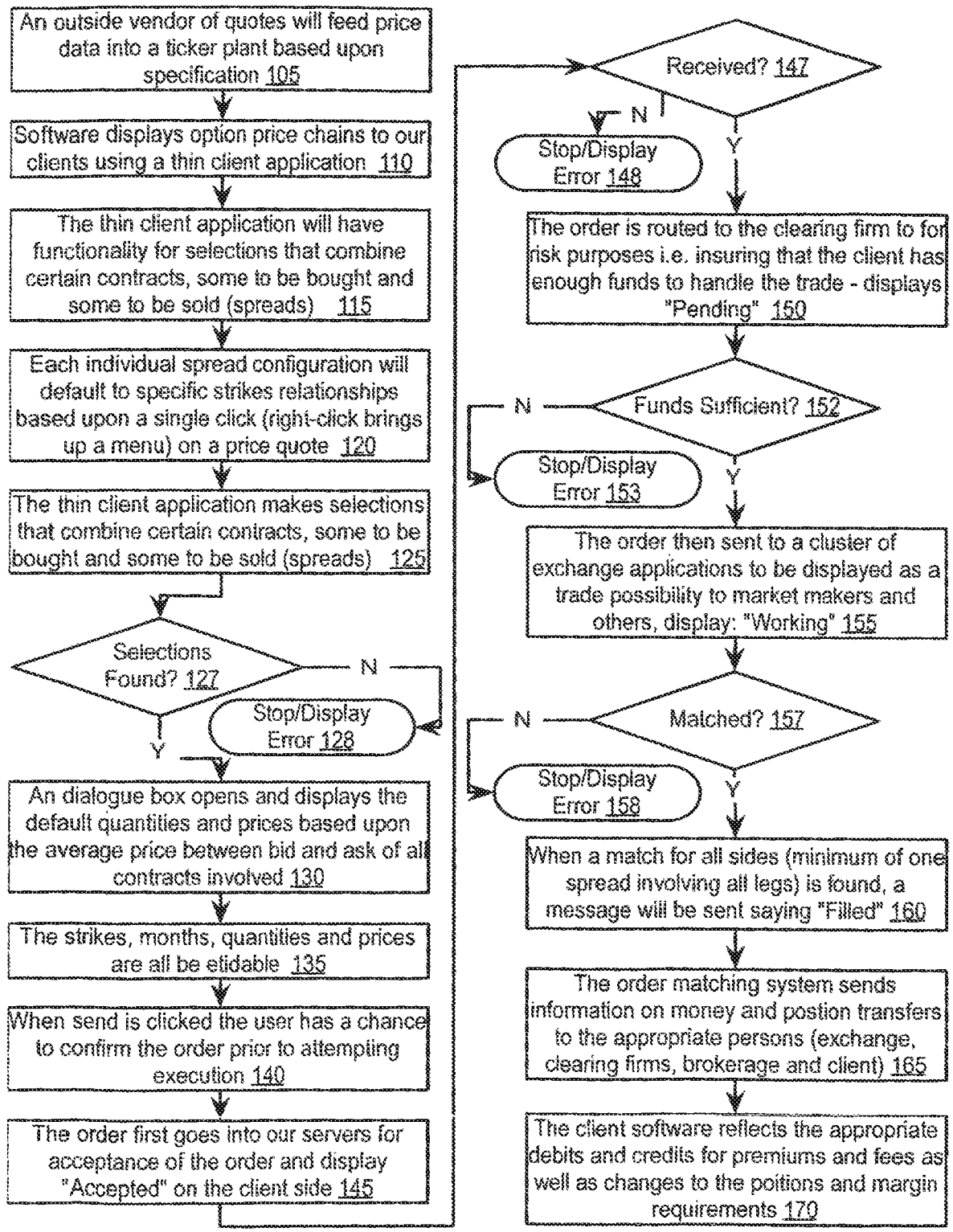
FIG. 1 is of a flow diagram illustrating one embodiment of a versatile financial mechanism and transaction generator and interface (VFMTGI)

The leading number of each reference number within the drawings indicates the first figure in which that reference number is introduced. As such, reference number 101 is first introduced in FIG. 1. Reference number 201 is first introduced in FIG. 2, etc.

DETAILED DESCRIPTION

Financial Terms

What follows is a non-exhaustive list of common financial terms describing various financial mechanisms, systems and/or transactions as will be used throughout the disclosure. It should be noted that the following terms are not exhaustive in detail, and are not provided as definitive definitions. Rather, the terms are provided herein simply as an aid to the reader. The terms are not limiting of the disclosure and/or claims herein. The use of the terms contemplate any of the broader, and/or multiple meanings found in common use, financial dictionaries, and/or in actual use in the financial arts, as well as any broadening made throughout this disclosure.

Financial instrument: is an item having a monetary value and/or recording a monetary transaction. It may generally and loosely be thought of as an asset. Usually, the item has an assigned value as dictated by economic market forces and/or as otherwise agreed upon between parties. Examples include: security, index, commodity, currency, note, draft, obligation bill of exchange, or banker's acceptance which has a maturity at the time of issuance of not exceeding nine months, exclusive of days of grace, or any renewal thereof the maturity of which is likewise limited, and any other various items having a value and/or are commonly known as a "financial instrument."

Security: is an instrument and/or agreement representing a debt, ownership, or the rights to ownership. For example, a stock may represent ownership in a corporation, a bond represent a debt agreement, and derivatives may represent right to ownership. Securities can be traded and typically have an assigned value, usually, with an assigned value as dictated by economic market forces and/or as otherwise agreed upon as between parties. Examples from the Securities Exchange Act of 1934 include a:

note, stock, treasury stock, bond, debenture, certificate of interest or participation in any profit-sharing agreement or in any oil, gas, or other mineral royalty or lease, any collateral trust certificate, preorganization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, receipt for, or warrant or right to subscribe to or purchase, any of the foregoing.

Derivative: is an instrument whose value depends on an underlying financial instrument. The underlying financial instrument may be a commodity, bond, equity, currency, security, etc. For example, options and futures contracts are examples of derivatives.

Option: is an instrument that provides the right to buy or sell a specific amount of a security, index, currency, etc. at a specified (strike) price during a specified period of time. The purchaser of an option has a right to buy, but there is no obligation to do so. Conversely, the seller (writer or grantor) has an obligation to deliver the specific amount to the buyer (holder) if the buyer exercises the contract within the specified time. If the contract is not exercised by its expiration date, it expires. For example, a call is option to buy, e.g., a stock. A put is an option to sell, e.g., a stock. For example, options may include exchange traded options, over the counter trade options, and others. Over the counter options may include exotic options (that have exercise prices, risk/loss profiles, and other characteristics that are different from any exchange traded options), vanilla over-the-counter options, flex options (that allow you to choose the strike and expiration price), and others.

Strike price: the specified price at which an options contract may be exercised by the holder.

Spot price: The current price at which a commodity can be bought at a specified time and place.

Futures: is a contract that obliges a party to deliver a financial instrument or even a physical commodity at a future date in exchange for a specified price. Futures trade on exchanges with standardized terms and take place through clearing firms. The transaction exchange of assets takes place on the specified date of the contract. Futures contracts are regulated and standardized forward contracts.

Futures option: is an option on a futures contract.

Forward contract: is a cash market transaction where a set exchange rate is established for a commodity and/or other asset at some future date. It may be used by someone wishing to lock-in a price at which they will sell an asset, e.g., corn, when the asset becomes available at some future point in time, e.g., after its harvested.

Long: is when someone actually owns an asset and/or financial instrument. For example, having along position in IBM, Inc. may mean you own 100 shares of IBM, Inc. stock.

Short: is an initial selling of a financial instrument that the seller does not own. The seller borrows the financial instrument from a broker. The seller must then later buy back the financial instrument and return it to the broker. The seller hopes the price goes down at that later time when the seller must repurchase the financial instrument to return it to the broker. Thereby the seller profits on price of the financial instrument going down over time, profiting from the initial sale at a higher price. Conversely, if the financial instrument price goes up with time, and the seller must buy it back at a higher price at a later time, then the seller's losses are unlimited.

Call: is an option contract where the buyer (holder) has a right, but no obligation, to buy a specified amount of an underlying financial instrument at a specified (strike) price within a specified time from the seller (writer).

Put: is an option contract where the owner (holder) has a right, but no obligation, to sell a specified amount of an underlying financial instrument at a specified (strike) price within a specified time to a writer.

Naked (or uncovered) call: a call option where the writer does not own a long position in the underlying financial instrument, e.g., stock, on which the call is being written.

Naked (or uncovered) put: a put option where the writer does not own a short position in the underlying financial instrument, e.g., stock, on which the call has been written.

Holder: is someone who is in possession of something. The following examples may be illustrative. A holder is commonly a purchaser or owner of something. With regard to options, the holder may be regarded as one who buys options. As such, a holder is said to have a short position on a call option, and a long position on a put option. For example, if the holder decides to exercise the call option, the holder will receive the underlying stock at strike price of the option. If the holder decides to exercise the put option, the holder will provide the underlying stock in exchange for the strike price of the option.

Writer: is someone that sells options. Writers are obligated to fulfill their promise to buy or sell at the option specified price. A writer is said to have a short position on a call option, and a long position on a put option. For example, if the call option is exercised, the writer is obligated to sell the underlying stock at the strike price of the option. If the put option is exercised, the writer is obligated to buy the underlying stock at the specified price.

In the money: is when the exercise of an option will result in a profit. For example, a call option is in the money when the strike price is below the market price of the underlying stock. In other words, a holder has a right to buy the stock at a below market price, and then can immediately sell it at the market price for a profit. In the converse example, a put option is in the money when the strike price is above the market price of the underlying stock.

Out of the money: are options that have zero intrinsic value. For example, a call option is out of the money when the strike price is above the market price of the underlying stock. In other words, a holder has a right to buy the stock at an above market price, which means the holder will not bother to exercise that right. In the converse example, a put option is out of the money when the strike price is below the market price of the underlying stock.

Synthetic: is an instrument that is created from a combination of other assets, wherein the combination approximates the characteristics of another comparable instrument. For example, a synthetic long stock may be created by simultaneously buying a long call option and selling a short put option on the same stock.

(Vertical) Spread (option): is an option position where one option is bought and another (same class) option is simultaneously sold at different strike prices.

Combo (or combination): buying or selling both a put and call on the same underlying financial instrument, but with different strike prices or expiration dates.

Straddle: buying or selling an equal number of puts and calls with the same strike price and expiration dates.

Reversal: is a general change in the direction or trend of a market.

Leg: broker order entry where contingent orders are executed in separate phases and where there is a risk of price swings caused by the data entry time delays.

Box Spread: is an option position composed of a long call and short put at one strike, and a short call and long put at a different strike. For example, a long 50/60 box spread would be long the 50 call, short the 50 put, short the 60 call and long the 60 put. Considered largely immune to changes in the price of the underlying stock, in most cases, a box spread is an interest rate trade. For all intents and purposes, the buyer of the box is lending money to the options market, and the seller of the box is borrowing money from the options market.

Butterfly: results from four option transactions at the same expiration date and three different strike prices. For call options, one option is bought at a high strike price, one option at a low strike price, and two options are sold at a middle strike price. For put options, the converse holds.

Condor: is similar to the butterfly spread. The difference is that the two middle options that are sold at a middle strike price, instead are sold at two different strike prices. Although middle options sold at two different prices, they are still within the price range established by the low and high strike prices.

Diagonal: is an option involving two options, one a put and one call, with different expiration dates and strike prices.

Conversion: is a spread including a long underlying, long put, and short call with the same strike price and expiration date.

Reversal: is a spread opposite to a conversion, including a short underlying, short put, and long call with the same strike price and expiration date.

Versatile Financial Mechanism and Transaction Generator

FIG. 1 illustrates one embodiment of a versatile financial mechanism and transaction generator and interface (VFMTGI). The VFMTGI provides a simple user interface for an investor to execute and complete multiple financial transactions, simultaneously, as a single transaction. The result and manner in which this is achieved, in many instances, results in the generation of never before accessible, novel, non-obvious, yet extremely useful financial instruments. For purposes of illustration, FIG. 1 provides greater details on the operations of the VFMTGI generator, whereas subsequent figures will provide greater detail regarding aspects of the VFMTGI interface.

Figure 16:
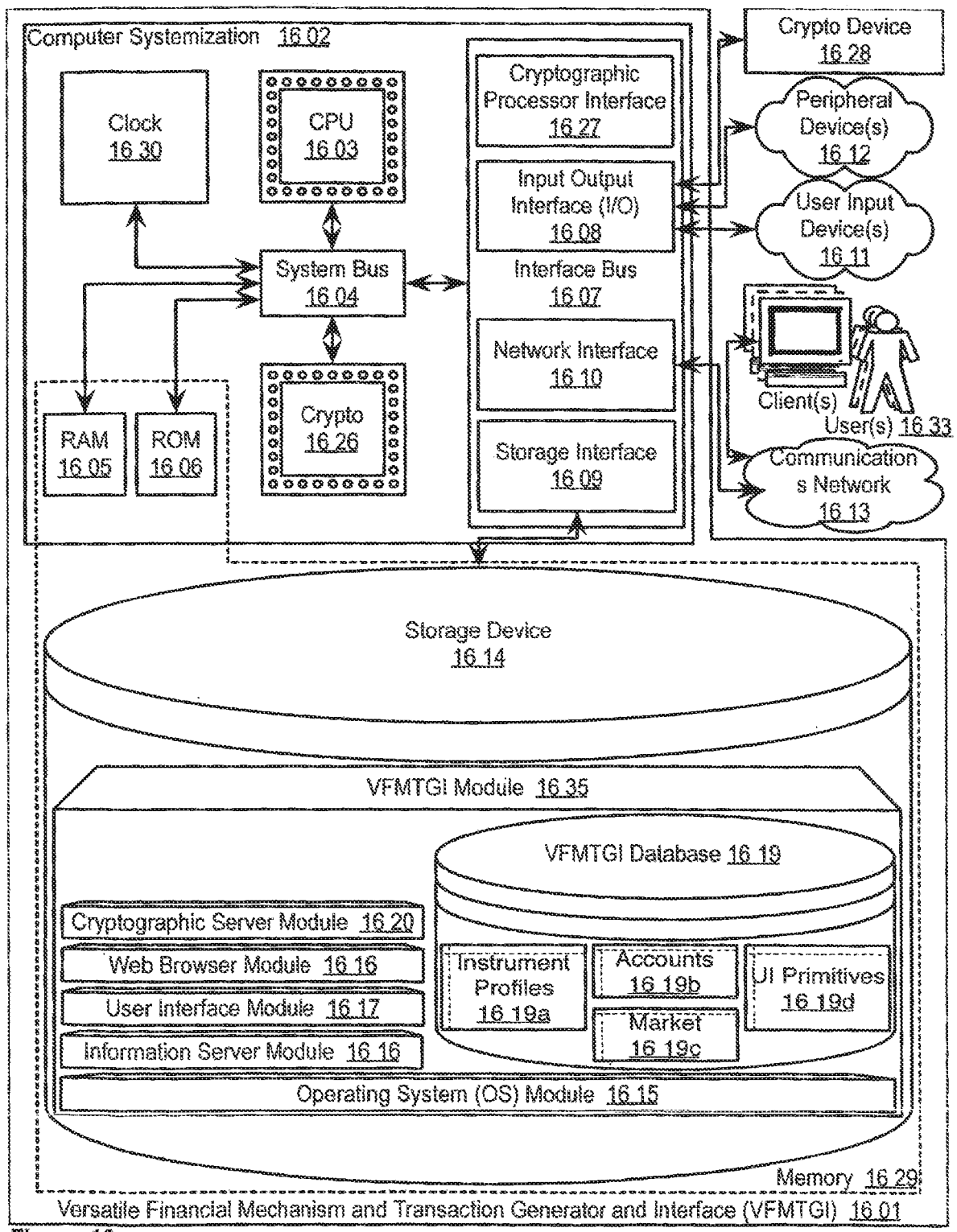
FIG. 16 is of a block diagram illustrating one embodiment of a versatile financial mechanism and transaction generator and interface controller.

The VFMTGI obtains prices on financial instruments from an outside vendor and stores it 105 in its database (see 1619c of FIG. 16). This data feed is based on dataprocessing specifications such as through the Common Software Architecture (CSA), Consolidated Tape System (CTS), Intermarket Trading System (ITS), On-Line Transaction Processing (OLTP), Opening Automated Report Service (OARS), Securities Industry Automation Corporation (SIAC), Super Designated Order Turnaround (SuperDOT), and/or the like (collectively, trade exchange applications). Thus, when a user wishes to engage in trades of versatiles, synthetics, complex hedges, etc. (and/or combinations thereof) offered by the VFMTGI, (which will be discussed in greater detail below and in the various appendices) a terminal may display option price chains that are available to the client 110.

These various option price chains will depend upon the user's current positions in the market: The user's positions may be retrieved from a VFMTGI database. For example, if the user owns IBM stock, option price chains may be based on the underlying IBM stock. The terminal provides tools (which will also be discussed below in greater detail (see 210 of FIG. 2 below)) to a user to and combine various option contracts and/or financial instruments 115. Some of these instruments will be bought while others will be sold, which may result in various spreads. Although this is discussed in greater detail elsewhere in the disclosure, one of the uses for these tools and any resulting instruments that are bought and sold is that they figuratively dissect out various risk exposures that exist in the market. Or in other words, they allow the user to create a new versatile position with a different risk basis.

Based upon the user's selected position 115, each individual spread defaults to specific strike relationships 120. To the user's perspective, such selectable combinations may be simply selected and executed as a single versatile transaction from a list of provided price quotes; i.e., a one-click transaction. The VFMTGI will retrieve option price chains that relate to the user's underlying position from its database. In one embodiment, this may be achieved by performing various selects and joins across the VFMTGI's database tables. For example, the VFMTGI may select all available derivatives from its market table database (see 1619c of FIG. 16) based on the underlying position with expiration dates occurring for the next several months. However, such selects may be varied by the user (as will be discussed below in greater detail (see 260 of FIG. 2)). Once a user selects on a price quote and/or any selectable versatile transaction therefrom 120, the VFMTGI will select and combine any component contracts and/or financial instruments required to fulfill the users selection 125. This may be achieved by searching the VFMTGI's database based on a profile of the user's selected versatile. Based on the user selection for a desired versatile transaction, a lookup on that type of versatile will result in an identification of subcomponent transactions required. Based on the subcomponent results, a further search of the VFMTGI's market database may then proceed to identify available market instruments that may be used to fulfill the requirements of the selected versatile. It should be noted that the subcomponent may be any type of financial instrument, financial transaction, financial mechanism, agreement, monetized implement, and/or the like. For example, in one embodiment, the subcomponents may employ over-the-counter exotic options as a construct for a versatile.

In one embodiment, the VFMTGI has a database table with instrument profiles (see 1619a of FIG. 16) of the various versatile transactions (as described in greater detail below and in various appendices). The profile for any given versatile transaction, which may have been selected by the user, includes the subcomponent transactions upon which it is based (as described in greater detail below and in various appendices). Those subcomponents in addition to the users selection from the price quote (which further provides expiration date, strike price, and/or other limiting factors) all provide criteria with which to search the VFMTGI's market database (see 1619c of FIG. 16). Based upon such criteria, the VFMTGI is able to make selections from its market database of subcomponent contracts and/or financial instruments that will fulfill the user's selected 120 higher level versatile transaction. If no selections and/or insufficient selections found 127, the VFMTGI stops and may display an error 128.

Upon arriving at an initial set of subcomponents 127 that can fulfill the user's selection 120, the VFMTGI may present a dialog box displaying the initial set of subcomponents along with related information 130 (e.g., default quantities, prices (which in one embodiment may be based upon the average price between the Bid/Ask of all involved financial instruments), etc.). This may be achieved by populating a table user interface element with the VFMTGI's subcomponent selections 120. Upon being presented with the dialog box, the user may make various edits on any of the related information such as on strikes, months, quantities, and/or prices 135 (see FIG. 3 for more detail). Prior to executing the order by clicking on a send button, the user may confirm the order 140 (see FIGS. 3 and 4 for more detail).

Upon confirming the order for execution 140, the order is sent for acceptance 145. Upon receipt of the order at an appropriate server, the user may be informed of the receipt by providing confirmation of such. For example, by displaying "Order Accepted" on the users display. If the order is not accepted, either because of a time-out, and/or other such problem 147, then the VFMTGI generates an error, the transaction does not complete, and an error message may be generated and forwarded to the relevant parties 148. Once the order is accepted 147, it may be routed to a clearing firm. The clearing firm may then confirm that the user has sufficient funds to proceed with the trade, and thereby reduce the risk of default. In one embodiment, the user may be provided with a status information of the pending status. For example, the users screen may be updated to state "Order Pending." If the user does not have sufficient funds 152, then the VFMTGI generates an error, the transaction does not complete, and an error message may be generated and forwarded to the relevant parties 153.

If there are sufficient funds 152, then the order may be provided to trade exchange applications 155. The trade exchange applications will forward the order and make it available as a trade possibility to market makers and others. The user may be informed of this status with a "Working" display message. If there is no match, either because of a time-out, the terms of the order were not fulfilled (e.g., the order is good only till the end of day and no match occurs), and/or other such problem 157, then the VFMTGI generates an error, the transaction does not complete, and an error message may be generated and forwarded to the relevant parties 158. If a match is made for at least each leg of the versatile transaction 157, a "Filled" display message may be provided to the user 160. In an alternative embodiment, if multiple results are obtained for each leg, the results at the best prices are selected. In another embodiment, the user may be presented with the multiple results and asked to further select amongst the candidate results.

It is to be understood that the VFMTGI may also provide and/or broker the converse and/or compliment of any trade and/or order. In one embodiment, the order may be provided to a trading market where it may be brokered to others wishing to engage in the complementary trade. For example, if one investor wishes to sell a SlingshotHedge at certain strike points and times, a second investor may wish to take the complementary order and buy the first investor's SlingshotHedge; i.e., this would include all the comprising sub-component transactions. In another more simple example, a complementary trade may be provided by the VFMTGI to one investor wishing to buy XYZ stock and buy a put thereon. In such a simple example, the VFMTGI might provide and/or broker such a complementary transaction as provided from an originating sale of XYZ stock and sale of a put thereon from an originating investor (e.g., in this case a market maker might be buying the complementary trade).

Once the order is matched 157, 160, the VFMTGI provides order information for the funds and position transfers to the appropriate entities 165. For example, the client is informed of the details of the transaction 170, the exchanges and brokerage firms are instructed with regard to the financial instrument trades, and the clearing firms are instructed with regard to the requisite fund transfers. In one embodiment, the user's terminal is updated to reflect the appropriate debits, credits, premiums, fees, margin requirements, and changes to their positions resulting from the trade execution 170 (see FIG. 4 for more detail).

Versatile Financial Mechanism and Transaction Interface

FIG. 2 illustrates one embodiment of a versatile financial mechanism and transaction interface. FIG. 2's user interface discussion relates to the generator discussion of 110-125 of FIG. 1. In one embodiment, the user may be presented with an interface to the VFMTGI in a terminal window 200. The user interface may be integrated into an overall trading system 201 that otherwise provides fundamental account management, quotes, and/or trading abilities to an investor and/or user.

For example in the trading window 200, 201, the VFMTGI generates all the appropriate strike relationships 225 for an underlying position 230 and lists Bid/Ask spreads 235, 240 available at a various expiration 245 and strike 250 points, both for calls 235 and puts 240. This allows a user to make a selection with a cursor 205 (for example by right-clicking to display a menu in the window) to buy or sell 210 a versatile transaction 115, 215 from an obtained 105, 110 price quote list 235. In another embodiment, "hockey stick" figures (see 405 FIG. 4 for an example) may be used instead of or in addition to the textual menu descriptions for the versatile transactions 210, 215, 220, 255. In another embodiment, a tool palette may be conjoined or float separate and apart from trading window 200, wherein the tool palette remains visible and engageable upon selecting basis 230 and strike point 250. In the pictured embodiment, right-clicking on a strike point provides the user with a menu 210 of various versatile transactions 215, 220, 255 that the user may find desirable. For example, the user may feel nervous about their position and accompanying risk exposure due to changes in the market. As a consequence, the user may wish to hedge 255 their current underlying position 230. A popup menu, combo box, text field, and/or the like user interface widget may be provided to allow the user to select the underlying position 230.

It is important to note that a user does not have to be a holder of an actual underlying position to procure certain versatiles (as will be discussed in greater detail below). Even though users may not have a particular underlying position in their account portfolio, they may still select an underlying position 230 as a basis from which a versatile transaction can be built. For example, a user may wish to approximate the risk/exposure profile offered by a particular security (or variation thereof) without actually procuring the underlying security. As such, the user may select an underlying basis 230 without ever acquiring the underlying security by then selecting an appropriate versatile 210. For example, the first item in Appendix 1 (shown in FIGS. 17-36); "SlingshotHedge 1P(2)CV" provides the same risk/exposure profile as in the first item of Appendix 3 (shown in FIGS. 57-63); "Slingshot 1C(2)CV." In other words, the SlingshotHedge:1P(2)CV for long loo shares is synthetically the same as the options only play, "Slingshot 1C(2)CV," with no stock.

VFMTGI provided interface elements 210, 215, 220 make selections and procurement of complex combination 215, hedge 255, and/or roll 220 transactions simple. For example, the VFMTGI may provide the user with versatile options for combinations including various BackSpread (LongMore), Butterfly, Calendar, Calendarized Iron Butterfly, Calendarized Iron Condor, Condor, Covered Stock, Diagonal, Double Diagonal, Iron Butterfly, Iron Condor, Ratioed Verticals, Ratio Spread (ShortMore), Stock vs. Option, Straddle, Strangle, Vertical, and/or the like 215. The VFMTGI may provide the user with versatile options for hedging 255 including various Bear Collar, Bull Collar, ButterflyHedge, CondorHedge, CalendarHedge, CalendarizedButterflyHedge, CalendarizedCondorHedge, CalendarizedironButterflyHedge, CalendarizedironCondorHedge, IronButterflyHedge, IronCondorHedge, SlingshotHedges (e.g., 1P2CV, 1P3CV, 2P2CV, 2P3CV), and/or the like 257. The VFMTGI may provide the user with versatile options for rolls 220 including various Bear Collar Roll, Bull Collar Roll, ButterflyHedge Roll, CalendarHedge Roll, CalendarizedironButterfly Roll, Calendarized IronCondorHedge Roll, SlingshotHedge (e.g., 1P2CV, 1P3CV, 2P2CV, 2P3CV), and/or the like 257. The VFMTGI may provide the user with versatile options rolls 220 including various Bear Collar Roll, Bull Collar Roll, Butterfly Hedge Roll, Calendar Hedge Roll, Calendarized Iron Butterfly Roll, Calendarized Iron Condor Hedge Roll, SlingshotHedge (e.g., 1P2CV, 1P3CV, 2P2CV, 2P3CV) roll, and/or the like 222. These versatile transactions are as described in greater detail throughout the disclosure and in various appendices.

FIG. 3 relates to the discussion of 130-140 of FIG. 1. In one embodiment, the user may be presented with an interface to the VFMTGI in a terminal window 300 for manipulating the subcomponents of a versatile. The user interface may be integrated into an overall trading system 201 as discussed in FIG. 2. As such, upon the user's selection of a versatile transaction 127 of FIG. 1, the user may be presented with a view, window, and/or the like having default quantities and prices 300, 130 of FIG. 1. In the window 300, the user can view the resulting order entries 301 in a table providing details of the subcomponent transactions 305. In one embodiment, the order manipulation screen 300 may be bypassed. In such an embodiment, a user account may indicate the user to be an expert, and as such, the user may wish to have one-click versatile orders. In such an embodiment, the default and/or at market values that would otherwise be displayed for review in the order manipulation screen 300 are deemed acceptable, and the order is sent off for fulfillment as has already been discussed in FIG. 1.
dynamic adjustable risk transaction As can be seen, the table allows the user to change any number of criteria by simply making edits in any of the table row/column entries 305. The window 300 provides various controls 310 to edit 350, process, and manage the trade. An option to add and remove subcomponent entries in the table 305 may be provided by way of a button, right click pop-up menu option, and/or the like; this allows a user to add and remove subcomponents to the order queue 305. As such, the order queue allows multiple versatile and other order entries to be managed, edited, and or otherwise processed in mass.

In that vein, the VFMTGI provides check-box widgets as column options 370, 372. By selecting that subcomponents must all be executed together as specified (e.g., clicking a check mark into a check box widget), the user guarantees that the order for a versatile will not go through unless its other selected subcomponents can be obtained at exactly the requested strike parameters 372. In one embodiment, by default, for each requested versatile, the VFMTGI populates the order entry table 305 with all subcomponents selected to execute only at the specified strike parameters 372. However, the user may find that they can loosen this restriction for certain subcomponents as desired by deselecting the check boxes; this may increase the likelihood that the versatile order will go through to completion. Similarly, an option is provided 370 to require that any selected subcomponents in the order entry queue 302, even those that are not generated from a single versatile, must be executed together as specified. The order queue 302 view/window looks much like the order entry window view 300, 301, but it displays subcomponents for all versatiles that have yet to be executed. For example, sending items in the order entry view 301 to the order queue view 302 may be achieved by selecting the desired subcomponents and engaging the Send to Order List button 372. Also a user may their order history in an order log 315, which when engaged presents a view that access the executed order history.

Additionally, the VFMTGI may provide a StrikeShifter 360 to manipulate and modify strike values and times. In one embodiment, the StrikeShifter is a 4-way-spin button, with arrows pointing up, down, left and right. In one implementation, the VFMTGI provides spread variations at values closest to the money (where the underlying position is currently trading). However, the StrikeShifter allows the user to manipulate the strike points and times as desired. By clicking (or otherwise engaging) the top arrow, any selected versatile transaction's strikes are all shifted up by 1. By clicking (or otherwise engaging) the bottom arrow, any selected versatile transaction's strikes are all shifted down by 1. By clicking (or otherwise engaging) the left/back arrow, any selected versatile transaction's strikes' expiration dates are all shifted back in time by one month. By clicking (or otherwise engaging) the right/forward arrow, any s elected versatile transaction's strikes' expiration dates are all shifted forward in time by one month. By so engaging the StrikeShifter, the VFMTGI sends a request for new quotes to its market database based on the modified strike requirements and repopulates the terminal 300, 305 with the updated market information.

Further, a button option is provided to send the subcomponent entries off as an order 320, 155-165 of FIG. 1; engaging it brings up the window of FIG. 4. Other controls allow a user to clear 362, cancel 364, export 366, and print 368 items in the order queue. Also, a help facility 369 is provided, wherein engaging the help button opens a view displaying helpful information regarding screen options.

By way of example, a user selected to sell a SlingshotHedge 1P2CV versatile transaction 257 of FIG. 2 for the user's underlying XYZ 230 position. As such, the VFMTGI made selections of subcomponent contracts 125 of FIG. 1, which were presented to the user in a window 300 for review and editing 135 of FIG. 1. Thus, based on a user's underlying position and selection(s), the VFMTGI generated a SlingshotHedge 1P2CV 257 versatile transaction by selecting available subcomponent contracts, which includes: a 10 quantity, buy put option with a Mar. 4, 2004 expiration date and strike price of 50; a −20 quantity, sell call option with a Mar. 4, 2004 expiration date and strike price of 55; and a 20 quantity, buy call option with a Mar. 4, 2004 expiration date and strike price of 60. It should be noted that any number of interrelated-multi-leg transactions may be employed by the user, and the window 300 would properly reflect its subcomponent parts as required (and detailed in the appendices). In an alternative embodiment, all the entries may be submitted as an interdependent order, meaning that all or some selected subcomponents of one or more versatile subcomponent entries must be executed as specified or the entirety of the order submission will not execute. In such an embodiment, ranges for strike parameters may be specified as acceptable. For example a range of strike prices may be used, e.g., 50-55 instead of a set price of 50.

FIG. 4 relates to the discussion of 140, 140 of FIG. 1. In one embodiment, the user may be presented with an interface to the VFMTGI in a terminal window 400 for confirming a transaction. The user interface may be integrated into an overall trading system 201 as discussed in FIG. 2. As such, upon the user's editing of the order 135 of FIG. 1, 305, 320 of FIG. 3. The user may be presented with an informational screen to confirm their order 400. Further, the window 400 provides various controls 415 to edit, process, and manage the trade similar to those discussed in FIG. 3. A button option is provided to edit the order 417, which if engaged may send the user back to the previous window 300 of FIG. 3. A summary of the order details may be provided 410 and include information such as Underlying, General Order Description, Specific Order Description, Maximum Profit (Reward) of Hedge, Maximum Loss (Risk) of Hedge, Risk Reward Ratio of Hedge, Maximum Profit (Reward) of Total Position, Maximum Loss (Risk) of Total Position, Risk Reward Ratio of Total Position, Break-Even Stock Prices of Total Position, Net Cost of Hedge, Total Value of Position upon Execution, Commissions, Gross Cost of Hedge, Potential Cash Flow Liability of Hedge, Synthetic Price Equivalents, and/or the like. Further, a "hockey stick" image is provided 405 showing the ceilings, floors, and slopes of the resulting position. As can be seen by way of continuing the SlingshotHedge 1P2CV versatile transaction example of FIG. 3, the summary information 410 details the transaction particulars. Upon confirmation 140 of FIG. 1, the user may send the order on for further processing 420. Similar summary information may be provided as confirmation after successful completion of the transaction 170 of FIG. 1.

Versatile Transactions

The VFMTGI provides various tools and new types of versatile transactions for investors. The following details some of versatiles (e.g., long/short slingshots, (wing) hedges), and/or the like) and accompanying tools. It should be noted that this discussion is illustrative of various novel and innovative versatiles that may be further combined with each other and other types of transactions to achieve many novel and innovative hybrid versatiles.

In one embodiment, the following versatile transactions provide an intuitive way for an investor (e.g., retail, institutional, hedger, etc.) to execute, simultaneously, a complete dynamic hedge package in a single transaction. Currently and prior to this technology, it would be necessary to leg into these complete hedge configurations via individual trades of the contracts. That has added a great amount of unnecessary transactional risk exposure. Legging into spreads may be an appropriate method for a seasoned professional. However, the VFMTGI allows a counterparty and/or less experienced trader to participate in such transactions.

The following versatiles represent an alternative future that arms investors with not only many more tools but ones that are more appropriate. In many cases versatiles are more appropriate investment strategies for investors, however, the complexities of generating them has prevented the investing public from using them. Also, various versatiles discussed herein simply have never been contemplated. As such, entire new investment options become possible. The sophistication of the VFMTGI makes difficult concepts easier to convey and engage, which allows the investing public to participate in extremely sophisticated and liberating investment strategies.

In order to express aspects of VFMTGI technology, the following discussion analogizes computerized and/or systemic implementations to versatile synthesizing (dissection) by hand as if written on a piece of paper. Several tools symbols used to identify the synthesized trades. Although a spreadsheet like presentation is provided to facilitate understanding, it is to be understood, that various and largely non-visual embodiments of the VFMTGI versatile transactions may be implemented achieving much the same results without the overhead of displaying intermediate output. As such, although the following dissections and/or other mechanisms may take place, they are not required from the user's perspective in that they are generated on the fly from the user's selection and/or underlying basis as has already been discussed.

Versatile Transaction Format Layout

Figure 5B:
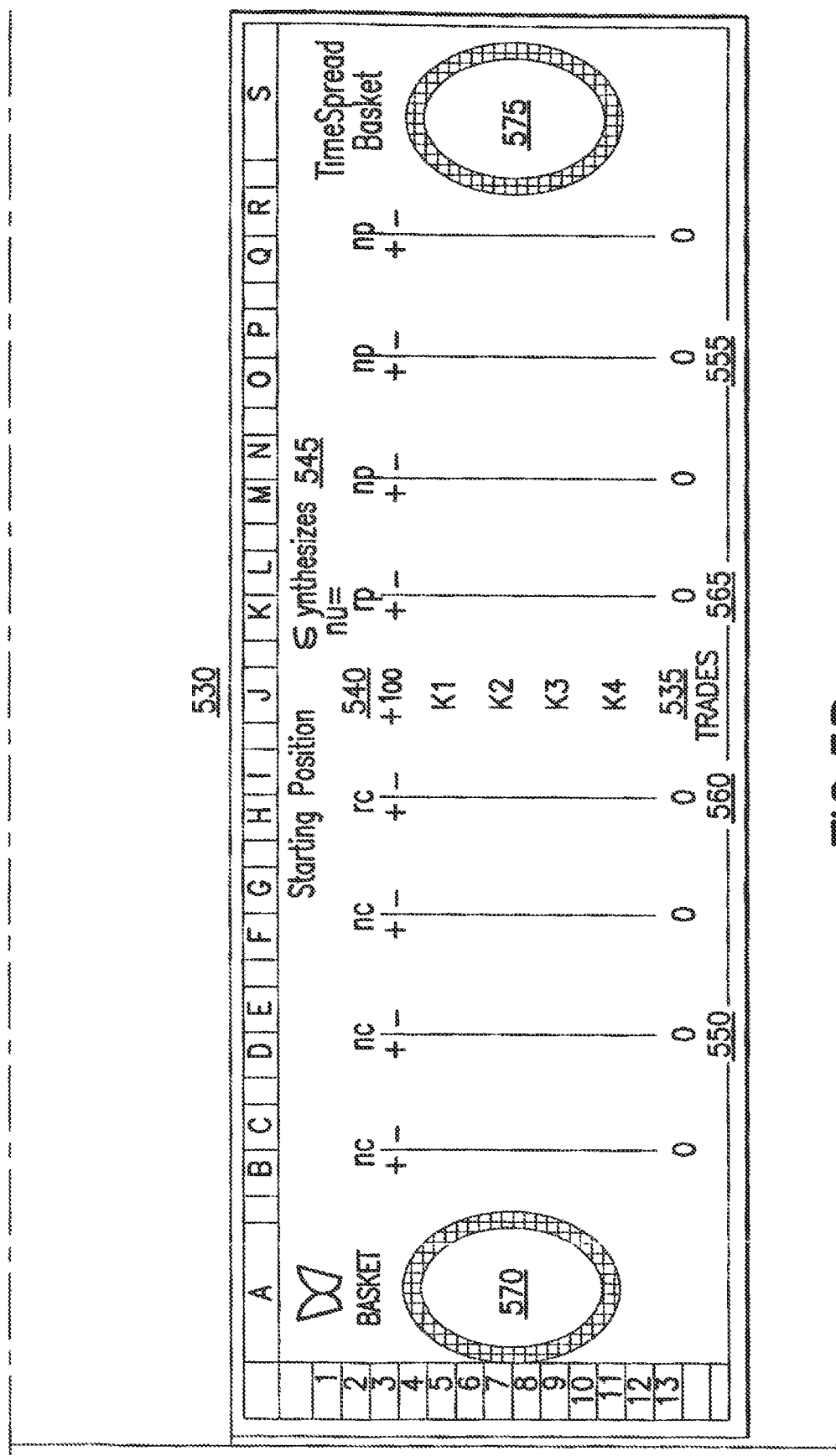
FIG. 5 (FIG. 5A and FIG. 5B) is of a diagram illustrating one embodiment of an interface to the VFMTGI in a terminal window for confirming a transaction.

FIG. 5 illustrates one embodiment of a format layout and tool set for versatiles. The VFMTGI may employ a SynTool 505, BoxTool 510, WingTool 515, CalendarTool 520, JellyRoller 525, and/or the like as visually depicted in FIG. 5. These tools will be detailed in context with the discussion of versatile constructs that follow. In addition, one embodiment of construct parameters is discussed as a default for use in the discussion of the various versatile constructs. Of course the default parameters may be varied; they are provided simply to frame and facilitate discussion of the various versatile transaction constructs.

As such, with regard to the following example versatile constructions, an option is deemed to represent 1 futures contract for futures options, or 100 shares per contract (SPC) for US equities. It should be noted that in some foreign equity contracts each option represents a different amount of shares other than loo, i.e., 50 or only 20 shares. Also, a stock split can result in a variant SPC values, e.g., 150 for a 3 for 2 spilt. Nevertheless, for purposes of discussion, 1 option shall represent the 1 unit of the underlying (i.e., 1 per future, 1 per loo SPC for most equity options, 1 unit per 20, 50, or 150 etc. as described above).

As discussed above in FIG. 2, one embodiment provides that versatile (e.g., hedge spread) variations default to strikes closest to the money (where the underlying is currently trading). As mentioned, the StrikeShifter 260 of FIG. 3 and other facilities allow a shift in all of the strikes in the same direction simultaneously.

In one embodiment, for versatiles and/or their subcomponents, price defaults round credit down to or debit up to nearest tradable price. Also, as already discussed in 410 of FIG. 4, order confirmation information may include the bid/ask average price and/or the synthetic equivalent price for versatiles.

In one embodiment, versatile SlingshotHedge transaction variations may be described by the following parameters: Number of Puts, and Number of Call Credit Vertical. In embodiment, the VFMTGI defaults to buying a number (whole or a fractional amount) of the closest out-of-the-money (OTM) puts and selling a number (whole or a fractional amount) of the next 2 higher strikes OTM call verticals (all 3 strikes involved are normally an equal distance apart from each other and all occur in the same month). In an example of a fractional amount, the user may wish to buy 1.5 (1 point 5) as many puts and sell 2.5 (2 point 5) as many call verticals for each unit of underlying; for 10oo shares that would mean 15 puts and 25 call verticals. As already discussed, the VFMTGI interface allows strikes to be edited so the strikes are wider apart, however, there may be instances of varying distances between strikes according to the user's preference before sending the combined transaction hedge. The months can also be edited so for example the options being bought can be in a deferred month and the options to be sold can be in the nearer term month.

In the example embodiments, for ease of illustration, the versatile transactions are presented in a format layout table 530 as follows. The trades involved in the versatile transaction, e.g., hedge, appear in a bold red colored font. These example trades are made in order to dynamically hedge long 100 shares (displayed as "+loo" in a bold brown colored font). The synthesizing will be performed in blue colored font. All these items are in a layout where the strikes are listed near the central column J with call positions and dissections (synthesis) on the left in columns A-I and the put positions and dissections are on the right in columns K-S.

It should be noted that although the following examples employ long underlying positions, VFMTGI versatiles provide the ability to hedge short underlying positions (−loo) as well. In one embodiment, the VFMTGI applies these strategies to short underlying positions by substituting calls for puts and puts for calls in all cases, and by substituting "higher" strikes for "lower" strikes and "lower" strikes for "higher" strikes in all cases. However, there is generally no need to substitute in-the-money (ITM) for OTM or vice versa.

Position dissection works under the premise that locked positions such as conversions, reversals, and boxes can be removed from a position because they are basically neutral and can be used as filters to uncover and detect different aspects about a position that may not at first be apparent. Although locked positions may have different meanings in different contexts, in one context a locked position locks in a profit or a loss and under certain conditions, theoretically, cannot lose any money from that point forward. Nevertheless, locks can lose a relatively small amounts of money owing to early assignment and a bit more because of pin risk if not exited prior to expiration; also there is liquidity and transactional risk. Spreads that are commonly referred to as locks are conversions/reversals (C/Rs), boxes, and jelly rolls. Dissection tools are employed by the VFMTGI and allow users to alter their perception of a position through synthesizing; the tools also provide a more transparent measure of risk.

Continuing with the table format layout 530, columns H-L refer to the actual position (i.e., raw position). Table 530 columns B-G and M-R refer to the position after each dissection or synthesis (i.e., net position).

When the market makes a large move in either direction it is very important to know the amount of net call contracts (nc or ncc) 550 and net put contracts (np or npc) 555 in the position are found in row 13 of the table 530. Net calls are the sum of all the calls, plus any underlying contracts, i.e.:

add underlying amount if long the underlying or subtract if short the underlying Net puts are the sum of all the puts, minus any underlying contracts, i.e.:

subtract underlying amount if long the underlying or add if short the underlying amount of puts that he or she will have that will trade at parity or turn into underlying either through exercise or assignment. Put parity options move one to one against the underlying, while call parity options move one to one with the underlying. Therefore, being long (+)loo underlying wins and loses as much as short (−)1 parity put does so that would be −lp for the net put contracts count and net long+le call for the net call contracts. Net contracts are tallied at the bottom of each "T" account at all stages of each dissection.

Similarly, raw call contracts (rc) 560 and raw put contracts (rp) 565 are found in row 13 of the table 530.

The baskets 570, 575 on either side of the table 530 is where wingspreads e.g., butterflies, condors, etc.) 570 and time spreads 575 maybe imbedded.

Versatile Transaction Dissection Tools

Figure 6:
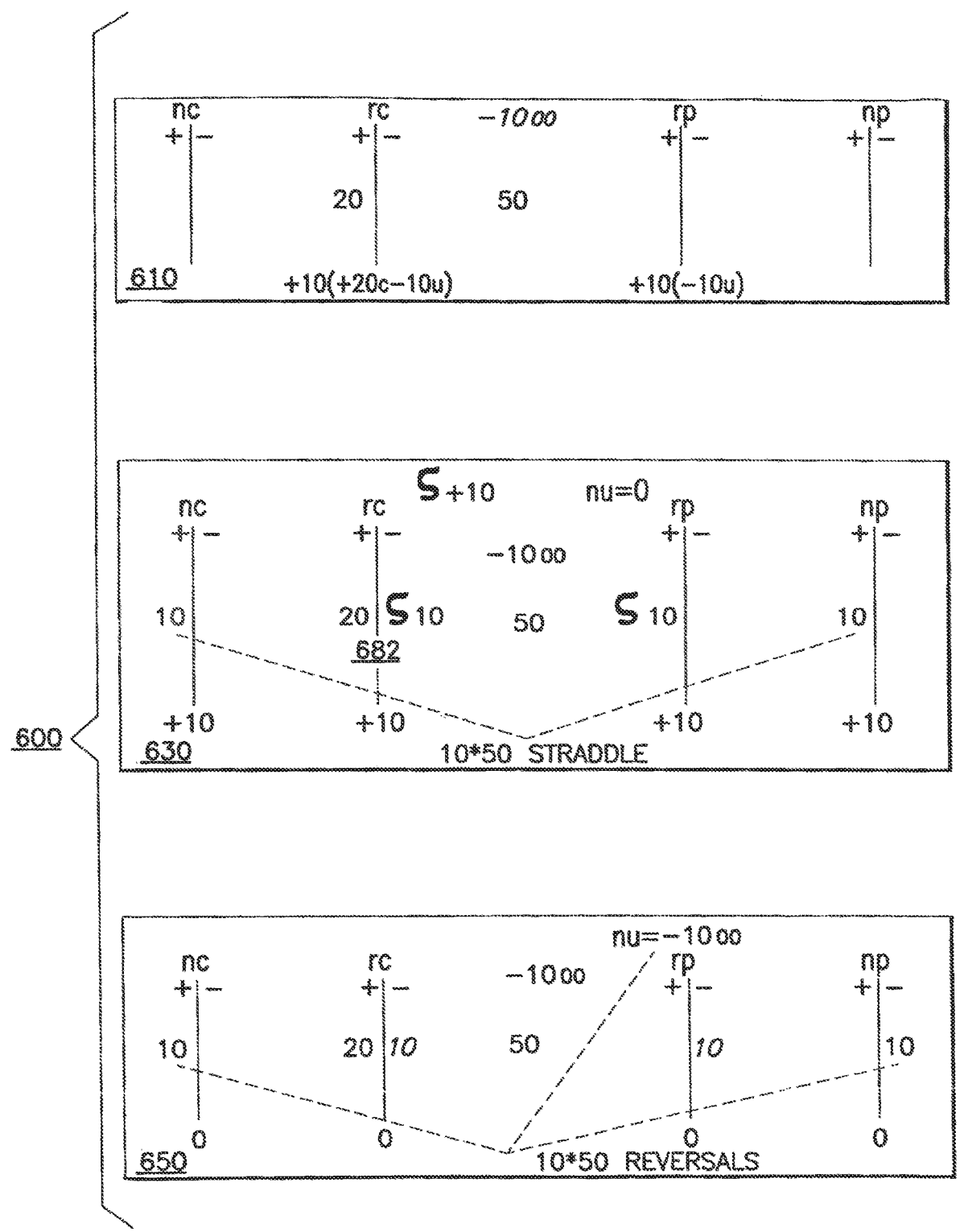
FIG. 6 is of a diagram illustrating one embodiment of dissection tools for versatiles.

FIG. 6 illustrates one embodiment of dissection tools for versatiles. As already introduced in FIG. 5, two tools that are often used for position dissection are the SynTool 505, which takes out conversions and reversals, and the BoxTool 510, which removes boxes.

In using the BoxTool, the VFMTG1 basically may take out a conversion at one strike and a reversal at another strike, without the underlying positions that would offset each other. Once one of these locked positions is removed from the position, the VFMTGI can provide and/or display a new position. The C/R and box positions are referred to as zero-sum spreads, meaning they are basically flat. To some extent, C/Rs are mirror images of a transaction. For example, if two parties trade this spread with each other, one would end up with the conversion and the other with the reversal; theoretically, if the trade is executed at fair value, there will be no profit or loss.

A trader should remain cognizant that C/Rs and boxes have some additional, contract-specific risks. These risks should not be ignored because they are still alive, even though they represent a lower priority than the risk that the trader wishes to focus on. Once it has been established where the biggest risk exposure exists (i.e., the highest priority) in the trader's overall position, and that has been dealt with, lesser problems such as the locks can be attended to. The trader develops a hierarchy of risks, including C/Rs and boxes, so that the focus remains on the imminent danger, the most risky aspect of his position. The trader may not be able to attend to lower priorities, but at least he or she will be in control of the major risk of the position.

By using three SynTools, the VFMTGI can remove C/Rs from the position with an imaginary trade. It may seem strange to do this, especially if there is no complete C/R in the position. When a position is synthesized, the intent is to view that position differently and thereby gain a new awareness for future adjustments. The awareness comes from turning some calls into puts at the san1e strike, and at another strike turning the puts into calls. Here we represent long positions with a "+" and short positions with a "−". Also we represent the underlying position with a "u" and calls and puts with a "c" and "p," respectively. Any long underlying (+u) is turned into a long combo meaning (+c−p) usually and any short underlying (−u) is turned, or synthesized, into a short combo (−c+p). The underlying does not always have to be changed into a combo. Sometimes a long call (+c) may be turned, or synthesized, into a (+u+p), or a (+p) into a (+c−u) depending on the situation.

The VFMTGI groups SynTools of three (imaginary) trades for much the same reason that in accounting there is an offsetting credit for every debit. If a bookkeeper posts a debit, a credit has to be posted somewhere or the books are out of balance. If the VFMTGI fails to employ one part of the SynTool, i.e., its unable to secure a subcomponent, then the position will be out of balance and not synthetic to the raw position. This will result in a misperception of the actual position and/or an error 158 of FIG. 1.

In one embodiment, the VFMTGI trades using the SynTools to form a template, which yields a synthetic position when overlaid on an existing position. Used another way, that is with a different amount, or at another strike, or used in reverse, the VFMTGI may yield another synthetic version of the trade. It is up to the trader to decide how The position is best viewed. This choice will vary among traders according to styles, current objectives, and experience; irrespective of how the position is viewed, it is the same as its synthetic versions. The way the trader views his or her position may depend on a number of factors such as the time in the expiration cycle, the price level of the underlying, the implied volatilities, the implied volatility skew shape, and the trader's market objectives.

The implied volatility skew shape, which is often called the skew or the smile, refers to the graph of implied volatility levels plotted against each strike for a given month. Volatility skew, or just "skew," arises when the implied volatilities of options in one month on one stock are not equal across the different strike prices. For example, there is skew in XYZ April options when the 80 strike has an implied volatility of 45%, the 90 strike has an implied volatility of 47%, and the 100 strike has an implied volatility of 50%. If the implied volatilities of options in one month on one stock are equal across the different strike prices, the skew is said to be "flat." The investor should be aware of volatility skew because it can dramatically change their risk position when the price of the stock begins to move.

Example of VFMTGI Generating an Equated Versatile Position

The following is an example of how the VFMTGI may be used to long 20 Oct 50 calls and short 10oo underlying (+20 Oct 50c −10oou) to equate to a +10*50 straddle. The asterisk "*" in "+10*50" is used to separate quantity from contract. First, the VFMTGI is used to write down (i.e., card up) the position 610, then it is synthesized 630.

The VFMTGI cards-up a +20 Oct 50c/-10oou 610, which may result from a trader selection of a desired versatile as already discussed in FIG. 2 and throughout. The trader has applied a locked strategy—a conversion with an imaginary trade—to the position, canceling out as much intrinsic value as possible and leaving a long straddle. If 10 actual conversions were traded, the position would result in a raw position of 10 long straddles. The conversion synthesis applied has removed the embedded reversal from the position. For risk control, the straddle becomes the first priority and the reversal becomes the second.

After dissecting out 10 reversals by an imaginary trade of 10 conversions 610, the VFMTGI now moves to provide+10 synthetic straddles 630. To illustrate that there is a reversal embedded in the position, notice the original raw position, long 20 Oct 50 calls and short 10oo m1derlying (+20 Oct 50c −10oou) 632. However, to achieve the desired equated position, e.g., +10*50, the VFMTGI sells 10 straddles in an actual trade (actual trades are distinguished through italics in 650). The resulting position is a 10*50 reversal. As a result of selling 10 actual straddles the VFMTGI provides 10*50 reversals 650.

Dissections

Figure 7A:
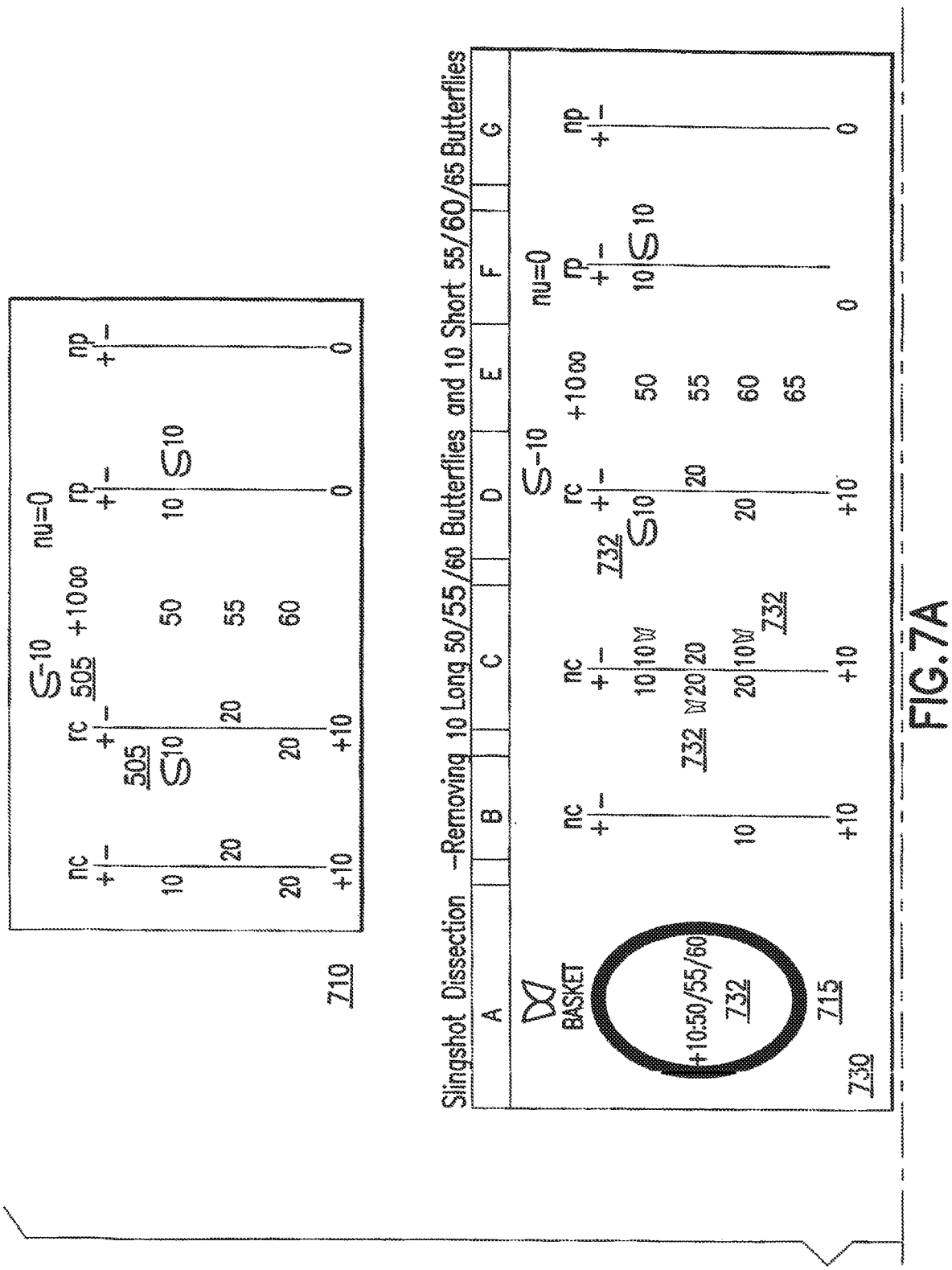
FIG. 7 (FIG. 7A and FIG. 7B) is a diagram illustrating example dissections.
Figures 7, 7B:
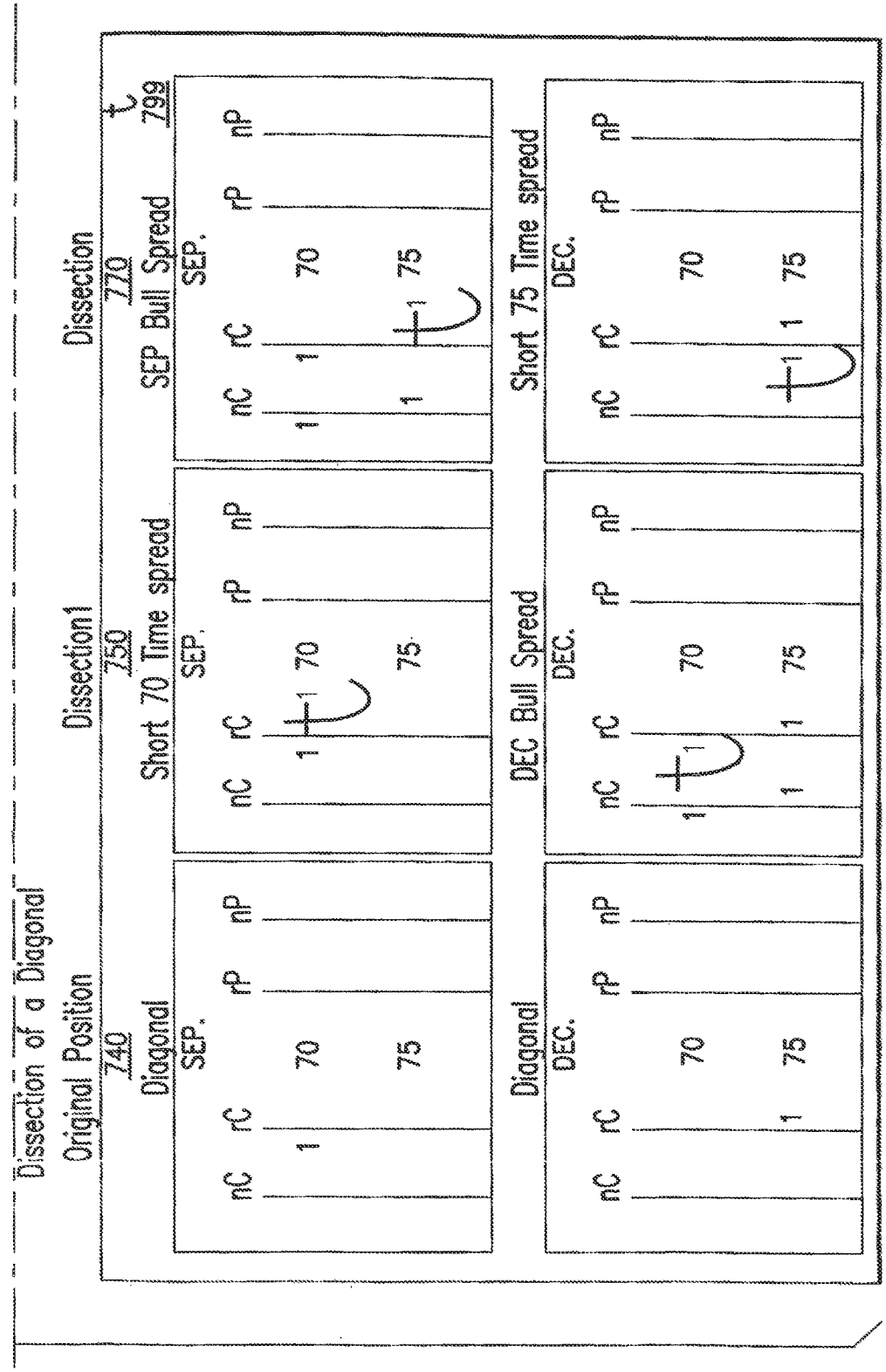

FIG. 7 illustrates example dissections. In one example embodiment, a slingshot is a versatile transaction that will be dissected. Using the VFMTGI to dissect positions allows an investor to view market opportunities, assess risk exposures, and construct alternate positions from numerous vantages and perspectives. By dissecting positions and turning to gain new vantage points, the VFMTGI allows an investor to generate new ideas for how to achieve investment goals.

Slingshot Example Structure

Thus in one embodiment, the VFMTGI may generate a SlingshotHedge as follows. For every 1oo shares of underlying, buy one put just out-of-the-money to button up the risk to the downside. Simultaneously, sell two out-of-the-money call vertical spreads and depending on how much time there is to go until expiration and implied volatility levels, it should generate enough of a credit to pay for the purchased put. With the sale of 2 verticals the risk is more manageable. The investor could even ignore the position for quite a while (barring any major market moves in either direction). Generally speaking, there will not be an assignment on the short call(s) until expiration unless there is a dividend being paid and even then the stock has to be in-the-money enough for the put of the same strike to be bought for less than the dividend amount. The investors may consider carrying extra short or long deltas depending on their short-term market opinion by increasing or decreasing the quantity of short vertical spreads. With regard to the downside, potential loss is tightly defined. With regard to the upside', the bear spreads, whether one spread per 100 shares or five, eventually stop losing while the stock has a chance to go on to greater gains. Such a structure can provide many rolling opportunities to capture more favorable risk/reward relationships for profit enhancement or to minimize loss. The worst place for the stock to be by expiration (assuming no adjustments during the cycle) is at the long strike of the short call verticals (top strike of the whole package) or at the put strike.

Wingspread Dissection

For example, dissecting out butterflies can play an important role in determining what the slingshot (in any particular ratio) actually consists of in the way of butterflies, verticals and extra options.

From a market maker perspective, butterfly dissection helps to determine the minimum quantity of options to be bought or sold in order to neutralize about 95% of a position's risk in one or two trades. As such, the VFMTGI allows one to neutralize a convoluted position with one trade. This allows one to manage their risk with greater efficiency and confidence. Assuming one maintains a positions in such a manner, i.e., "one trade away from flattening out," the VFMTGI allows market makers and/or investors to increase their chances of being nimble and quickly change their position strategy. Thus, VFMTGI butterfly dissections provide the flexibility to turn a position around in an instant if necessary. The VFMTGI allows a user to solve a number of confounding problems that have plagued many successful investors, partly owing to non-transparency, through versatile transactions that dissect positions.

Wingspread dissection 730 involves making a pretend sale or purchase of a butterfly to a position and doing the opposite in a basket called the "butterfly basket" 715. The reason that the dissecting buys one and sells one is because a trade is not really being made, and therefore the net effect is zero. To some degree, it is like debiting a trade in one account and crediting it to another.

In one embodiment, the VFMTGI's dissects butterflies 710. Position format, and position dissection using the SynTool and BoxTool already have been discussed in FIGS. 5, 6, 7 and throughout. The position chart 710 demonstrates the VFMTGI's removing the stock from the position using the SynTool 505. The VFMTGI has removed 10 conversions by pretending to trade the 50 reversal, 10 times (+10C/−10ooU/−10P).

In the columnar position chart 730, the WingTool 732 is used to denote the extraction of individual butterflies from the position. Before continuing, a legend is provided to orient the reader to the format layout with appropriate column labels starting with column G with the strike prices:

Column E: Strike Prices.

Column F: Raw (actual) put position left of the vertical line with a SynTool dissection to the right of the vertical line.

Column G: Net put position with a result of no puts left to consider.

Column D: Raw (actual) call position (the 20 lot bear spread) with a SynTool dissection to the left of the line at the 50 strike.

Column C: Net call position along with the first butterfly dissection using the WingTool to extract 10 long 50/55/60 butterflies.

Column B: Net call position after all dissections.

Column A: Butterfly basket 715 showing the inventory of butterflies after all dissections.

The removal of the 10 long butterflies is performed in Column C, i.e. the sale of 10*50/55/60 butterflies to the position, denoted by the following:

−10 (Bfly)+20 (Bfly)−10 (Bfly)

Simultaneously, this butterfly sale is offset by a purchase to the basket on the far left under column heading A. The butterfly basket is where the opposite transaction shows up so that we can monitor, separately, our inventory of butterflies. The purchase is listed as + 10: 50/55/60 732.

Time (Calendar) Spread Dissection

Time spreads should not be confused with calendar spreads, which are spreads in which the options represent two different index months, futures or forward contracts. Margin requirements are quite small for this dissection position as compared to most of the other strategies. With regard to index months, it should be noted that although it appears that options on an index are for the same underlying, they are not. The options in a given month are priced off a non-transparent synthetic futures contract in the way of the same strike combos (strike plus call minus put). Further, combos are synthetic futures and may be valued based upon the interest to carry the basket of stocks minus the dividend stream for the cycle, which is different for each expiration month.

The following two dissections 750, 770 start with the original position 740, which is long 1 Sep. 70 call and short 1 Dec. 75 call (+1 Sep. 70c/-1 Dec. 75c), a diagonal. The first dissection 750 results in a vertical in the first month (Sep.) and a lower strike time spread (short 1 Sep./Dec. 70 call time spread). It should be noted that when referring to time spreads, "short" denotes short time. A short time position is when the further term is short and the closer term is long; in other words, short time is when the further month is the short month, and the near term month is the long month. The second dissection 770 results in a vertical in the second month (Dec.) and the higher strike time spread (short Sep./Dec. 75 call time spread).

The use of a new tool for dissection, the time spread tool 799, is illustrated in the two dissections 750, 770. When used, the VFMTGI understands that if traders may add a time spreads to their positions by synthesis. As such the VFMTGI should also simultaneously sell the same spread by listing it in another place for tracking.

This two sided trade (an imaginary purchase and an imaginary sale) again is in effect no trade at all. It is merely another accounting procedure used to remove a position from one place (the raw position worksheet) and add it to another (the time spread basket). A time spread basket and/or any other basket refers to an account where positions are kept. The time spread can be used for speculation, merged with other trades that are similar, and/or used to hedge other aspects of the position. Greeks and/or statistical information can be run separately as well as in aggregate. Greeks are analytic measurements such as delta, gamma, theta, vega, rho, etc. The VFMTGI can perform analytical and/or statistical measurements by performing searches on its various databases and directing the search results to a facility capable of such measurements. In one embodiment, dedicated analytical and/or statistical tools may be used, e.g., SAS. The search results may be provided in numerous forms such as through a pipe, a file, an API, and/or the like. In another embodiment, such measurement facilities are integrated right into the VFMTGI as a series of libraries. In yet another embodiment, the financial, Greek, and/or statistical facilities may be coded straight into the VFMTGI.

When the VFMTGI evaluates the call and put verticals for both Sep. and Dec., and call and put time spreads for both months, it can determine, in this example, that there are 16 (4 verticals×4 time spreads) ways to dissect this one lot spread.

Diagonal back spreads and ratio spreads also attempt to modify the Greeks to better fit the trader's opinion of what will happen in the market. For example, if a trader thinks that volatility is low and he is going to buy a call spread, then he would buy the far month low strike call rather than the close month on a vertical in order to add vega sensitivity to his spread. In this case he will probably also benefit from a positive theta.

This dissection involves transferring positions from one month to the next by removing or adding a time spread to the position. This is an important tool for OTC (over-the-counter) book management as well as for listed options. "Book" refers to a trading company's whole position, which is passed from branch office to office as traders in the respective time zones become active. For example, the position may start out in Europe. When the European trading session closes, it is passed on to the New York office for the opening of the U.S. markets, and then later on to the Pacific rim markets. In one embodiment, the VFMTGI removes long cheap time spreads from the position because their risk is very limited. The main criteria to be considered are again price and sensitivity. Longer-dated options have less and less sensitivity to movements in the underlying than do near-dated options. At some point, a trader may have a near-term time spread in his time spread basket. These should be worked back into the aggregate position, because they become high risk and should be monitored accordingly. Often, time spread dissection is used to bring contracts to the closer months where the liquidity is greater. Notice that it is similar to butterfly dissection, but here the VFMTGI makes is possible to control in which months the vega/gamma risk is placed.

Versatile Financial Long Underlying Based Transactions

Figure 9A:
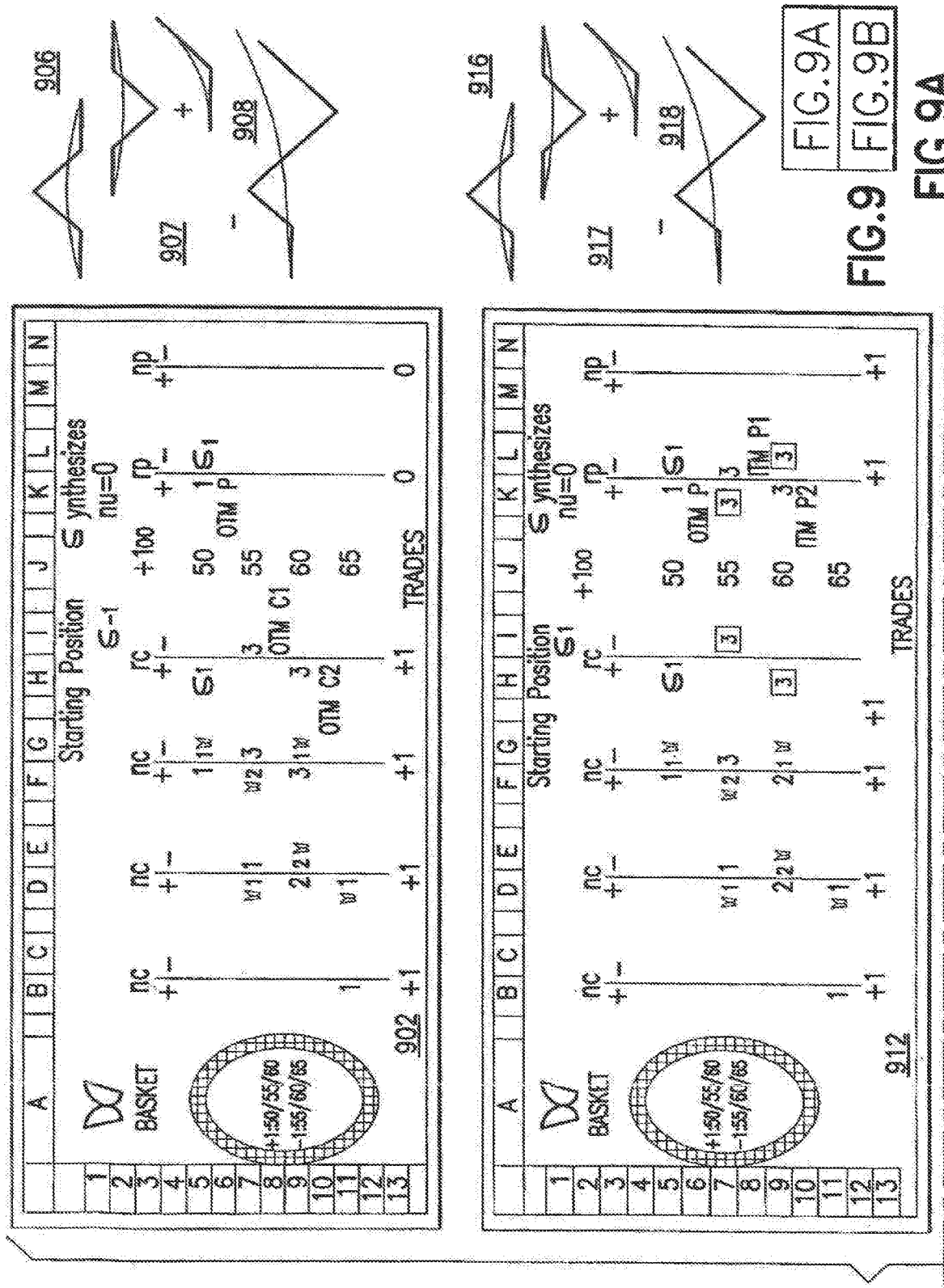
Figure 9B:
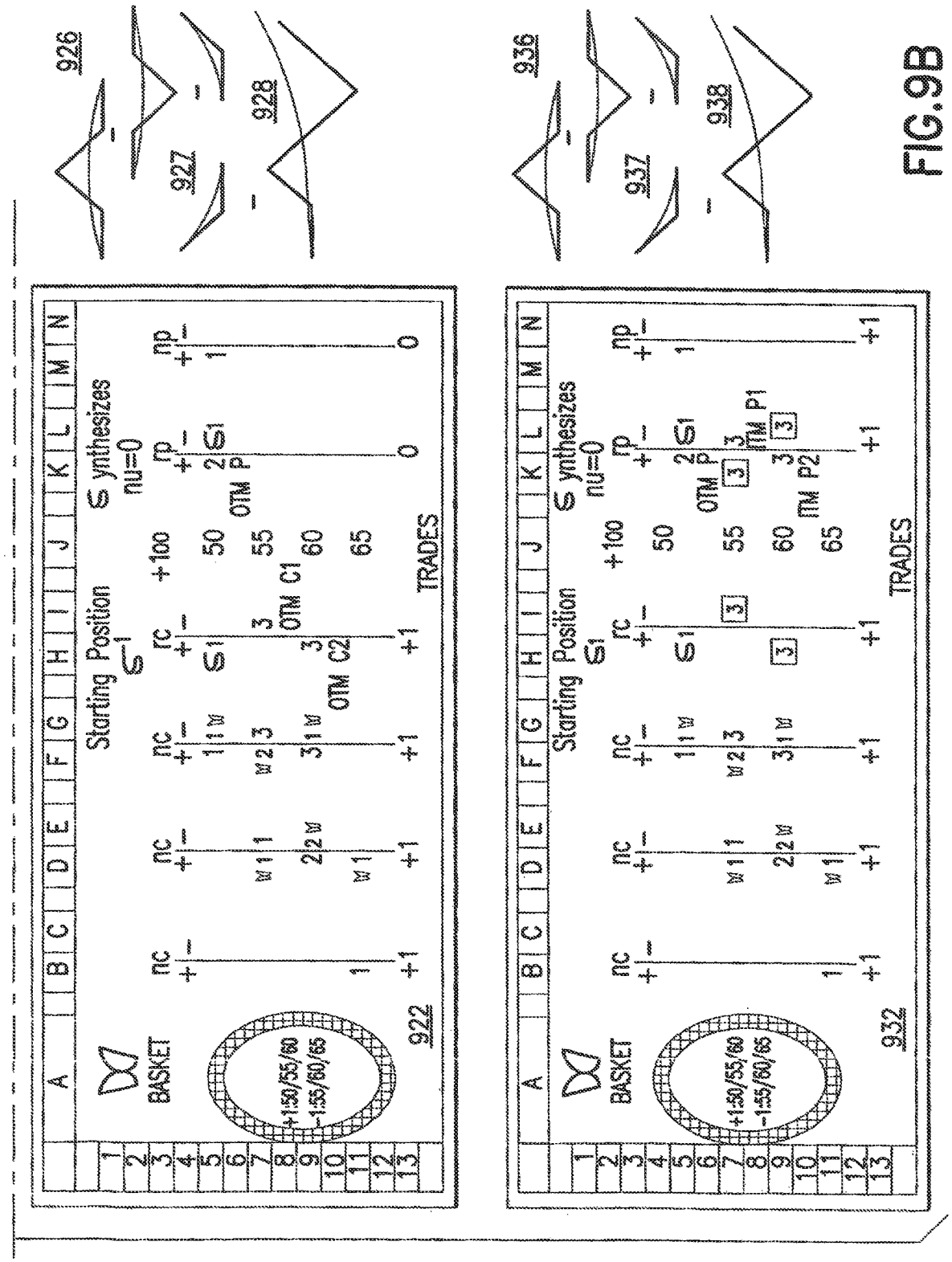
Figures 10, 10A, 10B:
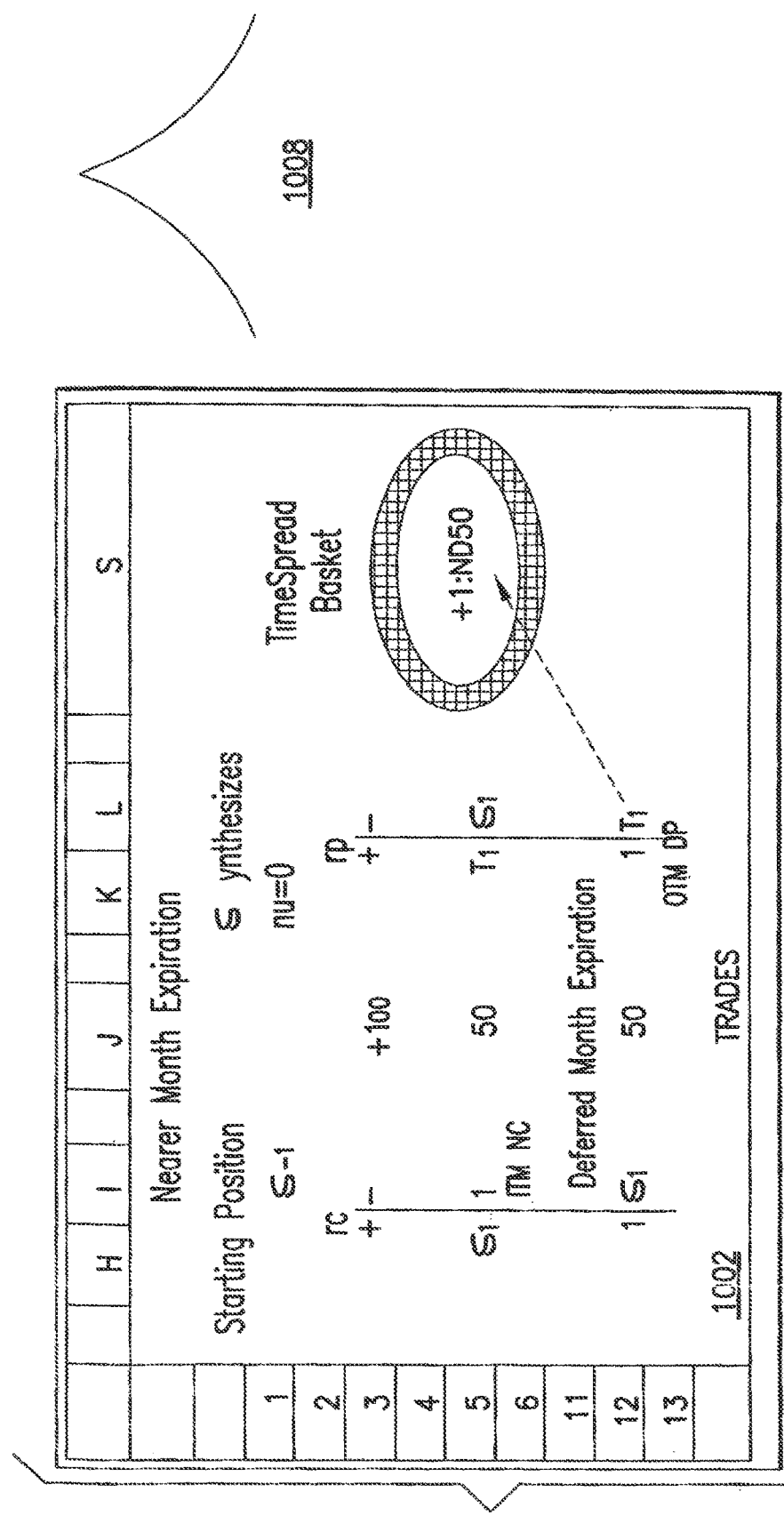
Figure 10B:
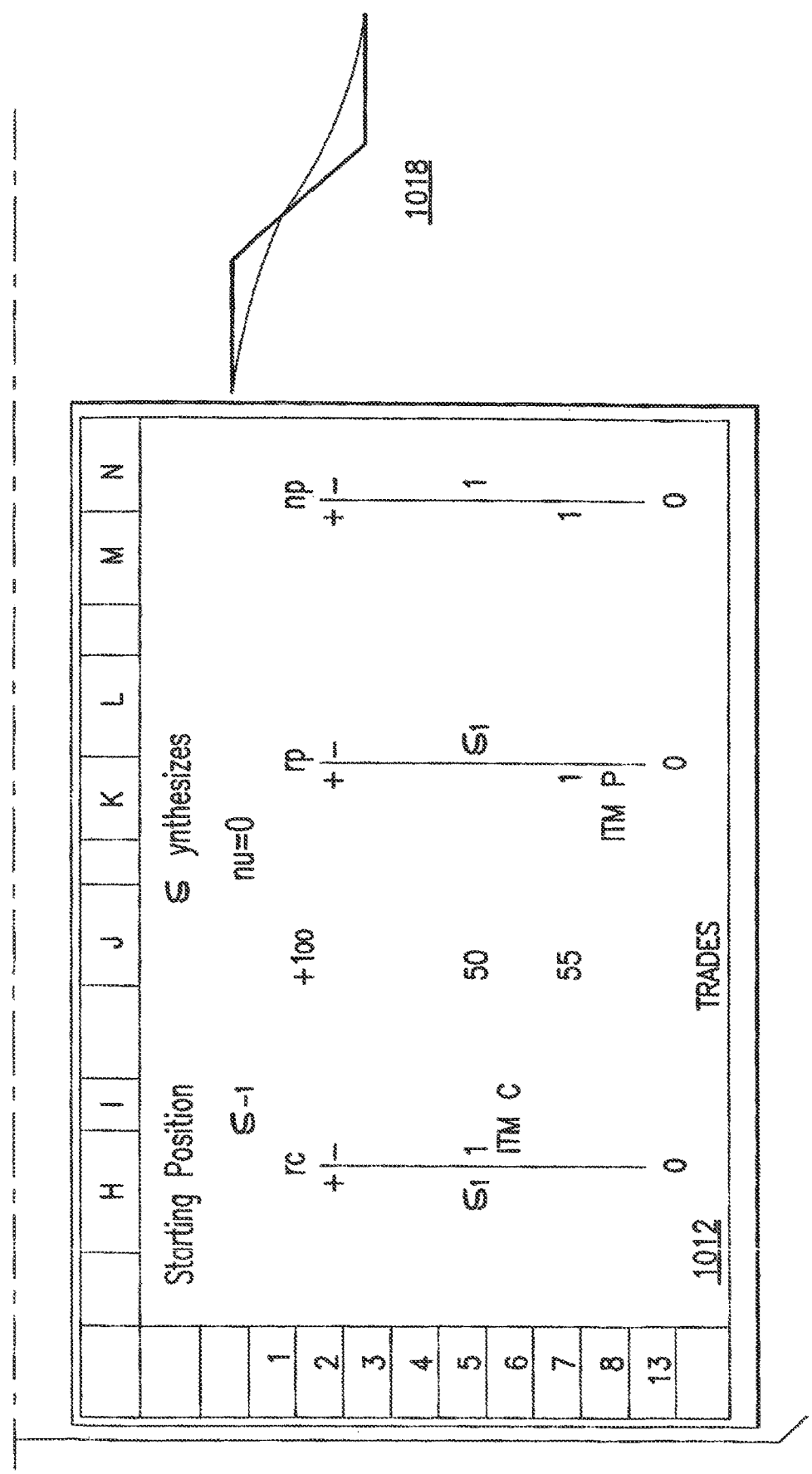

FIGS. 8-10 illustrate embodiments for versatile financial long underlying based transactions. The VFMTGI may save the following rule set descriptions in its database for retrieval. For example, when the user makes a selection for a versatile as discussed in FIG. 2, the VFMTGI would lookup the required elements for the versatile from its database as described below and in appendices. Thereafter, based on the required elements, the VFMTGI would look for such elements in the market by querying its market database for matches, as has already been discussed in FIGS. 1-3 and throughout.

SlingshotHedge Variation 1P2CV

A versatile SlingshotHedge variation comprising a single put, double call credit vertical (1P2CV) is described. In one embodiment, the VFMTGI defaults to buying 1 of the closest OTM puts and selling 2 of the next 2 higher strikes OTM call verticals. In such a case, all 3 strikes involved are normally equidistant apart and all occur in the same month. The strikes can be edited, as has already been described, so the strikes are wider apart but there may be instances of varying distances between strikes according to, the user's preference before sending the combined transaction hedge. The months can also be edited so for example the options being bought can be in the deferred month and the options to be sold can be in the nearer term month.

To that end, the format layout table (similar to one discussed in 530 of FIG. 5, 730 of FIG. 7, and throughout) for the SlingshotHedge variation 1P2CV demonstrates the transaction 802. The transaction 802 starting point, strike points, total value, and synthetic equivalent value demonstrate the ability to augment an investors risk exposure and position as illustrated with the resulting hockey stick figures 806, 807, 808.

The transaction started with a stock position before the trade as follows:

Max Gain: Unlimited
Max Loss: $5,250
Break Even Stock Price: $52.50

The transaction's exercised strike points are summarized in the following table:

| U = 52.50 | | | | |
|---|---|---|---|---|
| 3.75 | | 50 | OTM P | 1.25 |
| 1.25 | OTM C1 | 55 | | 3.75 |
| .30 | OTM C2 | 60 | | 7.80 |
| .10 | | 65 | | 12.60 |

Note:
As mentioned in earlier discussions, "C"s are calls, "P"s are puts, and "U"s are the underlying. For example, in the above table, C1 represents an out-of-the-money call strike at 55, C2 represents an out-of-the-money call strike at 60, P represents an out-of-the-money put strike at 50, and U represents an underlying position in a security at $52.50.

Such strikes result in the following fill:
0.65 credit (paid 1.25, received 0.95 twice)

This transaction may be further broken down as showing a total versatile value 806 plus a new augmented resulting position 807 as equating to a synthetic value position 808 (and hockey stick figures may depict the new position graphically 806-808).

As such the total versatile value may be expressed 806 as:
51.85

$$(5250+125-190)=(U+P-2*(C1-C2))$$

Which has a new augmented resulting position that may be expressed 807 as:
Max Gain: Unlimited
Max Loss: $185
Break Even Stock Prices:
51.85, 56.85, 61.85
And equates to a synthetic equivalent value that may be expressed 808 as:

$$\begin{aligned}\text{Long } C \text{ Bfly} + \ 155 &= (3.75 - (2*1.25)) \ .30 \\ \text{OTM } C2 \quad &\underline{\ 30\ } \\ & 185\end{aligned}$$

Note: Long $C$ $Bfly$ is a Long Call Butterfly

Note: Long C Bfly is a Long Call Butterfly

In a second embodiment, a SlingshotHedgeRoll Variation 1P2CV may be Constructed by liquidating the above mentioned hedge combination and simultaneously initiating the same initial hedge in a different month and/or set of strikes. In another embodiment, the trade of the first embodiment is combined with +looU for the complete package.

SlingshotHedge variation 1P2PV

A versatile SlingshotHedge variation comprising a single put, double put credit vertical (1P2PV) is described. In one embodiment, the VFMTGI defaults to buying 1 of the closest OTM puts and buying 2 of the next 2 higher strikes OTM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited so for example the options being bought can be in the deferred month and the options to be sold can be in the nearer term month.

To that end, the format layout table for the SlingshotHedgevariation 1P2PV demonstrates the transaction 812. The transaction 812 starting point, strike points, total value, and synthetic equivalent value demonstrate the ability to augment an investors risk exposure and position as illustrated with the resulting hockey stick figures 816, 817, 818.

The transaction started with a stock position before the trade as follows:
Max Gain: Unlimited
Max Loss: $5,250
Break Even Stock Price: $52.50

The transaction's exercised strike points are summarized in the following table:

| U = 52.50 Nearer Month | | | | |
|---|---|---|---|---|
| 3.75 | | 50 | OTM P | 1.25 |
| 1.25 | OTM C1 | 55 | ITM P1 | 3.75 |
| .30 | OTM C2 | 60 | ITM P2 | 7.80 |

Such strikes result in the following fill:
8.35 debit (paid 1.25, paid 4.05 twice)

This transaction may be further broken down as showing a total versatile value 816 plus a new augmented resulting position 817 as equating to a synthetic value position 818 (and hockey stick figures may depict the new position graphically 816-818).

As such the total versatile value may be expressed 816 as:
60.95=

$$(5250+125+8.10)=(U+P-2*(P2-P1))$$

Which has a new augmented resulting position that may be expressed 817 as:
Max Gain: Unlimited
Max Loss: $185
Break Even Stock Prices:
51.85, 56.85, 61.85
And equates to a synthetic equivalent value that may be expressed 818 as:

$$\begin{aligned}\text{Long } C \text{ Bfly} + \ 155 &= (3.75 - (2*1.25)) \ .30 \\ \text{OTM } C2 \quad &\underline{\ 30\ } \\ & 185\end{aligned}$$

In a second embodiment, a SlingshotHedgeRoll Variation 1P2PV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 2P2PVlooU

A versatile SlingshotHedge variation comprising a double put, double call credit vertical, +loo underlying (2P2PVlooU) is described. In one embodiment, the VFMTGI defaults to buying 2 of the closest OTM puts and selling 2 of the next 2 higher strikes OTM call verticals and buying loo underlying. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited so for example the options being bought can be in the deferred month and the options to be sold can be in the nearer term month.

To that end, the format layout table for the SlingshotHedge variation 1P2PV demonstrates the transaction 822. The transaction 822 starting point, strike points, total value, and synthetic equivalent value demonstrate the ability to augment an investors risk exposure and position as illustrated with the resulting hockey stick figures 826, 827, 828.

The transaction started with a stock position before the trade as follows:

Max Gain: Unlimited
Max Loss: $5,250
Break Even Stock Price: $52.50

The transaction's exercised strike points are summarized in the following table:

| U = 52.50 | | | | |
|---|---|---|---|---|
| 3.75 | | 50 | OTMP | 1.25 |
| 1.25 | OTMC1 | 55 | | 3.75 |
| .30 | OTMC2 | 60 | | 7.80 |
| .10 | | 65 | | 12.60 |

Such strikes result in the following fill:
53.10 debit: (52.50 loo times
paid 1.25 twice, received 0.95 twice)

This transaction may be further broken down as showing a total versatile value 826 plus a new augmented resulting position 827 as equating to a synthetic value position 818 (and hockey stick figures may depict the new position graphically 826-828).

As such the total versatile value may be expressed 826 as:
53.10=

$$(5250+250-190)=1(U+2*P-2*(C1-C2))$$

Which has a new augmented resulting position that may be expressed 827 as:
Max Gain: Unlimited
Max Loss: $310
Break Even Stock Prices:
53.10, 56.90, 63.90
And equates to a synthetic equivalent value that may be expressed 828 as:

$$\begin{aligned} \text{Long } C \text{ Bfly} + 155 &= (3.75 - (2*1.25)\ .30) \\ \text{OTM } C2 + &\phantom{=}\ 30 \\ \text{OTM } P &\phantom{=}\ 310 \end{aligned}$$

In a second embodiment, a SlingshotHedgeRoll Variation 2P2CV may be constructed by liquidating the above mentioned hedge combination and simultaneously initiating the same initial hedge in a different month and/or set of strikes.

SlingshotHedge Variation 2P2PV

A versatile SlingshotHedge variation comprising a double put, double put debit vertical (2P2PV) is described. In one embodiment, the VFMTGI defaults to buying 2 of the closest OTM puts and buying 2 of the next 2 higher strikes ITM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited so for example the options being bought can be in the deferred month and the options to be sold can be in the nearer term month.

To that end, the format layout table for the SlingshotHedge variation 2P2PV demonstrates the transaction 832. The transaction 832 starting point, strike points, total value, and synthetic equivalent value demonstrate the ability to augment an investors risk exposure and position as illustrated with the resulting hockey stick figures 836, 837, 838.

The transaction started with a stock position before the trade as follows:

Max Gain: Unlimited
Max Loss: $5,250
Break Even Stock Price: $52.50

The transaction's exercised strike points are summarized in the following table:

| U = 52.50 Nearer Month | | | |
|---|---|---|---|
| 3.75 | 50 | OTMP | 1.25 |
| 1.25 | 55 | ITMP1 | 3.75 |
| .30 | 60 | ITM P2 | 7.80 |

Such strikes result in the following fill:
10.60 debit (paid 1.25 twice, paid 4.05 twice)

This transaction may be further broken down as showing a total versatile Value 836 plus a new augmented resulting position 837 as equating to a synthetic value position 838 (and hockey stick figures may depict the new position graphically 836-838).

As such the total versatile value maybe expressed 836 as:
63.10=

$$(5250+250+810)=(U+2*P+2*(P2-P1))$$

Which has a new augmented resulting position that may be expressed 837 as:
Max Gain: Unlimited
Max Loss: $310
Break Even Stock Prices:
53.10, 56.90, 63.90
And equates to a synthetic equivalent value that may be expressed 838 as:

$$\begin{aligned} \text{Long } C \text{ Bfly} + 155 &= (3.75 - (2*1.25)\ .30) \\ \text{OTM } C2 + &\phantom{=}\ 30 \\ \text{OTM } P &\phantom{=}\ 310 \end{aligned}$$

In a second embodiment, a SlingshotHedgeRoll Variation 2P2PV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 1P3CV

In FIG. 9, a versatile SlingshotHedge variative comprising a single put, triple call credit vertical (1P3CV) is described. In one embodiment, the VFMTGI defaults to buying 1 of the closest OTM puts and selling 3 of the next 2 higher strikes OTM call verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited so for example the options being bought can be in the deferred month and the options to be sold can be in the nearer term month.

To that end, the format layout table for the SlingshotHedge variation 1P3CV demonstrates the transaction 902. The transaction 902 starting point, strike points, total value, and synthetic equivalent value demonstrate the ability to augment an investors risk exposure and position as illustrated with the resulting hockey stick figures 906, 907, 908.

The transaction started with a stock position before the trade as follows:
Max Gain: Unlimited Max
Loss: $5,250
Break Even Stock Price: $52.50

The transaction's exercised strike points are summarized in the following table:

| | | U = 52.50 | | |
|---|---|---|---|---|
| 3.75 | | 50 | OTMP | 1.25 |
| 1.25 | OTMC1 | 55 | | 3.75 |
| .30 | OTMC2 | 60 | | 7.80 |
| .10 | | 65 | | 12.60 |

Such strikes result in the following fill:
1.60 credit (paid 1.25 once, received 0.95 three times)

This transaction may be further broken down as showing a total versatile value 906 plus a new augmented resulting position 907 as equating to a synthetic value position 908 (and hockey stick figures may depict the new position graphically 906-908).

As such the total versatile value may be expressed 906 as:
50.90=

$$(5250+125-285)=(u+p-3*(C1-C2))$$

Which has a new augmented resulting position that may be expressed 907 as:
Max Gain: Unlimited
Max Loss: $590
Break Even Stock Prices:
50.90, 57.05, 65.90

And equates to a synthetic equivalent value that may be expressed 908 as:

| | | | |
|---|---|---|---|
| Long C Bfly | 155 | debit = (3.75 − 2*1.25) + .30 | |
| Short C Bfly + | 75 | credit = (−1.25 − (2*.30) − .10) | |
| OTM C3 | | 10 | |
| | | 90 | |

In a second embodiment, a SlingshotHedgeRoll Variation 1P3CV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 1P3PV

A versatile SlingshotHedge variation comprising single put, triple put debit vertical (1P3PV) is described. In one embodiment, the VFMTGI defaults to buying 1 of the closest OTM puts and buying 3 of the next 2 higher strikes ITM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited so for example the options being bought can be in the deferred month and the options to be sold can be in the nearer term month.

To that end, the format layout table for the SlingshotHedge variation 1P3PV demonstrates the transaction 912. The transaction 912 starting point, strike points, total value, and synthetic equivalent value demonstrate the ability to augment an investors risk exposure and position as illustrated with the resulting hockey stick figures 916, 917, 918.

The transaction started with a stock position before the trade as follows:
Max Gain: Unlimited
Max Loss: $5,250
Break Even Stock Price: $52.50

The transaction's exercised strike points are summarized in the following table:

| | | U = 52.50 Nearer Month | | |
|---|---|---|---|---|
| 3.75 | | 50 | OTM P | 1.25 |
| 1.25 | OTM C1 | 55 | ITM P1 | 3.75 |
| .30 | OTM C2 | 60 | ITM P2 | 7.80 |

Such strikes result in the following fill:
13.40 debit (paid 1.25 once, paid 4.05 three times)

This transaction may be further broken down as showing a total versatile value 916 plus a new augmented resulting position 917 as equating to a synthetic value position 918 (and hockey stick figures may depict the new position graphically 916-918).

As such the total versatile value maybe expressed 916 as:
50.90=

$$(5250+125+12.15)=(U+P+3*(P2-P1))$$

Which has a new augmented resulting position that maybe expressed 917 as:
Max Gain: Unlimited
Max Loss: $590
Break Even Stock Prices:
50.90, 57.05, 65.90

And equates to a synthetic equivalent value that may be expressed 818 as:

| | | | |
|---|---|---|---|
| Long C Bfly | 155 | debit = (3.75 − 2*1.25) + .30 | |
| Short C Bfly + | 75 | credit = (−1.25 − (2*.30) − .10) | |
| OTM C3 | | 10 | |
| | | 90 | |

In a second embodiment, a SlingshotHedgeRoll Variation 1P3PV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 2P3CV

A versatile SlingshotHedge variation comprising double put, triple call credit Vertical (2P3CV) is described. In one embodiment, the VFMTGI defaults to buying 1 of the closest OTM puts and buying 3 of the next 2 higher strikes ITM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited so for example the options being bought can be in the deferred month and the options to be sold can be in the nearer term month.

To that end, the format layout table for the SlingshotHedge variation 1P3PV demonstrates the transaction 922. The transaction 922 starting point, strike points, total value, and synthetic equivalent value demonstrate the ability to augment an investors risk exposure and position as illustrated with the resulting hockey stick figures 926, 927, 928.

The transaction started with a stock position before the trade as follows:
Max Gain: Unlimited
Max Loss: $5,250
Break Even Stock Price: $52.50

The transaction's exercised strike points are summarized in the following table:

| | | U = 52.50 | | |
|---|---|---|---|---|
| 3.75 | | 50 | OTMP | 1.25 |
| 1.25 | OTMC1 | 55 | | 3.75 |
| .30 | OTMC2 | 60 | | 7.80 |
| .10 | | 65 | | 12.60 |

Such strikes result in the following fill:
0.35 credit (paid 1.25 twice, received 0.95 three times)

This transaction may be further broken down as showing a total versatile value 926 plus a new augmented resulting position 927 as equating to a synthetic value position 928 (and hockey stick figures may depict the new position graphically 926-928).

As such the total versatile value may be expressed 926 as:
52.15=

$$(5250+250-285(U+2P-3*(C1-C2))$$

Which has a new augmented resulting position that may be expressed 927 as:
Max Gain: Unlimited
Max Loss: $715
Break Even Stock Prices:
52.15, 56.425, 67.15

And equates to a synthetic equivalent value that may be expressed 828 as:

| Long $C$ Bfly | 155 | debit = $(3.75 - (2*1.25) + .30)$ |
|---|---|---|
| Short $C$ Bfly + | 75 | credit = $(-1.25 - (2*.30) - .10)$ |
| OTM $C3$ + | 10 | |
| OTM $P$ | 125 | |
| | 215 | |

In a second embodiment, a SlingshotHedgeRoll Variation 2P3CV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 2P3PV

A versatile SlingshotHedge variation comprising a double put, triple put debit vertical (2P3PV) is described. In one embodiment, the VFMTGI defaults to buying 2 of the closest OTM puts and buying 3 of the next 2 higher strikes ITM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited so for example the options being bought can be in the deferred month and the options to be sold can be in the nearer term month.

To that end, the format layout table for the SlingshotHedge variation 1P3PV demonstrates the transaction 932. The transaction 932 starting point, strike points, total value, and synthetic equivalent value demonstrate the ability to augment an investors risk exposure and position as illustrated with the resulting hockey stick figures 936, 937, 938.

The transaction started with a stock position before the trade as follows:
Max Gain: Unlimited
Max Loss: $5,250
Break Even Stock Price: $52.50

The transaction's exercised strike points are summarized in the following table:

| | | U = 52.50 | | |
|---|---|---|---|---|
| | | Nearer Month | | |
| 3.75 | | 50 | OTM P | 1.25 |
| 1.25 | OTM C1 | 55 | ITM P1 | 3.75 |
| .30 | OTM C2 | 60 | ITM P2 | 7.80 |

Such strikes result in the following fill:
14.65 debit (paid 1.25 twice, paid 4.05 three times)

This transaction may be further broken down as showing a total versatile value 936 plus a new augmented resulting position 937 as equating to a synthetic value position 938 (and hockey stick figures may depict the new position graphically 936-938).

As such the total versatile value may be expressed 936 as:
67.15=

$$(5250+250+1215)=(U+2P-3*(P2-P1))$$

Which has a new augmented resulting position that may be expressed 927 as:
Max Gain: Unlimited
Max Loss: $715
Break Even Stock Prices:
52.15, 56.425, 67.15

And equates to a synthetic equivalent value that may be expressed 828 as:

| Long $C$ Bfly | 155 | debit = $(3.75 - (2*1.25) + .30)$ |
|---|---|---|
| Short $C$ Bfly + | 75 | credit = $(-1.75 - (2*.30) - .10)$ |
| OTM $C3$ + | 10 | |
| OTM $P$ | 125 | |
| | 215 | |

In a second embodiment, a SlingshotHedgeRoll Variation 2P3PV may be Constructed by liquidating the above mentioned hedge combination and simultaneously initiating the same initial hedge in a different month and/or set of strikes. In another embodiment, the trade of the first embodiment is combined with +looU for the complete package.

CalendarHedge

In FIG. 10, a versatile CalendarHedge variation is described. In one embodiment, the VFMTGI defaults to selling a near month call and buying the same strike put a deferred month. In such a case, the months can also be edited. For example, the options being bought can be in the deferred month and the options to be sold can be in the nearer term month.

To that end, the format layout table for the CalendarHedge demonstrates the transaction 1002. The transaction 1002 starting point, strike points, total value, and synthetic equivalent value demonstrate the ability to augment an investors tjsk exposure and position as illustrated with the resulting hockey stick FIG. 1008.

The transaction started with a stock position before the trade as follows:
Max Gain: Unlimited Max
Loss: $5,250
Break Even Stock Price: $52.50
The transaction's exercised strike points are summarized in the following table:

| U = 52.50 | | | | |
|---|---|---|---|---|
| | | Nearer Month | | |
| 3.75 | ITM NC | 50 | | 1.25 |
| | | Deferred Month | | |
| 4.70 | | 50 | OTM DP | 2.20 |

Such strikes result in the following fill:
1.55 credit (paid 2.20, received 3.75)
This transaction may be further broken down as showing a total versatile value plus a new augmented resulting position as equating to a synthetic value position 1008 (and hockey stick figures may depict the new position graphically 1008).
As such the total versatile value may be expressed as:
50.95=

$$(5250+2.20-375(U+PTM\ DP-ITM\ NC)$$

Which has a new augmented resulting position that may be expressed 1008 as:
Max Gain: *
Max Loss: $95
Break Even Stock Prices: *
Note: Undeterminable because there is no way to tell the level of implied volatility when the near month expires.
And equates to a synthetic equivalent value that may be expressed as:
95=
Call Calendar Spread 95 debit=4.70-3.75
OR
Put Calendar Spread 95 debit=2.20-1.25
In a second embodiment, a CalendarHedgeRoll may be constructed by liquidating the above mentioned hedge combination and simultaneously initiating the same initial hedge in a different month and/or set of strikes. In another embodiment, the trade of the first embodiment is combined with +looU for the complete package.

BearCollar

A versatile BearCollar is described. In one embodiment, the VFMTGI defaults selling closest ITM call and buying a higher strike put. Both strikes involved are in the same month. It should be noted that if these were OTM options, the result would be a BullCollar. The user can edit the strikes to be wider apart as has already been discussed in FIG. 3. Also, according to the user's preference, before sending the combined transaction hedge, the user may instruct the VFMTGI to use varying distances between strikes. The months also can be edited. For example, the options being bought can be in the deferred month and the options to be sold can be in the nearer term month To that end, the format layout table for the BearCollar demonstrates the transaction 1012. The transaction 1012 starting point, strike points, total value, and synthetic equivalent value demonstrate the ability to augment an investors risk exposure and position as illustrated with the resulting hockey stick FIG. 1018.

The transaction started with a stock position before the trade as follows:
Max Gain: Unlimited
Max Loss: $5,250
Break Even Stock Price: $52.50
The transaction's exercised strike points are summarized in the following table:

| U = 52.50 | | | | |
|---|---|---|---|---|
| 3.75 | ITM C | 50 | | 1.25 |
| 1.25 | | 55 | ITM P | 3.75 |

Such strikes result in the following fill:
even money (zero cost) (paid 3.75, received 3.75)
This transaction may be further broken down as showing a total versatile value plus a new augmented resulting position as equating to a synthetic value position 1008 (and hockey stick figures may depict the new position graphically 1008).
As such the total versatile value may be expressed as:
5250=

$$(5250-375+375)=(U-C+P)$$

Which has a new augmented resulting position that may be expressed 1008 as:
Max Gain: $250
Max Loss: $250
Break Even Stock Prices:
52.50
And equates to a synthetic equivalent value that may be expressed as:
250=
Bear Put Vertical Spread 250 debit 1.25=3.75-1.25
OR
Bear Put Vertical Spread 250 credit=1.25-3.75
In a second embodiment, a BearCollarRoll may be constructed by liquidating the above mentioned hedge combination and simultaneously initiating the same initial hedge in a different month and/or set of strikes. In another embodiment, the trade of the first embodiment is combined with +looU for the complete package.

Versatile Financial Short Underlying Based Transactions

Figure 11B:
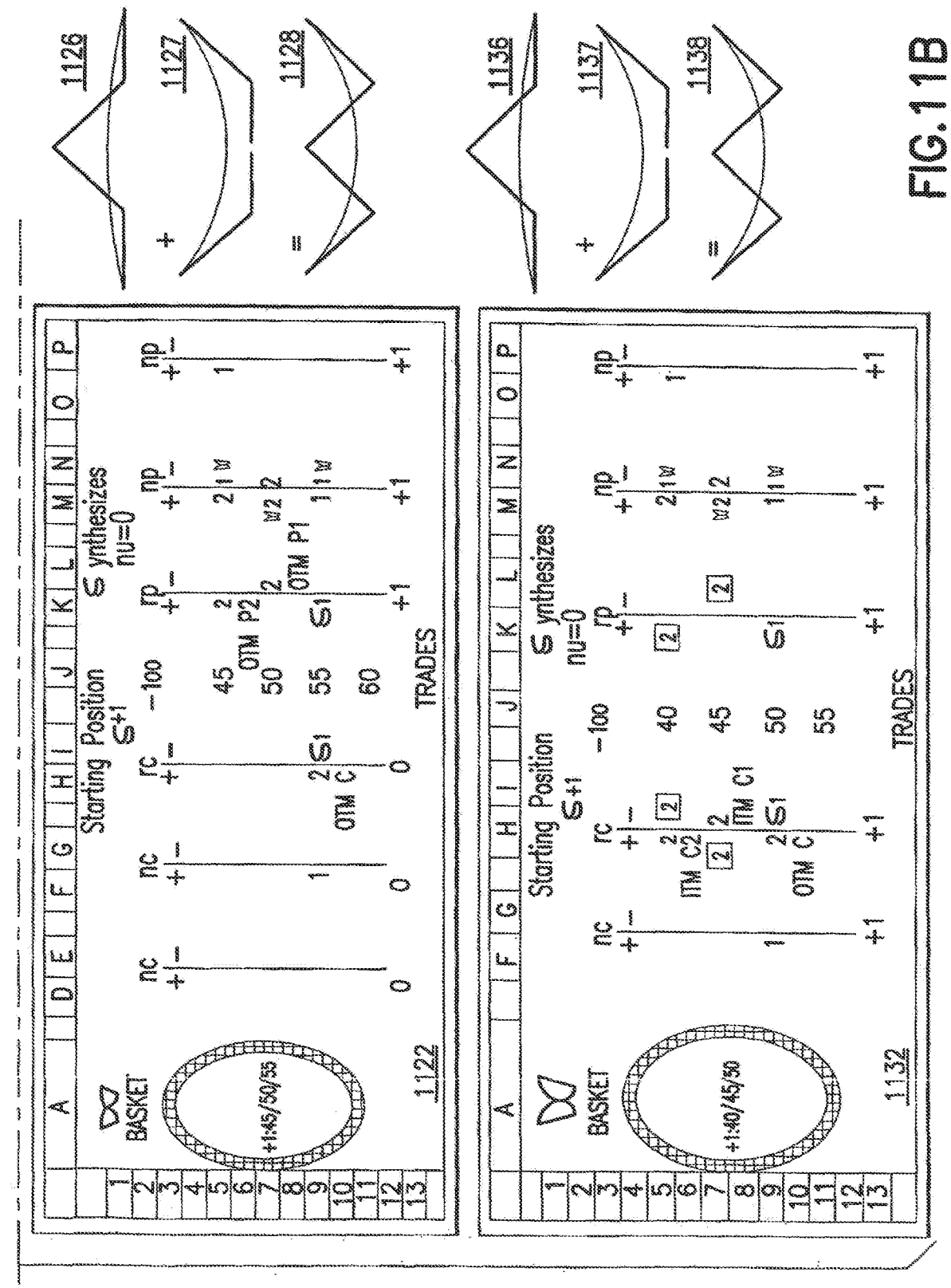
FIGS. 11-13 (FIG. 11A-FIG. 13B) are of diagrams illustrating embodiments for versatile financial short underlying based transactions.
Figure 12B:
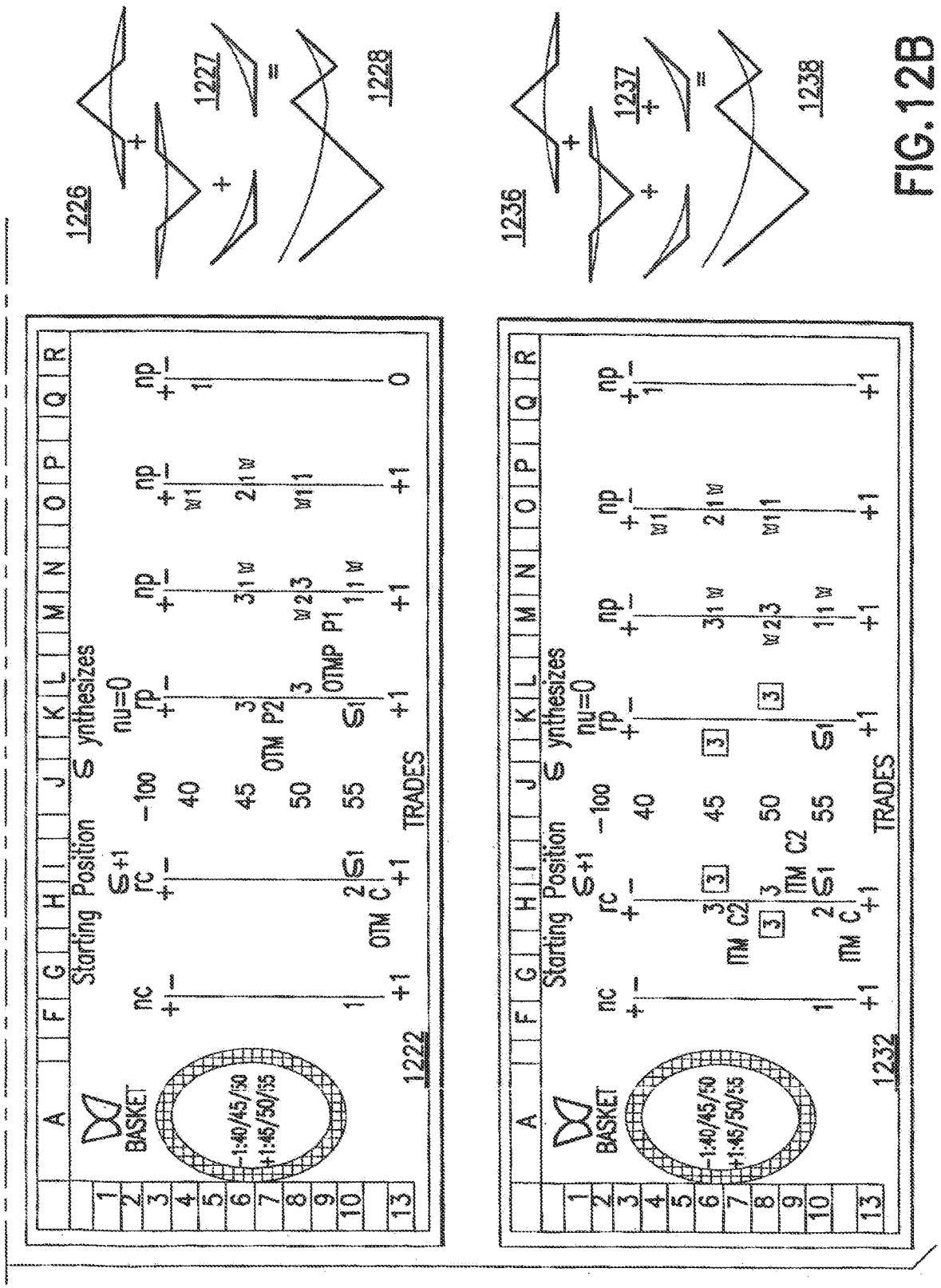
Figures 13, 13A, 13B:
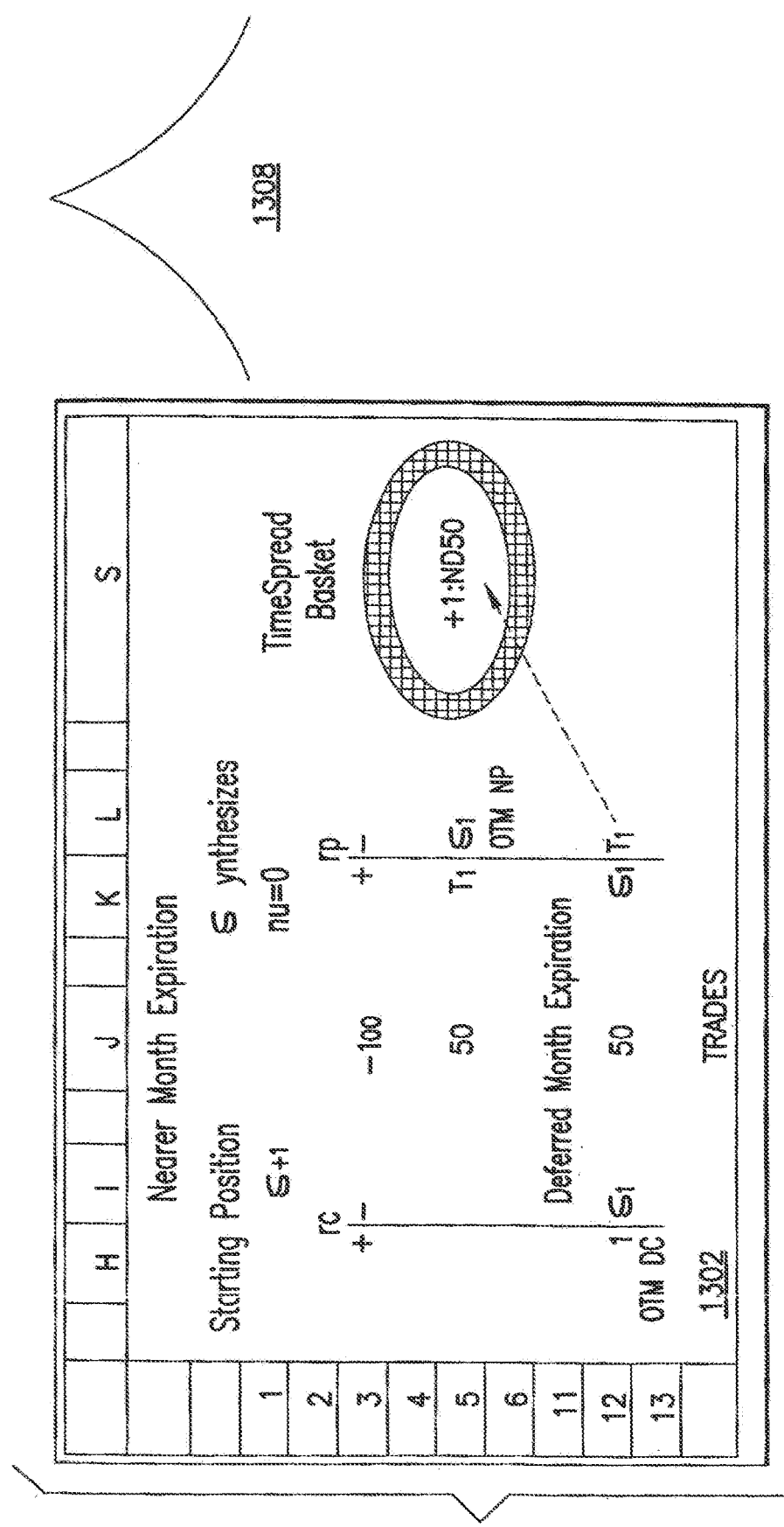
Figure 13B:
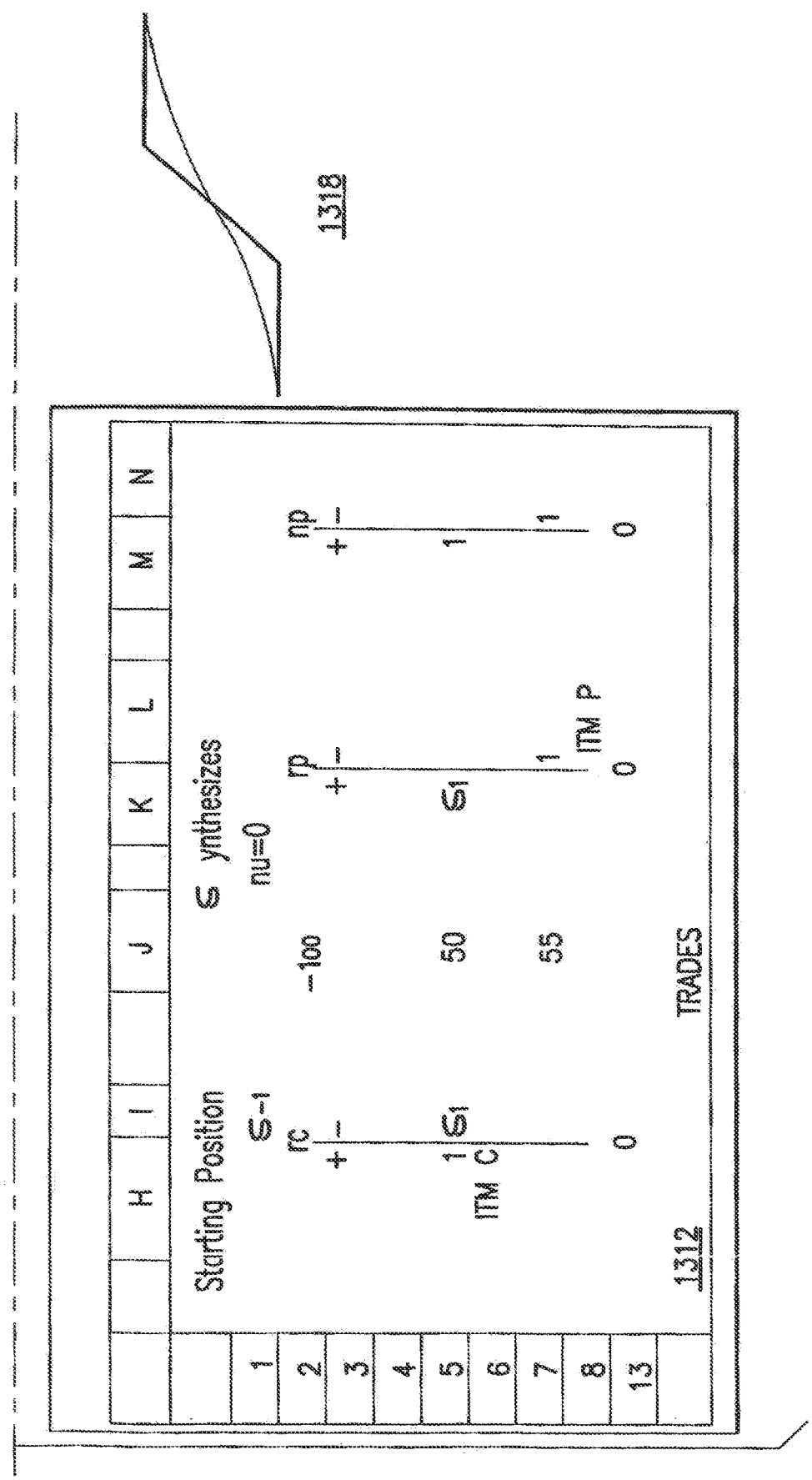

FIGS. 11-13 illustrate embodiments for versatile financial short underlying based transactions. The VFMTGI may save the following rule set descriptions in its database for retrieval. For example, when the user makes a selection for a versatile as discussed in FIG. 2, the VFMTGI would lookup the required elements for the versatile from its database as described below and in appendices. Thereafter, based on the required elements, the VFMTGI would look for such elements in the market by querying its market database for matches, as has already been discussed in FIGS. 1-3 and throughout.

SlingshotHedge Variation 1C2PV

A versatile SlingshotHedge variation comprising a single call, double put credit vertical (1C2PV) is described. In one embodiment, the VFMTGI defaults to buying 1 of the closest OTM calls and selling 2 of the next 2 lower strikes OTM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the SlingshotHedge variation 1C2PV demonstrates the transaction 1102. The transaction 1102 starting point, strike points, total value, and synthetic equivalent value demonstrate the ability to augment an investors risk exposure and position as illustrated with the resulting hockey stick figures 1106, 1107, 1108.

The transaction started with a stock position before the trade as follows:
Max Gain: $5,250
Max Loss: Unlimited
Break Even Stock Price: $52.50
The transaction's exercised strike points are summarized in the following table

| U = 52.50 Nearer Month | | |
|---|---|---|
| 12.70 | 40 | 0.20 |
| 7.90 | 45 | 0.40 |
| 3.75 | 50 | 1.25 |
| 1.25 | 55 | 3.75 |
| .30 | 60 | 7.80 |
| .10 | 65 | 12.60 |

Such strikes result in the following fill:
0.45 credit (paid 1.25, received 0.85 twice)
This transaction may be further broken down as showing a total versatile value 1106 plus a new augmented resulting position 1107 as equating to a synthetic value position 1108 (and hockey stick figures may depict the new position graphically 1106-1108).

As such the total versatile value may be expressed 1106 as:
52.95=

$$(-5250-125+1.70)=(-U-P-2*(P-P1))$$

Which has a new augmented resulting position that may be expressed 1107 as:
Max Gain: 4295
Max Loss: 2.05
Break Even Stock Prices:
52.95, 47.05, 42.05
And equates to a synthetic equivalent value that may be expressed 1108 as:

Long P Bfly + 165 = (3.75 − (2*1.25) .40)
OTM P      40
              205

In a second embodiment, a SlingshotHedgeRoll Variation 1C2PV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 1P2CV

A versatile SlingshotHedge variation comprising a single put, double call debit vertical (1P2CV) is described. In one embodiment, the VFMTGI defaults to buying 1 of the closest OTM puts and buying 2 of the next 2 lower strikes ITM call verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the SlingshotHedge variation 1P2CV demonstrates the transaction 1112. The transaction 1112 starting point, strike points, total value, and synthetic equivalent value demonstrate the ability to augment an investors risk exposure and position as illustrated with the resulting hockey stick figures 1116, 1117, 1118.

The transaction started with a stock position before the trade as follows:
Max Gain: $5,250 Max
Loss: Unlimited
Break Even Stock Price: $52.50
The transaction's exercised strike points are summarized in the following table:

| U = 52.50 Nearer Month | | |
|---|---|---|
| 12.70 | 40 | 0.20 |
| 7.90 | 45 | 0.40 |
| 3.75 | 50 | 1.25 |
| 1.25 | 55 | 3.75 |
| .30 | 60 | 7.80 |
| .10 | 65 | 12.60 |

Such strikes result in the following fill:
9.55 debit (paid 1.25, paid 4.15 twice)
This transaction may be further broken down as showing a total versatile value 1116 plus a new augmented resulting position 1117 as equating to a synthetic value position 1118 (and hockey stick figures may depict the new position graphically 1116-1118).

As such the total versatile value may be expressed 1116 as:
42.95=

$$(5250+125+8.10)=(U+C-2*(C2-C1))$$

Which has a new augmented resulting position that may be expressed 1117 as:
Max Gain: 4295
Max Loss: 2.05
Break Even Stock Prices:
52.95, 47.05, 42.05
And equates to a synthetic equivalent value that may be expressed 1118 as:

Long P Bfly + 165 = (3.75 − (2*1.25) .40)
OTM P      40
              205

In a second embodiment, a SlingshotHedgeRoll Variation 1C2CV may be constructed by liquidating the above mentioned hedge combination and simultaneously initiating the same initial hedge in a different month and/or set of strikes.

SlingshotVariation 2C2PV-looU

A versatile SlingshotHedge variation comprising a double call, double put credit vertical, -loo underlying (2C2PV-1ooU) is described. In one embodiment, the VFMTGI defaults to buying 2 of the closest OTM calls and selling 2 of the next 2 lower strikes OTM put verticals and Selling loo underlying. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the SlingshotHedge variation 2C2PV-looU demonstrates the transaction 1122. The transaction 1122 starting point, strike points, total value, and synthetic equivalent value demonstrate the ability to augment an investors exposure and position as illustrated with the resulting hockey stick figures 1126, 1127, 1128.

The transaction started with a stock position before the trade as follows:

Max Gain: Unlimited Max

Loss: $5,250

Break Even Stock Price: $52.50

The transaction's exercised strike points are summarized in the following table:

| U = 52.50 Nearer Month | | | |
|---|---|---|---|
| 12.70 | | 40 | 0.20 |
| 7.90 | | 45 | OTM P2 | 0.40 |
| 3.75 | | 50 | ITM P1 | 1.25 |
| 1.25 | | 55 | ITM P | 3.75 |
| .30 | OTM C | 60 | | 7.80 |
| .10 | | 65 | | 12.60 |

Such strikes result in the following fill:

0.60 debit (received $52.50 loo times, paid 1.25 twice, received 0.85 twice)

This transaction may be further broken down as showing a total versatile value 1126 plus a new augmented resulting position 1127 as equating to a synthetic value position 1128 (and hockey stick figures may depict the new position graphically 1126-1128).

As such the total versatile value may be expressed 1126 as:

51.70 credit=

$$(-5250+250-170)=(U+2*C-2*(P2-P1))$$

Which has a new augmented resulting position that may be expressed 1127 as:

Max Gain: Unlimited

Max Loss: $310

Break Even Stock Prices:

53.30, 56.70, 63.70

And equates to a synthetic equivalent value that may be expressed 1128 as:

$$\begin{aligned} \text{Long } P \text{ Bfly} + \quad & 165 \quad = (3.75 - (2*1.25)\ .40) \\ OTM\ C + \quad & 125 \\ OTM\ P \quad & \underline{40} \\ & 330 \end{aligned}$$

In a second embodiment, a SlingshotHedgeRoll Variation 2C2PV may be constructed by liquidating the above mentioned hedge combination and simultaneously initiating the same initial hedge in a different month and/or set of strikes.

Slingshot Variation 2C2CV

A versatile SlingshotHedge variation comprising a double call, double call debit vertical (2C2CV) is described. In one embodiment, the VFMTGI defaults to buying 2 of the closest OTM Calls and buying 2 of the next 2 lower strikes ITM Call verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the SlingshotHedge variation 2C2CV demonstrates the transaction 1132. The transaction 1132 starting point, strike points, total value, and synthetic equivalent value demonstrate the ability to augment an investors risk exposure and position as illustrated with the resulting hockey stick figures 1136, 1137, 1138.

The transaction started with a stock position before the trade as follows:

Max Gain: Unlimited Max

Loss: $5,250

Break Even Stock Price: $52.50

The transaction's exercised strike points are summarized in the following table:

| U = 52.50 Nearer Month | | |
|---|---|---|
| 12.70 | 40 | 0.20 |
| 7.90 | 45 | OTM P2 | 0.40 |
| 3.75 | 50 | ITM P1 | 1.25 |
| 1.25 | 55 | ITM P | 3.75 |
| .30 | 60 | | 7.80 |
| .10 | 65 | | 12.60 |

Such strikes result in the following fill:

10.70 debit (paid 1.25 twice, paid 4.15 twice)

This transaction may be further broken down as showing a total versatile value 1136 plus a new augmented resulting position 1137 as equating to a synthetic value position 1138 (and hockey stick figures may depict the new position graphically 1136-1138).

As such the total versatile value may be expressed 1136 as:

63.20=

$$(5250+250+810(U+2*C+2*(C1-C2))$$

Which has a new augmented resulting position that may be expressed 1137 as:

Max Gain: Unlimited

Max Loss: $330

Break Even Stock Prices:

53.30, 56.70, 63.70

And equates to a synthetic equivalent value that may be expressed 1138 as:

$$\begin{array}{rl} \text{Long } P \text{ Bfly} + & 165 \\ \text{OTM } P2 + & 40 \\ \text{OTM } C & \underline{125} \\ & 330 \end{array} \quad = (3.75 - (2*1.25)).40)$$

In a second embodiment, a SlingshotHedgeRoll Variation 2C2CV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 1C3PV

In FIG. 12, a versatile SlingshotHedge variation comprising a single call, triple put credit vertical (1C3PV) is described. In one embodiment, the VFMTGI defaults to buying 1 of the closest OTM calls and selling 3 of the next 2 lower strikes OTM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the SlingshotHedge variation 1C3PV demonstrates the transaction 1202. The transaction 1202 starting point, strike points, total value, and synthetic equivalent value demonstrate the ability to augment an investors risk exposure and position as illustrated with the resulting hockey stick figures 1206, 1207, 1208.

The transaction started with a stock position before the trade as follows:
Max Gain: $5,250 Max
Loss: Unlimited
Break Even Stock Price: $52.50

The transaction's exercised strike points are summarized in the following table:

| U = 52.50 Nearer Month | | | |
|---|---|---|---|
| 12.70 | 40 | | 0.20 |
| 7.90 | 45 | OTM P2 | 0.40 |
| 3.75 | 50 | ITM P1 | 1.25 |
| 1.25 | 55 | ITM P | 3.75 |
| .30 | 60 | | 7.80 |
| .10 | 65 | | 12.60 |

Such strikes result in the following fill:
1.30 credit (paid 1.25 once, received 0.85 three times)

This transaction may be further broken down as showing a total versatile value 1206 plus a new augmented resulting position 1207 as equating to a synthetic value position 1208 (and hockey stick figures may depict the new position graphically 1206-1208).

As such the total versatile value may be expressed 1206 as:
5875 credit $$(-5250 + 125 - 255)(-U + C - 3*(P2 - P1))$$

Which has a new augmented resulting position that may be expressed 1207 as:
Max Gain: $5380
Max Loss: $130
Max Loss: $130
Break Even Stock Prices:
38.80, 46.20, 53.80

And equates to a synthetic equivalent value that may be expressed 1208 as:

$$\begin{array}{rl} \text{Long } P \text{ Bfly} & 165 \quad \text{debit} = (3.75 - (2*1.25) + .40) \\ \text{Short } P \text{ Bfly} + & 65 \quad \text{credit} = (-1.25 - (2*.40) - 2.0) \\ \text{OTM } P3 & \underline{20} \\ & 120 \end{array}$$

In a second embodiment, a SlingshotHedgeRoll Variation 1C3PV may be constructed by liquidating the above mentioned hedge combination and simultaneously initiating the same hedge in a different month and/or set of strikes. In another embodiment, the trade of the first embodiment is combined with +looU for the complete package.

SlingshotHedge Variation 1C3CV

A versatile SlingshotHedge variation comprising a single call, triple call debit vertical (1C3CV) is described. In one embodiment, the VFMTGI defaults to buying 1 of the closest OTM calls and buying 3 of the next 2 lower strikes ITM call verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the SlingshotHedge variation 1C3CV demonstrates the transaction 1212. The transaction 1212 starting point, strike points, total value, and synthetic equivalent value demonstrate the ability to augment an investors risk exposure and position as illustrated with the resulting hockey stick figures 1216, 1217, 1218.

The transaction started with a stock position before the trade as follows:
Max Gain: $5,250 Max
Loss: Unlimited
Break Even Stock Price: $52.50

The transaction's exercised strike points are summarized in the following table:

| U = 52.50 Nearer Month | | | |
|---|---|---|---|
| 12.70 | 40 | | 0.20 |
| 7.90 | 45 | OTM P2 | 0.40 |
| 3.75 | 50 | ITM P1 | 1.25 |
| 1.25 | 55 | ITM P | 3.75 |
| .30 | 60 | | 7.80 |
| .10 | 65 | | 12.60 |

Such strikes result in the following fill:
13.70 debit (paid 1.25 once, paid 4.15 three times)

This transaction may be further broken down as showing a total versatile value 1216 plus a new augmented resulting position 1217 as equating to a synthetic value position 1218 (and hockey stick figures may depict the new position graphically 1216-1218).

As such the total versatile value may be expressed 1216 as:

3880 credit=

$$(-5250+125+12.45)=(-u+C+3*(C1-C2))$$

Which has a new augmented resulting position that may be expressed 1217 as:
Max Gain: $3880 Max
Loss: $90
Break Even Stock Prices:
38.80, 46.20, 53.80
And equates to a synthetic equivalent value that maybe expressed 1218 as:

| | | |
|---|---|---|
| Long P Bfly | 165 | debit = (3.75 − (2*1.25) + .40) |
| Short P Bfly + | 65 | credit = (−1.25 − (2*.40) − 2.0) |
| OTM P3 | 20 | |
| | 120 | |

In a second embodiment, a SlingshotHedgeRoll Variation 1C3CV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 2C3PV

A versatile SlingshotHedge variation comprising a double call, triple put credit vertical (2C3PV) is described. In one embodiment, the VFMTGI defaults to buying 2 of the closest OTM calls and selling 3 of the next 2 lower strikes OTM put verticals. In such a case, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the SlingshotHedge variation 2C3PV demonstrates the transaction 1222. The transaction 1222 starting point, strike points, total value, and synthetic equivalent value demonstrate the ability to augment an investors risk exposure and position as illustrated with the resulting hockey stick figures 1226, 1227, 1228.

The transaction started with a stock position before the trade as follows:
Max Gain: $5,250 Max
Loss: Unlimited
Break Even Stock Price: $52.50
The transaction's exercised strike points are summarized in the following table:

| U = 52.50 | | | |
|---|---|---|---|
| Nearer Month | | | |
| 12.70 | 40 | | 0.20 |
| 7.90 | 45 | OTM P2 | 0.40 |
| 3.75 | 50 | ITM P1 | 1.25 |
| 1.25 | 55 | ITM P | 3.75 |

| U = 52.50 | | |
|---|---|---|
| Nearer Month | | |
| .30 | 60 | 7.80 |
| .10 | 65 | 12.60 |

Such strikes result in the following fill:
0.05 credit (paid 1.25 twice, received 0.85 three times)
This transaction may be further broken down as showing a total versatile value 1226 plus a new augmented resulting position 1227 as equating to a synthetic value position 1228 (and hockey stick figures may depict the new position graphically 1226-1228).

As such the total versatile value may be expressed 1226 as:
5255 credit=
(−5250+250−255
(−U+2C−3*(P2−P1))

Which has a new augmented resulting position that may be expressed 1227 as:
Max Gain: $3755 to downside Unlimited to upside
Max Loss: $245
Break Even Stock Prices:
37.55, 47.45, 52.55
And equates to a synthetic equivalent value that may be expressed 1228 as:

| | |
|---|---|
| Long P Bfly 165 debit = (3.75 − (2 * 1.25) + .40) + OTM 2P3 | 20 |
| Short P Bfly 65 credit = (−1.25 + (2 * .40) − .20) + OTM C | 125 |
| | 245 |

In a second embodiment, a SlingshotHedgeRoll Variation 2C3PV may be constructed by liquidating the above mentioned hedge combination and simultaneously initiating the same initial hedge in a different month and/or set of strikes. In another embodiment, the trade of the first embodiment is combined with +looU for the complete package.

SlingshotHedge Variation 2C3CV

A versatile SlingshotHedge variation comprising a double call, triple call debit vertical (2C3CV) is described. In one embodiment, the VFMTGI defaults to buying 2 of the closest OTM calls and buying 3 of the next 2 lower strikes ITM call verticals. In such a case, all 3 strikes involved are normally equidistant apart and all in the same month. The strikes can be edited so the strikes are wider apart but there may be instances of varying distances between strikes according to the user's preference before sending the combined hedge. The months can also be edited. For example, the options being bought can be in the deferred month and the options to be sold can be in the nearer term month.

To that end, the format layout table for the SlingshotHedge variation 2C3CV demonstrates the transaction 1232. The transaction 1232 starting point, strike points, total value, and synthetic equivalent value demonstrate the ability to augment an investors risk exposure and position as illustrated with the resulting hockey stick figures 1236-1238.

The transaction started with a stock position before the trade as follows:
Max Gain: $5,250 Max
Loss: Unlimited
Break Even Stock Price: $52.50

The transaction's exercised strike points are summarized in the following table:

| U = 52.50 | | | |
|---|---|---|---|
| Nearer Month | | | |
| 12.70 | 40 |  | 0.20 |
| 7.90 | 45 | OTM P2 | 0.40 |
| 3.75 | 50 | ITM P1 | 1.25 |
| 1.25 | 55 | ITM P | 3.75 |
| .30 | 60 |  | 7.80 |
| .10 | 65 |  | 12.60 |

Such strikes result in the following fill:

14.95 debit (paid 1.25 twice, paid 4.15 three times)

This transaction may be further broken down as showing a total versatile value 1236 plus a new augmented resulting position 1237 as equating to a synthetic value position 1238 (and hockey stick figures may depict the new position graphically 1236-1238).

As such the total versatile value may be expressed 1236 as:

37.55=

(−5250+250+1245)=

(U+2C+3*(P2-P1))

Which has a new augmented resulting position that may be expressed 1237 as:

Max Gain: $3755 to downside Unlimited to upside

Max Loss: $245

Break Even Stock Prices:

37.55, 47.45, 52.55

And equates to a synthetic equivalent value that may be expressed 1238 as:

| | |
|---|---|
| Long P Bfly 165 debit = (3.75 − (2 * 1.25) + .40) + OTM P3 | 20 |
| Short P Bfly 65 credit = (−1.25 + (2 * .40) − .20) + OTM C | 125 |
| | 245 |

In a second embodiment, a SlingshotHedgeRoll Variation 2C3CV may be constructed by liquidating the above mentioned hedge combination and simultaneously initiating the same initial hedge in a different month and/or set of strikes. In another embodiment, the trade of the first embodiment is combined with +looU for the complete package.

CalendarHedge

A versatile CalendarHedge comprising is described. In one embodiment, the VFMTGI defaults to selling a near month put and buying the same strike call a deferred month. In such a case, the months can also be edited. For example, the options being bought can be in the deferred month and the options to be sold can be in the nearer term month.

To that end, the format layout table for the CalendarHedge demonstrates the transaction 1302. The transaction 1302 starting point, strike points, total value, and synthetic equivalent value demonstrate the ability to augment an investors risk exposure and position as illustrated with the resulting hockey stick FIG. 1308.

The transaction started with a stock position before the trade as follows:

Max Gain: $5,250 Max

Loss: Unlimited

Break Even Stock Price: $52.50

The transaction's exercised strike points are summarized in the following table:

| U = 52.50 | | | |
|---|---|---|---|
| Nearer Month | | | |
| 3.75 | ITM NC | 50 | 1.25 |
| Deferred Month | | | |
| 4.70 | | 50 | OTM DP | 2.20 |

Such strikes result in the following fill:

3.45 debit (paid 4.70, received 1.25)

This transaction may be further broken down as showing a total versatile value plus a new augmented resulting position 1308 as equating to a synthetic value position (and hockey stick figures may depict the new position graphically 1308).

As such the total versatile value may be expressed as:

4905 credit=

(−5250+470−125)=

(−U+OTM DC−OTM NC)

Which has a new augmented resulting position that may be expressed 1308 as:

Max Gain: *

Max Loss: $95

Break Even Stock Prices: *

Note: Undeterminable because no way to tell the level of implied volatility when near month expires.

And equates to a synthetic equivalent value that may be expressed as:

95=

Call Calendar Spread 95 debit=4.70-3.75

OR

Put Calendar Spread 95 debit=2.20-1.25

In a second embodiment, a CalendarHedgeRoll may be constructed by liquidating the above mentioned hedge combination and simultaneously initiating the same initial hedge in a different month and/or set of strikes. In another embodiment, the trade of the first embodiment is combined with +looU for the complete package.

BullCollar

A versatile BullCollar is described. In one embodiment, the VFMTGI defaults to buying closest ITM call and selling a higher strike put. In such a case, both strikes involved are in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the BullCollar demonstrates the transaction 1312. The transaction 1312 starting point, strike points, total value, and synthetic equivalent value demonstrate the ability to augment an investors risk exposure and position as illustrated with the resulting hockey stick FIG. 1318.

The transaction started with a stock position before the trade as follows:

Max Gain: $5,250

Max Loss: Unlimited

Break Even Stock Price: $52.50

The transaction's exercised strike points are summarized in the following table:

| | U = 52.50 | | | |
|---|---|---|---|---|
| 3.75 | ITM C | 50 | | 1.25 |
| 1.25 | | 55 | ITM P | 3.75 |

Such strikes result in the following fill:
even money (zero cost) (paid 3.75, received 3.75)
This transaction may be further broken down as showing a total versatile value plus a new augmented resulting position 1308 as equating to a synthetic value position (and hockey stick figures may depict the new position graphically 1308).
As such the total versatile value may be expressed as: −5250=

$$(-5250+375-375)=(-U+C-P)$$

Which has a new augmented resulting position that may be expressed 1308 as:
Max Gain: $250
Max Loss: $250
Break Even Stock Prices:
52.50
And equates to a synthetic equivalent value that may be expressed as:
250=
Bull Put Vertical Spread 250 credit=1.25-3.75
OR
Bull Call Vertical Spread 250 debit=3.75-2.25
In a second embodiment, a BearCollarRoll may be constructed by liquidating the above mentioned hedge combination and simultaneously initiating the same initial hedge in a different month and/or set of strikes. In another embodiment, the trade of the first embodiment is combined with +1ooU for the complete package.

Versatile Financial Wing Based Transactions

Figure 14A:
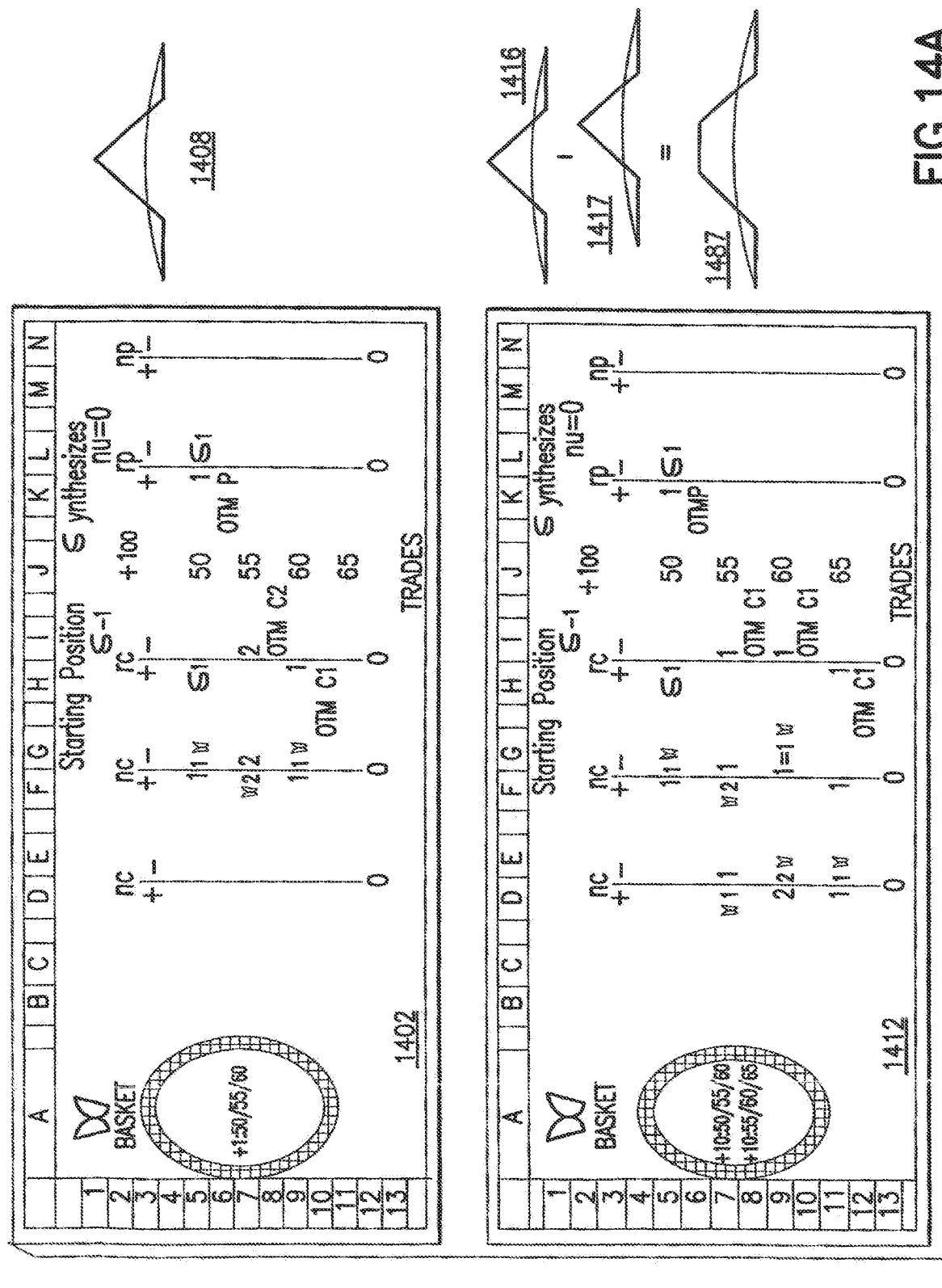
FIG. 14 (FIG. 14A-FIG. 14C) is of a diagram illustrating embodiments for versatile financial wing based transactions.
Figure 14B:
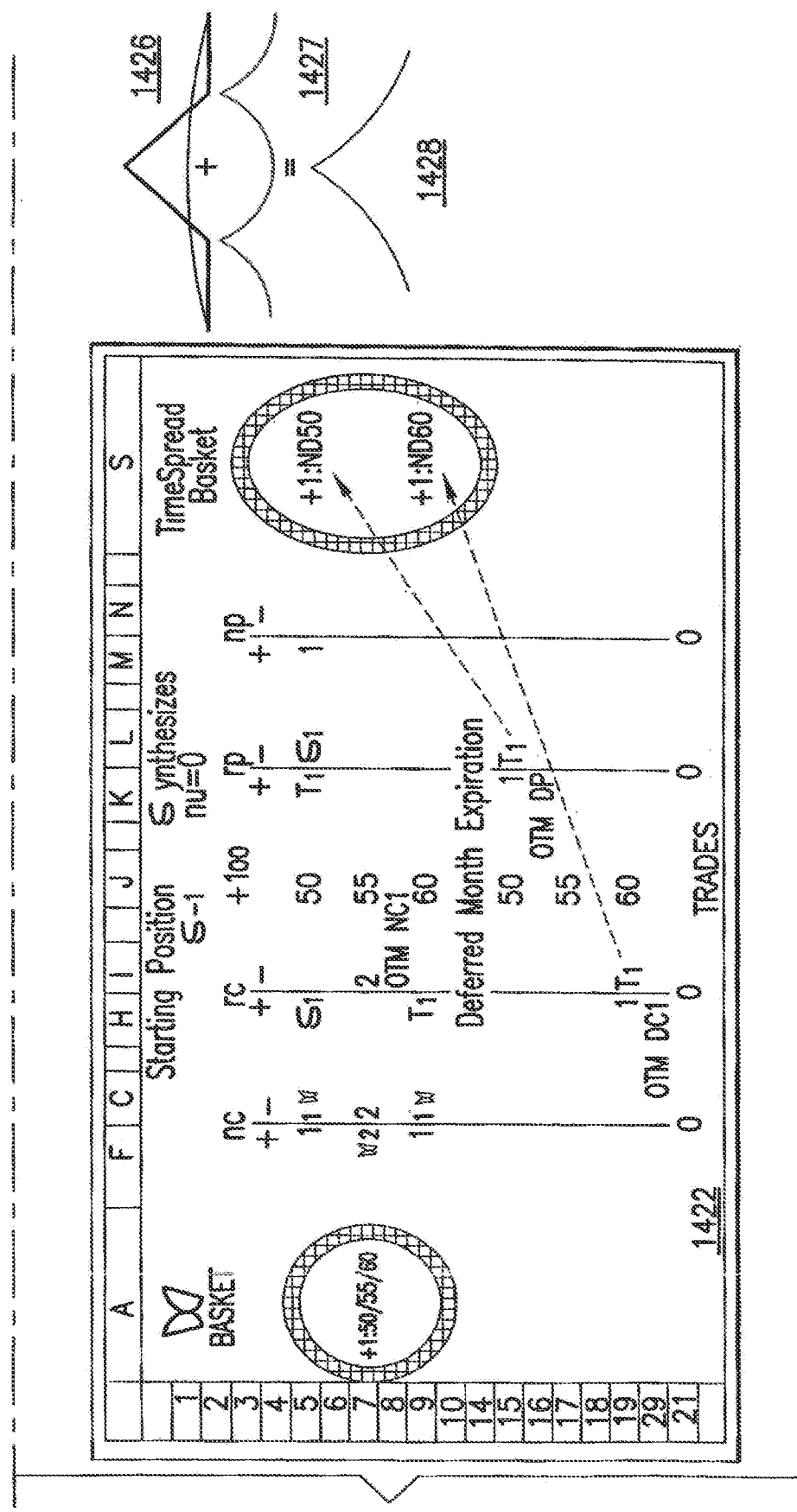
Figures 14, 14C:
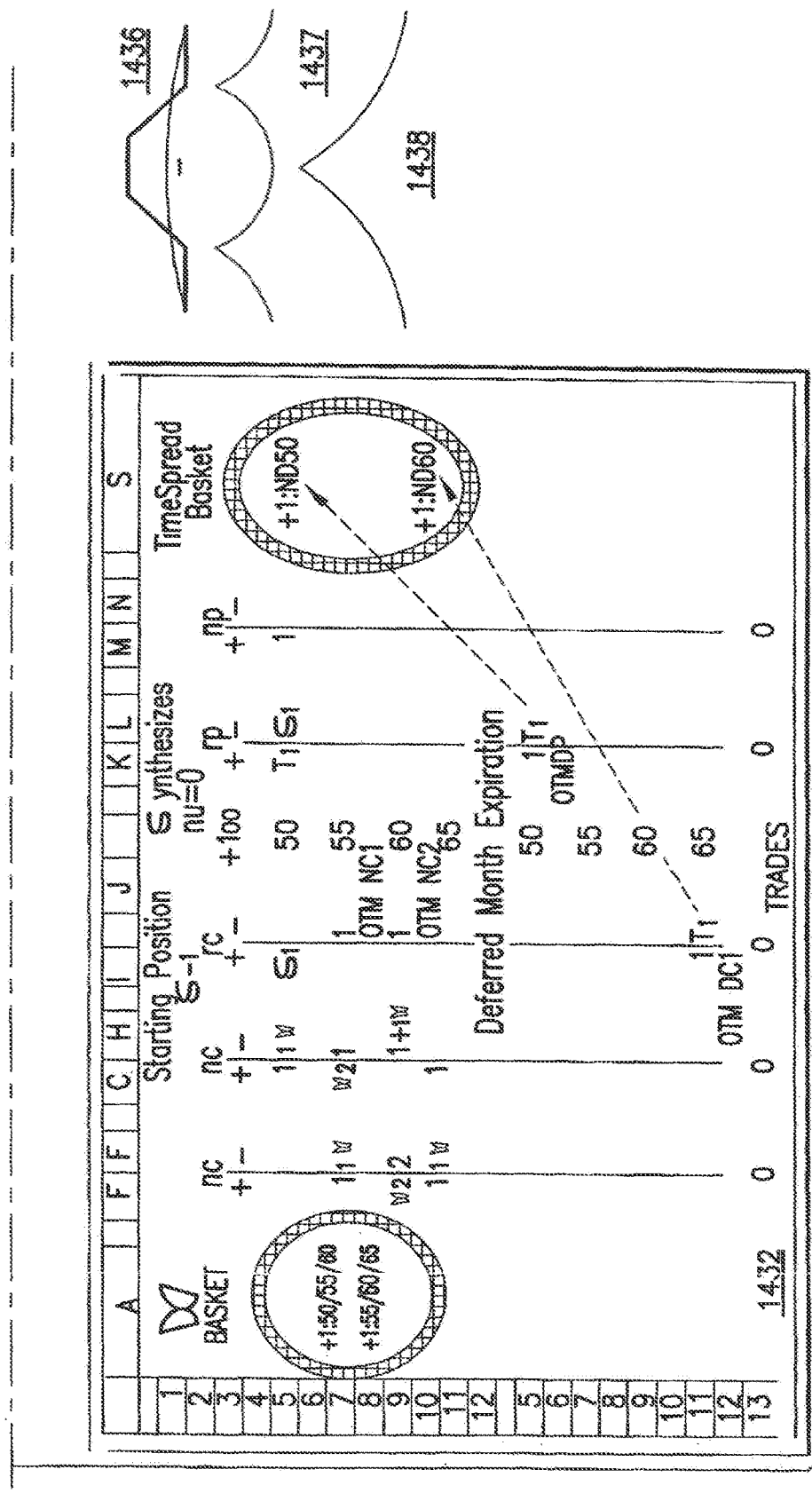

FIG. 14 illustrates embodiments for versatile financial wing based transactions. The VFMTGI may save the following rule set descriptions in its database for retrieval. For example, when the user makes a selection for a versatile as discussed in FIG. 2, the VFMTGI would lookup the required elements for the versatile from its database as described below and in appendices. Thereafter, based on the required elements, the VFMTGI would look for such elements in the market by querying its market database for matches, as has already been discussed in FIGS. 1-3 and throughout.

3-Way ButterflyHedge

A versatile 3-Way ButterflyHedge variation is described. In one embodiment, the VFMTGI defaults to selling the closest off strike combo (buying first OTM put and selling the first OTM call) coupled with selling a call vertical. In a second embodiment, the VFMTGI may buy a put vertical with the 'sell' strike being the same call involved in the combo. In a third embodiment, the VFMTGI may achieve a 4-Way ButterflyHedge by selling a straddle and buying a put below and a put above the straddle strike. In a fourth embodiment, the VFMTGI may achieve a 5-Way ButterflyHedge by buying a call or put butterfly and selling a combo (i.e., selling the call, and buying the put at the same strike) at any strike other than the middle strike. In such cases, all 3 strikes involved are normally equidistant apart and all in the same month. The strikes can be edited so the strikes are wider apart but there may be instances of varying distances between strikes according to the user's preference before sending the combined transaction hedge. The months can also be edited. For example, the options being bought can be in the deferred month and the options to be sold can be in the nearer term month.

To that end, the format layout table for the 3-Way ButterflyHedge demonstrates the transaction 1402. The transaction 1402 starting point, strike points, total value, and synthetic equivalent value demonstrate the ability to augment an investors risk exposure and position as illustrated with the resulting hockey stick FIG. 1408.

The transaction started with a stock position before the trade as follows:
Max Gain: $5,250 Max
Loss: Unlimited
Break Even Stock Price: $52.50
The transaction's exercised strike points are summarized in the following table:

| | U = 52.50 | | | |
|---|---|---|---|---|
| 3.75 | | 50 | OTMP | 1.25 |
| 1.25 | OTMC1 | 55 | | 3.75 |
| .30 | OTMC2 | 60 | | 7.80 |
| .10 | OTMC3 | 65 | | 12.60 |

Such 4-Way strikes result in the following fill:
0.95 credit (paid 1.25 once, received 2.20)
This transaction may be further broken down as showing a total versatile value plus a new augmented resulting position 1408 as equating to a synthetic value position (and hockey stick figures may depict the new position graphically 1408).
As such the total versatile value may be expressed 1406 as:
5155=

$$(5250+125-220)(U+P-2*C1+C2)$$

Which has a new augmented resulting position that may be expressed 1408 as:
Max Gain: $345
Max Loss: $155
Break Even Stock Prices:
51.55, 58.45
And equates to synthetic equivalent value that may be expressed as:
Long C Bfly 155 Debit=(3.75−(2*1.125)+0.30)
=310
In a second embodiment, a ButterflyHedgeRoll may be constructed by liquidating the above mentioned hedge combination and simultaneously initiating the same initial hedge in a different month and/or set of strikes. In another embodiment, the trade of the first embodiment is combined with +1ooU for the complete package.

4-Way CondorHedge

A versatile 4-Way CondorHedge variation is described. In one embodiment, the VFMTGI defaults to a selling closest off the strike combo (i.e., by first buying an OTM put and then selling the first OTM call) coupled with selling a call vertical. In a second embodiment, the VFMTGI may buying a put vertical with the 'sell' strike being higher than the same call involved in the combo. In a third embodiment, the VFMTGI may achieve a 4-Way CondorHedge by selling a strangle and buying a put below and a put above the strangle strikes. Ina fourth embodiment, the VFMTGI may achieve a 5-Way ButterflyHedge by buying a call or put condor and selling a combo (i.e., selling the call, and buying the put at the same strike) at any strike other than the middle 2 strikes.

In such cases, all 4 strikes are normally equidistant apart so the strikes can be edited so that they were each two or more strikes apart but their may be instances of varying distances between strikes according to the user's preference.

To that end, the format layout table for the 4-Way CondorHedge demonstrates the transaction 1412. The transaction 1412 starting point, strike points, total value, and synthetic equivalent value demonstrate the ability to augment an investors risk exposure and position as illustrated with the resulting hockey stick figures 1416-1418.

The transaction started with a stock position before the trade as follows:

Max Gain: $5,250 Max
Loss: Unlimited
Break Even Stock Price: $52.50

The transaction's exercised strike points are summarized in the following table:

| U = 52.50 | | | |
|---|---|---|---|
| 3.75 | | 50 | OTMP | 1.25 |
| 1.25 | OTMC1 | 55 | | 3.75 |
| .30 | OTMC2 | 60 | | 7.80 |
| .10 | OTMC3 | 65 | | 12.60 |

Such 4-Way strikes result in the following fill:
0.20 credit (paid 1.25 once, received 1.45)

This transaction may be further broken down as showing a total versatile value 1416 plus a new augmented resulting position 1417 as equating to a synthetic value position 1418 (and hockey stick figures may depict the new position graphically 1416-1418).

As such the total versatile value may be expressed 1416 as:

52.30=

$$(5250+125-145(U+P-C1-C2+C3)$$

Which has a new augmented resulting position that may be expressed 1417 as:

Max Gain: $270
Max Loss: $230
Break Even Stock Prices:
52.30, 62.70

And equates to a synthetic equivalent value that maybe expressed 1418 as:

Long C Bfly 2.30 debit=(3.75−1.25−0.30+0.10)=230

In a second embodiment, a CondorHedgeRoll may be constructed by liquidating the above mentioned hedge combination and simultaneously initiating the same initial hedge in a different month and/or set of strikes. In another embodiment, the trade of the first embodiment is combined with +1ooU for the complete package.

3-Way CalendarizedButterflyHedge

A versatile 3-Way CalendarizedButterflyHedge variation is described. In one embodiment, the VFMTGI defaults to a buying 1 deferred expiration month strangle. In a second embodiment, the VFMTGI may buy 1 differed expiration month "Guts Strangle" comprising of buying 1 ITM put and 1 ITM call that is two strikes higher and simultaneously (packaged with) selling 2 at-the-money (ATM) calls (wherein the ATM strike is in between the 2 deferred month's guts strangle strikes) in the nearer term expiration month. In a third embodiment, the VFMTGI may achieve a 4-Way CalendarizedButterflyHedge by selling a near month straddle and buying a deferred put below and a put above the straddle strike. In a fourth embodiment, the VFMTGI may achieve a 4-Way CalendarizedButterflyHedge by selling a near month straddle and buying a deferred put below and a put above the straddle strike. In a fifth embodiment, the VFMTGI may achieve a 5-way CalendarizedButterflyHedge by using the first embodiment and buying an additional put in the combo with a strangle put. In a sixth embodiment, the VFMTGI may achieve a 6-Way CalendarizedButterflyHedge by using a double diagonal and a short combo by buying a deferred month strangle or Guts and selling a near term straddle and selling a combo (i.e., selling the call, and buying the put at the same strike) as long as the combo is at a strike other than any above mentioned "long put" strike.

In such cases, all 3 strikes are normally equidistant apart so the strikes can be edited so that they were each two or more strikes apart but their nrny be instances of varying distances between strikes according to the user's preference.

To that end, the format layout table for the 3-Way CalendarizedButterflyHedge demonstrates the transaction 1422. The transaction 1422 starting point, strike points, total value, and synthetic equivalent value demonstrate the ability to augment an investors risk exposure and position as illustrated with the resulting hockey stick FIGS. 1426-1428.

The transaction started with a stock position before the trade as follows:

Max Gain: $5,250 Max

Loss: Unlimited

Break Even Stock Price: $52.50

The transaction's exercised strike points are summarized in the following table:

| U = 52.50 | | | |
|---|---|---|---|
| Nearer Month | | | |
| 3.75 | | 50 | | 1.25 |
| 1.25 | OTM DC1 | 55 | | 3.75 |
| .30 | | 60 | | 7.80 |
| Deferred Month | | | |
| 4.70 | | 50 | OTM DP | 2.20 |
| 2.05 | | 55 | | 4.55 |
| 0.90 | OTM DC2 | 60 | | 8.40 |

Such strikes result in the following fill:
0.60 debit (paid 2.20 and 0.90, received 1.25 twice)

This transaction may be further broken down as showing a total versatile value 1426 plus a new augmented resulting position 1427 as equating to a synthetic value position 1418 (and hockey stick figures may depict the new position graphically 1426-1428).

As such the total versatile value may be expressed 1426 as:

53.10=

$$(5250+220+90-250)=(U+DP+DC2-2*NC1)$$

Which has a new augmented resulting position that may be expressed 1427 as:

Max Gain:*

Max Loss: $310

Break Even Stock Prices:*

Note: Undeterminable because no way to tell the level of implied volatility when near month expires.

And equates to a synthetic equivalent value that may be expressed 1428 as:

| | | |
|---|---|---|
| Long C Bfly | 155 | debit = (3.75 − (2*1.25) + .30) |
| Long C2 Calendar + | 60 | debit = .90 − .30 |
| Long P Calendar | 95 | debit = 2.20 − 1.25 |
| | 310 | |

In a second embodiment, a CalanderizedButterfly-HedgeRoll may be constructed by liquidating the above mentioned hedge combination and simultaneously initiating the same initial hedge in a different month and/or set of strikes. In another embodiment, the trade of the first embodiment is combined with +looU for the complete package.

3-Way CalendarizedCondorHedge

A versatile 4-Way CalendarizedCondorHedge variation is described. In one embodiment, the VFMTGI defaults to buying 1 deferred expiration month strangle. In a second embodiment, the VFMTGI may a use a "Guts Strangle" comprising I ITM put, 1 ITM call that is three strikes higher and simultaneously (packaged with) selling 2 consecutive calls (wherein one strike is higher than the ITM call strike and one strike is below the ITM put strike, and both strikes for the consecutive calls are in between the 2 deferred month's strangle strikes) in the current month. In a third embodiment, the VFMTGI may achieve a 5-Way CalendarizedCondorHedge by selling a near month strangle and buying a deferred put below and a put above the straddle strike. In a fourth embodiment, the VFMTGI may achieve a 5-Way CalendarizedCondorHedge by using the first embodiment and if an additional put in the combo is bought with the strangle put. In a fifth embodiment, the VFMTGI may achieve a 6-Way CalendarizedCondorHedge by using a double diagonal and a short combo by buying a deferred month strangle or Guts Strangle and selling a near telm strangle and selling a combo (i.e., selling the call, and buying the put at the same strike) as long as the combo is at a strike other than any above mentioned "long put" strike.

In such cases, all 4 strikes are normally equidistant apart so the strikes can be edited so that they were each two or more strikes apart but their may be instances of varying distances between strikes according to the user's preference.

To that end, the format layout table for the 4-Way CalendarizedCondorHedge demonstrates the transaction 1432. The transaction 1432 starting point, strike points, total value, and synthetic equivalent value demonstrate the ability to augment an investors risk exposure and position as illustrated with the resulting hockey stick figures 1436-1438.

The transaction started with a stock position before the trade as follows:

Max Gain: $5,250
Max Loss: Unlimited
Break Even Stock Price: $52.50
The transaction's exercised strike points are summarized in the following table:

| U = 52.50 | | | |
|---|---|---|---|
| Nearer Month | | | |
| 3.75 | | 50 | 1.25 |
| 1.25 | OTM NC1 | 55 | 3.75 |
| .30 | OTM NC2 | 60 | 7.80 |
| .10 | | 65 | 12.60 |

| U = 52.50 | | | |
|---|---|---|---|
| Deferred Month | | | |
| 4.70 | | 50 | OTM DP | 2.20 |
| 2.05 | | 55 | | 4.55 |
| 0.90 | | 60 | | 8.40 |
| 0.30 | OTM DC3 | 65 | | 12.80 |

Such strikes result in the following fill:
0.95 debit (paid 2.20 and 0.30, received 1.55)

This transaction may be further broken down as showing a total versatile value 1436 plus a new augmented resulting position 1437 as equating to a synthetic value position 1418 (and hockey stick figures may depict the new position graphically 1436-1438).

As such the total versatile value may be expressed 1436 as:
53.45=
(5250+220+30−125−30
(U+DP+DC3−NC1−NC2)

Which has a new augmented resulting position that may be expressed 1437 as:
Max Gain: *
Max Loss: $335
Break Even Stock Prices: *
Note: Undeterminable because no way to tell the level of implied volatility when near month expires.

And equates to a synthetic equivalent value that may be expressed 1438 as:

| | | |
|---|---|---|
| Long C Condor | 230 | debit = (3. 75 − 1.25 − .30 + .10) |
| Long C3 Calendar | 20 | debit = .30 − .10 |
| Long P Calendar | 95 | debit = 2.20 − 1. 25 |
| | 345 | |

In a second embodiment, a CalendarCondorHedgeRoll may be constructed by liquidating the above mentioned hedge combination and simultaneously initiating the same initial hedge in a different month and/or set of strikes. In another embodiment, the trade of the first embodiment is combined with +looU for the complete package.

Versatile Financial Transactions Map

Figure 15:
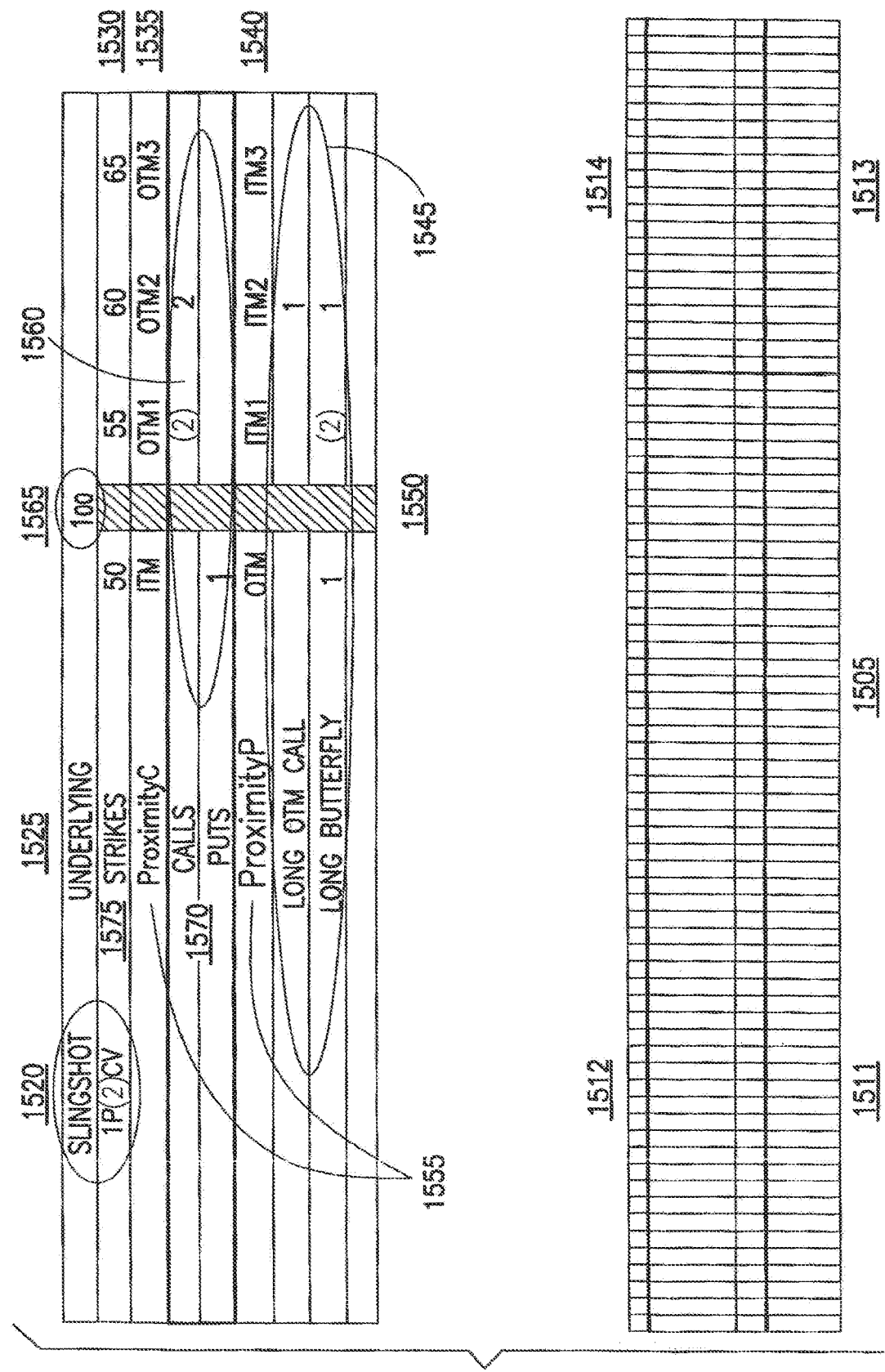
FIG. 15 is of a block diagram illustrating mappings for versatile financial transactions.

FIG. 15 illustrates embodiments for versatile financial transactions. Many of these versatiles were detailed above in FIGS. 8-14 in greater detail. The VFMTGI employs a large construct map of versatiles 1505. The versatiles are comprised of various element subcomponents and are detailed in the map 1505, which has been enlarged into quadrants in the form of the Appendices 1-4 (shown in FIGS. 17-70). Appendix 1 (shown in FIGS. 17-36) details various hedges for long underlying that may be generated as multi-leg financial instruments by the VFMTGI 1511. Appendix 2 (shown in FIGS. 37-56) details various hedges for long underlying that may be generated as multi-leg financial instruments by the VFMTGI 1512. Appendix 3 (shown in FIGS. 57-63) details various top weighted ratioed verticals that may be generated as multi-leg financial instruments by the VFMTGI 1513. Appendix 4 (shown in FIGS. 64-70) details various bottom weighted ratioed verticals. that may be generated as multi-leg financial instruments by the VFMTGI 1514.

The map is comprised of various sections. These sections map to field entries in the VFMTGI's database. The map is presented in tabular form. The various fields 1520, 1525, and subfields 1530, 1535, 1540. Thus, the table entries house the requirements as entries 1560, 1545 that describe the requirements for a given versatile. For example, the versatile name description field 1520 holds the name for the versatile in question; in this case it is a Slingshot 1P(2)CV. In this example, the remainder of the given versatile's requirements are made as entries in the remainder of the associated fields. For example, with regard to the put and call fields 1570, long and short positions (i.e., short positions shown in parenthetical red) as a result of the trade are shown in a provided area of the map 1560. The VFMTGI may also compute and store positions that are synthetically the same, or positions that will behave like the listed spreads in bottom area of the map 1545. Underlying position quantity 1565 may be specified above the hashed shaded area 1550, which is where the underlying is in relationship to given strikes 1575. Also, ProximityC(all) and ProximityP(ut) 1555 are designations as to whether a call is in-the-money or out-of-the-money and whether it is the 1st closest to the money (OTM1) or the second (OTM2). ITM2 is deeper in-the-money than ITM1.

In the map/appendices, it should be noted that the VFMTGI allows all the 3 Strike (3K) and 4 Strike (4K) "Ratioed Vertical" variations to have any ratio of verticals to one another. Over 50 examples are illustrated on the left side of the map 1511, 1513. The examples on the right (short stock) side 1512, 1514 are the mirror image of the left (long stock) side. In the (3K) examples, the pairs of verticals are adjacent to one another. In the 4K examples, they are one strike apart. Other variations not illustrated can have the pairs even further apart. Of further note, starting at Row 635 of the map, there are 42 'Options Only' strategies that are not hedges. In the map/appendices, the "U" is for up and the "D" is for down in these positions; this is to denote desired direction of the underlying, stock, future, index, etc.

Versatile Financial Mechanism and Transaction Generator and Interface Controller FIG. 16 illustrates one embodiment incorporated into a versatile financial mechanism and transaction generator and interface (VFMTGI) controller 1601. In this embodiment, the VFMTGI controller 1601 may serve to process, store, search, identify, instruct, generate, match, and/or update multi-leg, interrelated versatile financial mechanisms.

In one embodiment, the VFMTGI controller 1601 may be connected to and/or communicate with entities such as, but not limited to: one or more users from user input devices 1611; peripheral devices 1612; and/or a communications network 1613. The VFMTGI controller may even be connected to and/or communicate with a cryptographic processor device 1628.

A VFMTGI controller 1601 may be based on common computer systems that may comprise, but are not limited to, components such as: a computer systemization 1602 connected to memory 1629.

Computer Systemization

A computer systemization 1602 may comprise a clock 1630, central processing unit (CPU) 1603, a read only memory (ROM) 1606, a random access memory (RAM) 1605, and/or an interface bus 1607, and most frequently, although not necessarily, are all interconnected and/or communicating through a system bus 1604. Optionally, a cryptographic processor 1626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium and/or Xeon; and/or the like processor(s). The CPU interacts with memory through signal passing through conductive conduits. to execute stored program code according to conventional data processing techniques. Such signal passing facilitates communication within the VFMTGI controller and beyond through various interfaces. Should processing requirements dictate a greater amount speed, mainframe and super computer architectures may similarly be employed.

Interface Adapters

Interface bus(ses) 1607 may accept, connect, and/or communicate to a number of interface adapters, conventionally although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), Personal Computer Memory Card International Association (PCMCIA), and/or the like.

Storage interfaces 1609 may accept, communicate, and/or connect to a number of storage devices such as, but not limited to: storage devices 1614, removable disc devices, and/or the li e. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (IIO) 1608 may accept, communicate, and/or connect to user input devices 1611, peripheral devices 1612, cryptographic processor devices 1628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, composite, digital, Digital Visual Interface (DVI), RCA, S-Video, VGA, and/or the like; wireless; and/or the like. A common output device is a video display, which typically comprises a Cathode Ray Tube (CRT) or Liquid Crystal Display (LCD) based monitor with an interface (e.g., DVI circuitry and cable) that accepts signals from a video interface. The video interface composites information generated by a computer systemization and generates video signals based on the composited information in a video memory frame. Typically, the video Interface provides the composited video information through a video connection interface that accepts a video display interface (e.g., a DVI connector accepting a DVI display cable).

User input devices 1611 may be card readers, dongles, finger print readers, gloves, graphics tablets, joysticks, keyboards, mouse (mice), trackballs, trackpads, retina readers, and/or the like.

Peripheral devices 1612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, visors, and/or the like.

It should be noted that although user input devices and peripheral devices may be employed, the VFMTGI controller may be embodied as an embedded, dedicated, and/or headless device, wherein access would be provided over a network interface connection.

Cryptographic units such as, but not limited to, microcontrollers, processors 226, interfaces 1627, and/or devices 1628 may be attached, and/or communicate with the VFMTGI controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that a VFMTGI controller and/or a computer systemization may employ various forms of memory 1629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1629 will include ROM 206, RAM 1605, and a storage device 1614. A storage device 1614 may be any conventional computer system storage. Storage devices may include a drum; a (fixed and/or removable) magnetic disk drive; a magneto-optical drive; an optical drive (i.e., CD ROMIRAM/Recordable (R), ReWritable (RW), DVD RJRW, etc.); and/or other devices of the like. Thus, a computer systemization generally requires and makes use of memory.

Module Collection

The memory 1629 may contain a collection of program and/or database modules and/or data such as, but not limited to: operating system module(s) 1615 (operating system); information server module(s) 1616 (information server); user interface module(s) 1617 (user interface); Web browser module(s) 1618 (Web browser); database(s) 1619; cryptographic server module(s) 1620 (cryptographic server); VFMTGI module(s) 1635; and/or the like (i.e., collectively a module collection). These modules may be stored and accessed from the storage devices and/or from storage devices accessible through an interface bus. Although non-conventional software modules such as those in the module collection, typically, are stored in a local storage device 1614, they may also be loaded and/or stored in memory such as: peripheral devices, RAM, remote storage facilities through a communications network, ROM, various forms of memory, and/or the like.

Operating System

The operating system module 1615 is executable program code facilitating the operation of a VFMTGI controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the VFMTGI controller to communicate with other entities through a communications network 1613. Various communication protocols may be used by the VFMTGI controller as a subcarrier transport mechanism for interaction, such as, but not limited to: multicast, TCP/IP, UDP, unicast, and/or the like.

Information Server

An information server module 1616 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Pythron, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a VFMTGI controller based on the remainder of the HTTP request. For example, a request such as http:1/123.124.125.126/mylnformation.html might have the IP portion of the request "123.124.125.126" resolved by a DNS server to an information server at that IP address; that information server might in turn further parse the http request for the "/myinformation.html" portion of the request and resolve it to a location in memory containing the information "myinformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the VFMTGI database 1619, operating systems, other program modules, user interfaces, Web browsers, and/or the like.

Access to VFMTGI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the VFMTGI. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the VFMTGI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

A user interface module 1617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 1618 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from VFMTGI enabled nodes. The combined application may be nugatory on systems employing standard Web browsers.

VFMTGI Database

A VFMTGI database module 1619 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are intercom1ected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the VFMTGI database may be implemented using various standard data-structures, such as an array, hash, (linked) list, struct, structured text file (e.g., XML), table, and/or the like. Such data-structures may be stored in memory and/or in (structured) files. In another alternative, an object oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the VFMTGI database is implemented as a data-structure, the use of the VFMTGI database may be integrated into another module such as the VFMTGI module. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated. In one embodiment, the database module 1619 includes three tables 1619*a-d*. An instrument profiles table 1619*a* includes fields such as, but not limited to: a versatile instrument name (e.g., SlingshotHedge variants, etc.), which may be a key field; versatile instrument description; versatile subcomponent requirements: underlying, strikes, ProximityC, calls, puts, ProximityP, long OTM call, long butterfly, and/or the like; versatile subcomponent augments: ITM, OTM, ITM1, OTM1, ITM2, OTM2, ITM3, OTM3, and/or the like; and/or the like. An accounts table 1619*b* includes fields such as, but not limited to: a user's name, address, account number, account holdings, and/or the like; the accounts table may be populated as discussed in 105 of FIG. 1. A market table 1619*c* includes fields such as, but not limited to: ask price, bid price, current price, strike price, financial instrument name, exchange, type, volume, and/or the like; the market table may be populated as discussed in 105 of FIG. 1. A user interface primitives table 1619*d* includes fields such as, but not limited to: versatile instrument name, user interface media object representing the versatile instrument, population sources, and/or the like. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 1619*a-d*. The VFMTGI may be configured to keep track of various settings, inputs, and parameters via database controllers.

A VFMTGI database may communicate to and/or with other modules in a module collection, including itself, and/or facilities of the like. Most frequently, the VFMTGI database communicates with a VFMTGI module, other program modules, and/or the like. The database may contain, retain, and provide information regarding other nodes and data.

Cryptographic Server

A cryptographic server module 1620 is stored program code that is executed by the CPU 1603; cryptographic processor 1626, cryptographic processor interface 1627, cryptographic processor device 1628, and/or the like. Cryptographic processor interfaces will allow for expedition of encryption and/or decryption requests by the cryptographic module; however, the cryptographic module, alternatively, may run on a conventional CPU. The cryptographic module 'allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MDS, which is a one way hash function), passwords, Rivest Cipher (RCS), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable a VFMTGI module to engage in secure transactions if so desired. The cryptographic module facilitates the secure accessing of resources on VFMTGI and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

VFMTGI

A VFMTGI module 1635 is stored program code that is executed by the CPU. The VFMTGI affects accessing, obtaining and the provision of information, transactions, and/or the like across various communications networks. The VFMTGI enables users to simply generate multi-leg, interrelated versatile financial mechanisms. The VFMTGI coordinates with the VFMTGI database to identify interassociated items in the generation of entries regarding any related information. A VFMTGI module enabling access of information between nodes may be developed by employing standard development tools such as, but not limited to: (ANSI) (Objective-) C (++), Apache modules, binary executables, Java, Javascript, mapping tools, procedural and object oriented development tools, PERL, Python, shell scripts, SQL commands, web application server extensions, WebObjects, and/or the like. In one embodiment, the VFMTGI server employs a cryptographic server to encrypt and decrypt communications. A VFMTGI module may communicate to and/or with other modules in a module collection, including itself, and/or facilities of the like. Most frequently, the VFMTGI module communicates with a VFMTGI database, operating systems, other program modules, and/or the like. The VFMTGI may contain, communicate, generate, obtain, and/or provide program module, system, user, and/or data communications, requests, and/or responses.

Distributed VFMTGI

The structure and/or operation of any of the VFMTGI node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve perfom1ance through load-balancing and/or data-processing techniques. Furthermore, single instances may also be distributed across multiple controllers and/or storage devices; e.g., databases. All program module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Backgrom1d, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than for purposes of space and reducing repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed is exemplary and all equivalents, regardless of order, are contemplated by the disclosure. Furthermore, it is to be understood that such features are not limited to serial execution, but rather, any number of threads, processes, services, servers, and/or the like that may execute asynchronously, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A computer-implemented method for assembling and completing a versatile financial transaction comprising financial instrument transactions with an interactive display, the method comprising:

receiving from a trade executing entity, via a network interface in communication with a processor, market data relating to one or more financial instrument transactions, the market data comprising at least a price, a financial instrument name, an exchange, and a financial instrument identifier;

storing, in a database application, instrument profile data which define one or more versatile financial transactions, the instrument profile data comprising at least a versatile instrument name, a financial instrument name, versatile subcomponent requirements, and a financial instrument transaction identifier;

assembling, by a transaction generator executing on the processor, a proposed versatile financial transaction having a plurality of subcomponent financial instrument transactions based at least in part upon a selected underlying position, strike points for the selected underlying position, a financial instrument identifier, market data associated with the financial instrument identifier, and the instrument profile data, where the proposed versatile financial transaction modifies a risk reward profile of the selected underlying position and where the risk reward profile is a risk, reward, or breakeven slope of a position based on price of the selected underlying position, wherein the underlying position is one of: in a user account and is selected from the user account, or not in a user account and is selected from the market data;

displaying, by a user-interface software application executing on the processor, a first graphical user interface including information regarding the proposed versatile financial transaction, where the first graphical user interface includes the proposed versatile financial transaction;

displaying, based on the selected proposed versatile financial transactions, a second graphical user interface with the price of the proposed versatile financial transactions based upon the average price between bid and ask of all contracts involved in the proposed versatile financial transactions, and including a strikeshifter 4-way-spin button element which, when selected, causes each of the subcomponent financial instrument transactions of the proposed versatile financial transaction to be simultaneously edited and causes each of the simultaneously edited subcomponent financial instrument transactions to be updated based on the market data, the strikeshifter 4-way-spin button element including:
- an up button which when engaged causes all strike values of the subcomponent financial instrument transactions to be shifted up by a same amount,
- a down button which when engaged causes all strike values of the subcomponent financial instrument transactions to be shifted down by a same amount,
- a forward button which when engaged causes all strike times of the subcomponent financial instrument transactions to be shifted forward in time by a same amount, and
- a back button which when engaged causes all strike times of the subcomponent financial instrument transactions to be shifted back in time by a same amount; and instructing the trade executing entity to fill the plurality of subcomponent financial instrument transactions of the proposed versatile financial transaction, as modified by use of the the strikeshifter 4-way-spin button element, simultaneously, as a single transaction such that either all of the subcomponent financial instrument transactions are filled or none of the subcomponent financial instrument transactions are filled.

2. The computer-implemented method in accordance with claim 1, further comprising:
- receiving a command via the second graphical user interface; and
- in response to receiving the command, editing at least one of the plurality of subcomponent financial instrument transactions prior to transmitting to the trade executing entity.

3. The computer-implemented method in accordance with claim 1, further comprising selecting a financial instrument that will fulfill the proposed versatile financial transaction.

4. The computer implemented method in accordance with claim 1, wherein the first graphical user interface includes a user-selectable user interface element which, when selected, removes one or more conversion positions and reversal positions from the proposed versatile transaction.

5. The computer implemented method in accordance with claim 1, wherein the first graphical user interface includes a user-selectable user interface element which, when selected, removes one or more box positions from the proposed versatile transaction.

6. The computer implemented method in accordance with claim 1, wherein the first graphical user interface includes a user-selectable user interface element which, when selected, extracts one or more butterflies from a position of the proposed versatile transaction.

7. The computer-implemented method in accordance with claim 1, wherein the proposed versatile financial transaction, when combined with an underlying account holding, results in a slingshot hedge, wherein the slingshot hedge is selected from the group consisting of a slingshot hedge variation 1P2CV, a slingshot hedge variation 1P2PV, a slingshot hedge variation 2P2PV, a slingshot hedge variation 1P3CV, a slingshot hedge variation 1P3PV, a slingshot hedge variation 2P3CV, a slingshot hedge variation 2P3PV, a slingshot hedge variation 1C2PV, a slingshot hedge variation 1P2CV, a slingshot variation 2C2CV, a slingshot hedge variation 1C3PV, a slingshot hedge variation 1C3CV, a slingshot hedge variation 2C3PV, and a slingshot hedge variation 2C3CV.

8. The computer-implemented method in accordance with claim 1, wherein the strike shifting user interface provides a further interaction which when engaged causes strike values of the subcomponent financial instrument transactions to be shifted by a same amount.

9. The computer-implemented method in accordance with claim 1, wherein the strike shifting user interface provides a further interaction which when engaged causes strike times of the subcomponent financial instrument transactions to be shifted in time by a same amount.

10. A computer-implemented method for assembling and completing a versatile financial transaction with an interactive display, the method comprising:
- receiving from a trade executing entity, via a network interface in communication with a processor, market data relating to one or more financial instrument transactions, the market data comprising at least a price, a financial instrument name, an exchange, and a financial instrument identifier;
- storing, in a database application, instrument profile data which define one or more versatile financial transactions, the instrument profile data comprising at least a versatile instrument name, a financial instrument name, versatile subcomponent requirements, and a financial instrument transaction identifier;
- assembling, by a transaction generator executing on the processor, a proposed versatile financial transaction having a plurality of subcomponent financial instrument transactions based at least in part upon a selected underlying position, strike points for the selected underlying position, a financial instrument identifier, market data associated with the financial instrument identifier, and the instrument profile data, where the proposed versatile financial transaction modifies a risk reward profile of the selected underlying position and where the risk reward profile is a risk, reward, or breakeven slope of a position based on price of the selected underlying position, wherein the underlying position is one of: in a user account and is selected from the user account, or not in a user account and is selected from the market data;
- displaying, by a user-interface software application executing on the processor, a first graphical user interface including information regarding the proposed versatile financial transaction, where the first graphical user interface includes the proposed versatile financial transaction;
- displaying based on the selected proposed versatile financial transactions, a second graphical user interface with the price of the proposed versatile financial transactions based upon the average price between bid and ask of all contracts involved in the proposed versatile financial transactions, and including a strikeshifter 4-way-spin button element which, when selected, causes each of the subcomponent financial instrument transactions of the proposed versatile financial transaction to be simultaneously edited and causes each of the simultaneously edited subcomponent financial instrument transactions to be updated based on the market data, the strikeshifter 4-way-spin button element including:

an up button which when engaged causes all strike values of the subcomponent financial instrument transactions to be shifted up by a same amount, a down button which when engaged causes all strike values of the subcomponent financial instrument transactions to be shifted down by a same amount, a forward button which when engaged causes all strike times of the subcomponent financial instrument transactions to be shifted forward in time by a same amount, and a back button which when engaged causes all strike times of the subcomponent financial instrument transactions to be shifted back in time by a same amount; and instructing the trade executing entity to fill the plurality of subcomponent financial instrument transactions of the proposed versatile financial transaction, as modified by use of the the strikeshifter 4-way-spin button element, simultaneously, as a single transaction such that either all of the subcomponent financial instrument transactions are filled or none of the subcomponent financial instrument transactions are filled.

11. The computer-implemented method in accordance with claim 10, further comprising selecting a financial instrument that will fulfill the proposed versatile financial transaction.

12. The computer implemented method in accordance with claim 10, wherein the first graphical user interface includes a user-selectable user interface element which, when selected, removes one or more conversion positions and reversal positions from the proposed versatile transaction.

13. The computer implemented method in accordance with claim 10, wherein the first graphical user interface includes a user-selectable user interface element which, when selected, removes one or more box positions from the proposed versatile transaction.

14. The computer implemented method in accordance with claim 10, wherein the first graphical user interface includes a user-selectable user interface element which, when selected, extracts one or more butterflies from a position of the proposed versatile transaction.

15. A system configured to assemble and complete a versatile financial transaction comprising financial instrument transactions with an interactive display, said system comprising:

a network interface, communicably coupled to a data network, configured to receive from a trade executing entity market data relating to one or more financial instrument transactions, the market data comprising at least a price, a financial instrument name, an exchange, and a financial instrument identifier;

a database configured to store instrument profile data which define one or more versatile financial transactions, the instrument profile data comprising at least a versatile instrument name, a financial instrument name, versatile subcomponent requirements, and a financial instrument transaction identifier;

a display screen; and at least one processor, executing program code, to cause the system to:

assemble a proposed versatile financial transaction having a plurality of subcomponent financial instrument transactions based at least in part upon a selected underlying position, strike points for the selected underlying position, a financial instrument identifier, market data associated with the financial instrument identifier, and the instrument profile data, where the proposed versatile financial transaction modifies a risk reward profile of the selected underlying position and where the risk reward profile is a risk, reward, or breakeven slope of a position based on price of the selected underlying position, wherein the underlying position is one of: in a user account and is selected from the user account, or not in a user account and is selected from the market data;

display, on the display screen, a first graphical user interface including information regarding the proposed versatile financial transaction, where the first graphical user interface includes the proposed versatile financial transaction;

display, on the display screen, based on the selected proposed versatile financial transactions, a second graphical user interface with the price of the proposed versatile financial transactions based upon the average price between bid and ask of all contracts involved in the proposed versatile financial transactions, and including a strikeshifter 4-way-spin button element which, when selected, causes each of the subcomponent financial instrument transactions of the proposed versatile financial transaction to be simultaneously edited and causes each of the simultaneously edited subcomponent financial instrument transactions to be updated based on the market data, the strikeshifter 4-way-spin button element including:

an up button which when engaged causes all strike values of the subcomponent financial instrument transactions to be shifted up by a same amount, a down button which when engaged causes all strike values of the subcomponent financial instrument transactions to be shifted down by a same amount, a forward button which when engaged causes all strike times of the subcomponent financial instrument transactions to be shifted forward in time by a same amount, and a back button which when engaged causes all strike times of the subcomponent financial instrument transactions to be shifted back in time by a same amount; and instruct, via the network interface, the trade executing entity to fill the plurality of subcomponent financial instrument transactions of the proposed versatile financial transaction, as modified by use of the strikeshifter 4-way-spin button element, simultaneously, as a single transaction such that either all of the subcomponent financial instrument transactions are filled or none of the subcomponent financial instrument transactions are filled.

16. The system of claim 15, wherein the network interface is configured to receive a data feed formatted according to one of a Common Software Architecture (CSA) specification, a Consolidated Tape System (CTS) specification, Intermarket Trading System (ITS) specification, On-Line Transaction Processing (OLTP) specification, Opening Automated Report Service (OARS) specification, Securities Industry Automation Corporation (SIAC) specification, or a Super Designated Order Turnaround (SuperDOT) specification.

17. The system of claim 15, wherein the database is configured to store respective tables indicating a profile for each financial instrument in a subcomponent financial transaction.

18. The system of claim 17, wherein the profile comprises an expiration date and strike price.

19. The system of claim 15, wherein the processor is configured to calculate option price chains based on querying the database and executing at least one of a join command or select command on price data stored in the database.

20. The system of claim 15, wherein the processor is configured to assemble the proposed versatile financial transaction based on calculating a multi-leg sequence of subcomponent transactions responsive to user input that are executed simultaneously as contingent orders with respective vendors.

* * * * *